(12) United States Patent
Lerner et al.

(10) Patent No.: US 7,370,961 B2
(45) Date of Patent: May 13, 2008

(54) INTERCHANGEABLE EYEWEAR ASSEMBLY

(76) Inventors: Ira Lerner, 171 Spring St., 2nd floor, New York, NY (US) 10012; Toshiro Fujiuchi, 31-4-1 Kamishinjo, Sakai-cho, Sakai-Gun, Fukui-Pref., Fukui-Pref. 919-0522 (JP)

( * ) Notice: Subject to any disclaimer, the term of this patent is extended or adjusted under 35 U.S.C. 154(b) by 0 days.

(21) Appl. No.: 11/018,423

(22) Filed: Dec. 21, 2004

(65) Prior Publication Data

US 2005/0225713 A1  Oct. 13, 2005

(51) Int. Cl.
*G02C 7/08* (2006.01)
*G02C 9/00* (2006.01)

(52) U.S. Cl. .......................... 351/57; 351/47
(58) Field of Classification Search ............. 351/47, 351/48, 57, 58
See application file for complete search history.

(56) References Cited

U.S. PATENT DOCUMENTS

| | | |
|---|---|---|
| 188,246 A | 3/1877 | Johnson |
| 1,679,233 A | 7/1928 | Strauss |
| 1,907,749 A | 5/1933 | Dechau |
| 1,936,319 A | 11/1933 | Wingate |
| 2,065,122 A | 12/1936 | Diggins |
| D170,435 S | 9/1953 | Weissman |
| 2,737,847 A | 3/1956 | Tesauro |
| 2,770,168 A | 11/1956 | Tesauro |
| 3,498,701 A | 3/1970 | Miller |
| 3,531,118 A | 9/1970 | Mabie |
| 3,531,188 A | 9/1970 | Leblanc |
| 3,565,517 A | 2/1971 | Gitlin |
| D221,480 S | 8/1971 | Tagnou |
| 3,838,914 A | 10/1974 | Fernandez |
| 4,021,892 A | 5/1977 | Piper |
| 4,070,103 A | 1/1978 | Meeker |
| 4,196,981 A | 4/1980 | Waldrop |
| D291,808 S | 9/1987 | Meyerspeer |
| 4,878,749 A | 11/1989 | McGee |
| D307,756 S | 5/1990 | Porsche |
| 4,958,923 A | 9/1990 | Rosenson |
| 4,958,924 A | 9/1990 | Parker |
| 5,048,944 A | 9/1991 | Porsche |
| 5,162,824 A | 11/1992 | Klemka |
| 5,181,051 A | 1/1993 | Townsend |
| 5,243,366 A | 9/1993 | Blevins |
| 5,321,442 A | 6/1994 | Albanese |
| 5,371,554 A | 12/1994 | Aspesi |
| 5,389,981 A | 2/1995 | Riach, Jr. |
| 5,410,763 A | 5/1995 | Bollé |
| 5,416,537 A | 5/1995 | Sadler |
| 5,428,407 A | 6/1995 | Sheffield |

(Continued)

FOREIGN PATENT DOCUMENTS

CN  1117593 A  2/1996

(Continued)

*Primary Examiner*—Huy K Mai
(74) *Attorney, Agent, or Firm*—Thomas A. O'Rourke; Bodner & O'Rourke, LLP

(57) ABSTRACT

An eyewear system enables a person to switch lenses among a variety of frames or switch a variety of lenses within a single frame. The lenses can be easily attached to and detached from a frame assembly that may or may not otherwise contain lenses. The lenses may be frameless or positioned in one or more subframe assemblies.

51 Claims, 35 Drawing Sheets

U.S. PATENT DOCUMENTS

| | | | |
|---|---|---|---|
| D371,567 S | 7/1996 | Fukuchi | |
| 5,568,207 A | 10/1996 | Chao | |
| 5,642,177 A | 6/1997 | Nishioka | |
| 5,737,054 A | 4/1998 | Chao | |
| 6,027,214 A | 2/2000 | Graham | |
| 6,089,706 A | 7/2000 | Pilat, Jr. | |
| 6,149,269 A | 11/2000 | Madison | |
| 6,234,627 B1 | 5/2001 | Agnoli | |
| 6,264,325 B1 | 7/2001 | Peressini | |
| 6,386,703 B1 | 5/2002 | Huang | |
| 6,592,220 B1 | 7/2003 | Cheong | |
| 6,595,634 B1 | 7/2003 | Pilat, Jr. | |
| 6,755,522 B1 | 6/2004 | Strenk | |
| 6,764,175 B1 | 7/2004 | Chen | |
| 6,783,233 B2 * | 8/2004 | Xie | 351/47 |
| 6,921,166 B2 | 7/2005 | Xiao | |
| 6,942,337 B2 | 9/2005 | Zelman | |
| 7,029,114 B2 | 4/2006 | Smith | |

FOREIGN PATENT DOCUMENTS

| | | |
|---|---|---|
| DE | 1797366 | 1/1971 |
| DE | 8507761 | 6/1985 |
| DE | 8806898 | 10/1988 |
| DE | 3905041 A1 | 8/1990 |
| DE | 3919489 A1 | 12/1990 |
| DE | 3920879 A1 | 1/1991 |
| DE | 3933310 A1 | 1/1991 |
| DE | 9216919 | 4/1992 |
| DE | 431668 8A1-002 | 11/1994 |
| DE | 4316698 A1 | 11/1994 |
| DE | 29516670 U1 | 5/1996 |
| EP | 0502796 B1 | 2/1992 |
| EP | 0469699 A1 | 5/1992 |
| EP | 0743545 A1 | 11/1996 |
| FR | 915421 | 11/1946 |
| FR | 1037755 | 9/1953 |
| FR | 1061253 | 4/1954 |
| FR | 1266652 | 6/1961 |
| FR | 2657436 | 7/1991 |
| GB | 846425 | 8/1960 |
| GB | 855268 | 11/1960 |
| JP | 4415392 | 7/1969 |
| JP | 54111841 | 9/1979 |
| JP | 54111842 | 9/1979 |
| JP | 54163052 | 12/1979 |
| JP | 5550217 | 4/1980 |
| JP | 55083022 | 6/1980 |
| JP | 55133014 | 10/1980 |
| JP | 55135814 | 10/1980 |
| JP | 5629209 | 3/1981 |
| JP | 56095214 | 8/1981 |
| JP | 56153317 | 11/1981 |
| JP | 57178215 | 11/1982 |
| JP | 57184910 | 11/1982 |
| JP | 85382 | 6/1984 |
| JP | 612621 | 1/1986 |
| JP | 63188626 | 12/1988 |
| JP | 05196899 | 8/1993 |
| JP | 540493 | 10/1993 |
| JP | 05289029 | 11/1993 |
| JP | 06265828 | 9/1994 |
| JP | 06331943 | 12/1994 |
| JP | 07028001 | 1/1995 |
| JP | 710722 | 2/1995 |
| JP | 07056123 | 3/1995 |
| JP | 7128620 | 5/1995 |
| JP | 7156856 | 5/1995 |
| JP | 07244259 | 9/1995 |
| JP | 08050263 | 2/1996 |
| JP | 274588 | 4/1996 |
| JP | 09043544 | 2/1997 |
| JP | 09061754 | 3/1997 |
| JP | 9101489 | 4/1997 |
| JP | 2000-122001 | 4/2000 |
| JP | 2001-166266 | 6/2001 |
| JP | 2002-031783 | 1/2002 |
| RU | 220885 | 9/1968 |
| WO | WO9009611 | 8/1990 |
| WO | WO9518986 | 7/1995 |
| WO | WO9523995 | 8/1995 |
| WO | WO9942890 | 8/1999 |

* cited by examiner

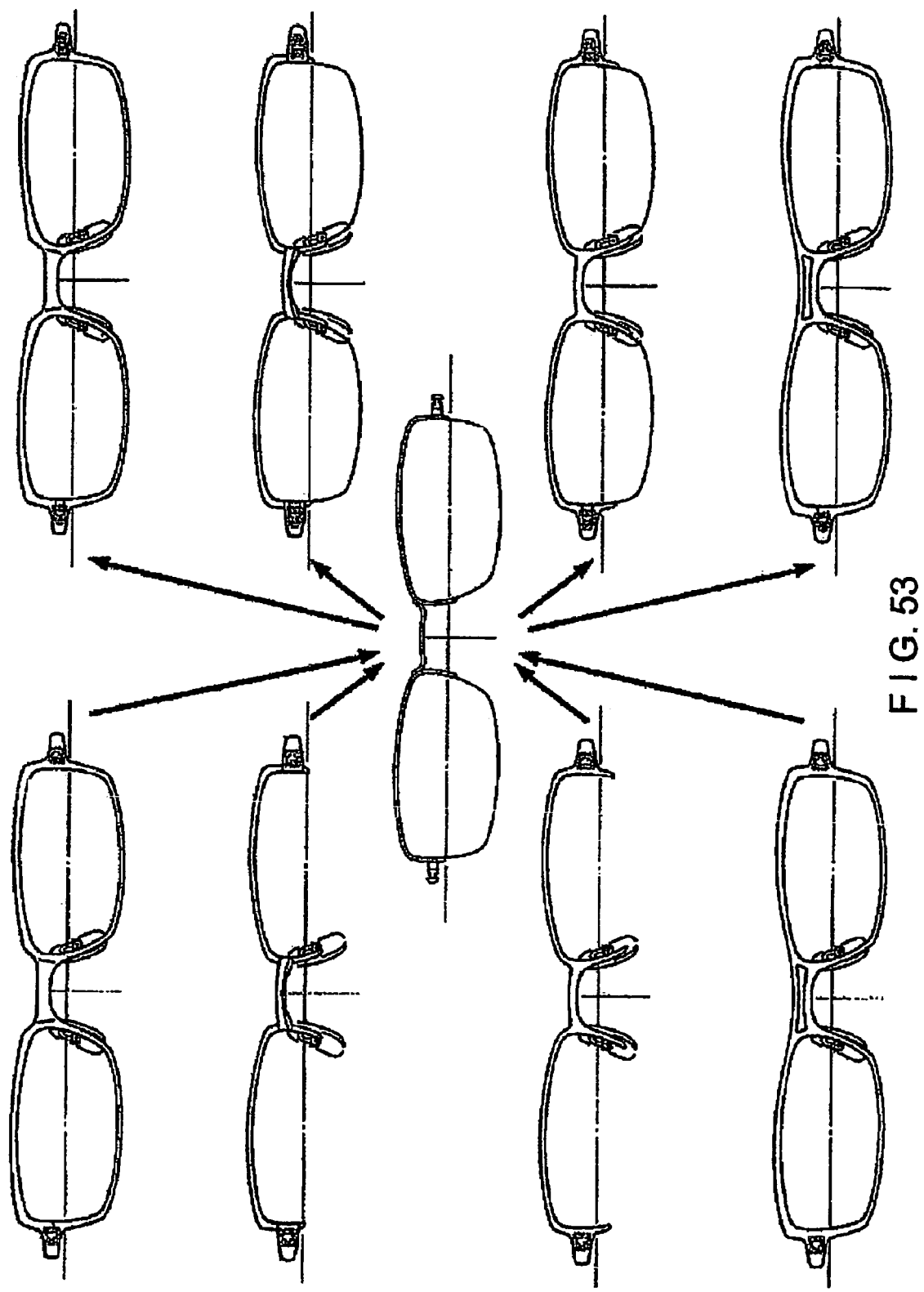
F I G. 53

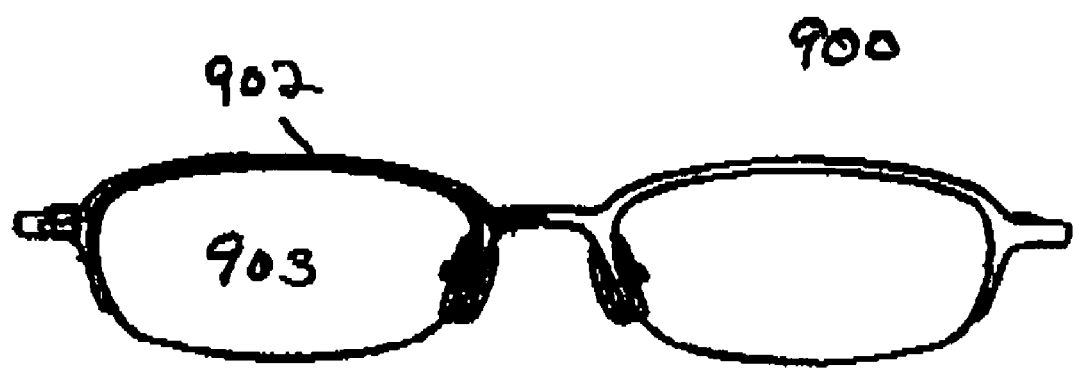
FIG. 56
FIG. 57
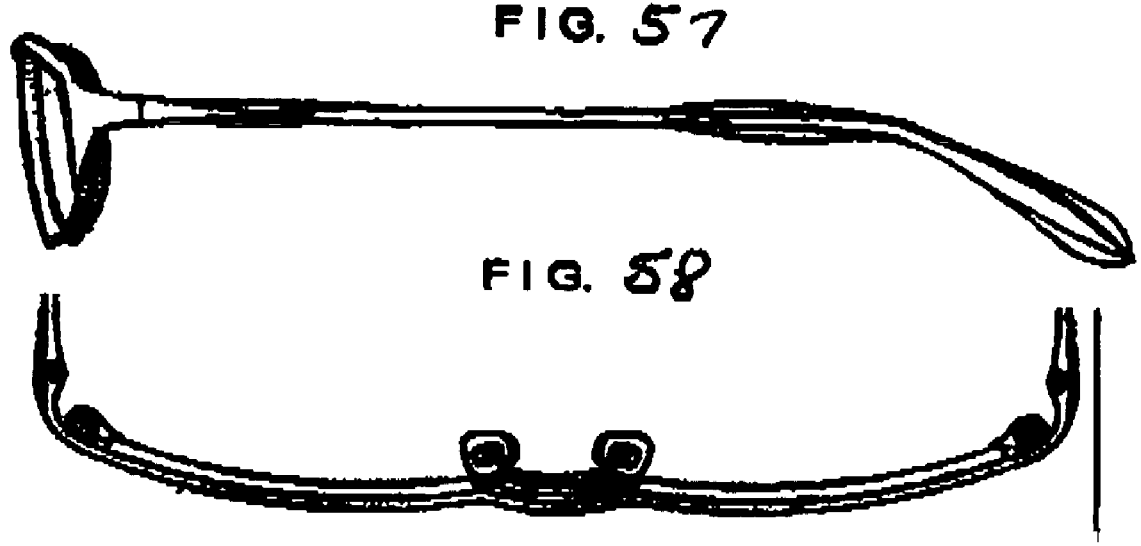
FIG. 58
FIG. 59

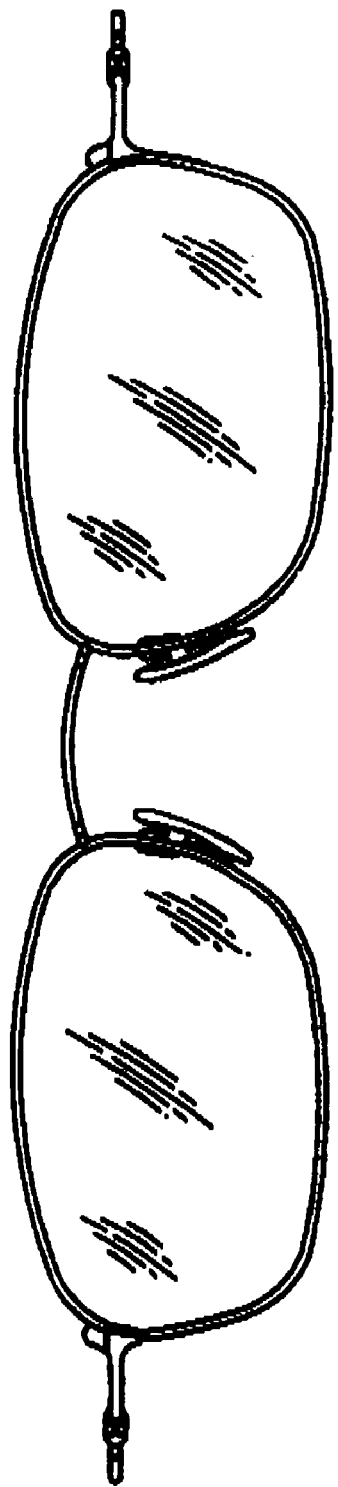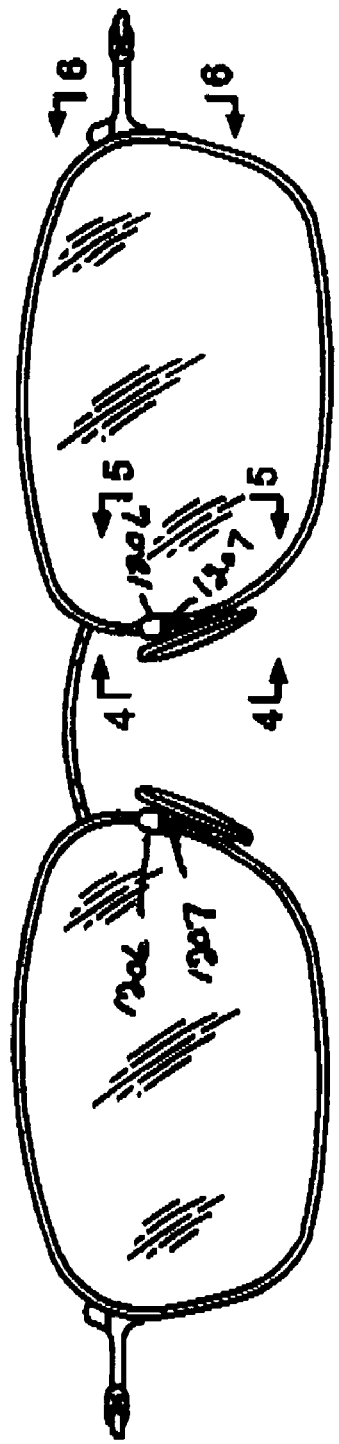
Fig 23
Fig 24

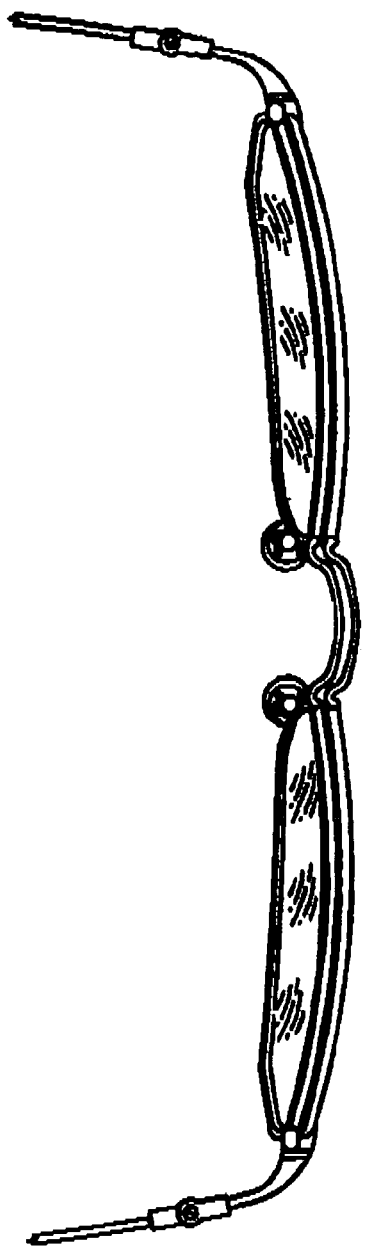
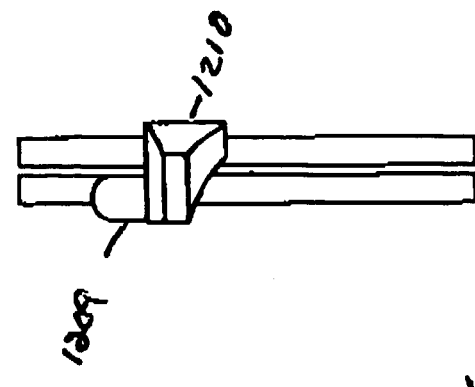
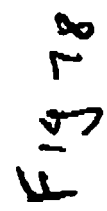
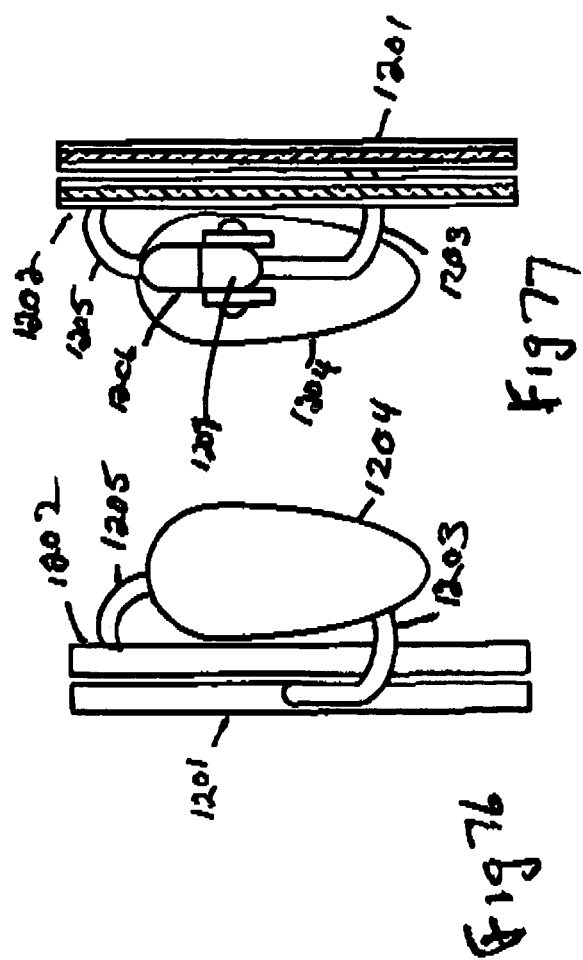

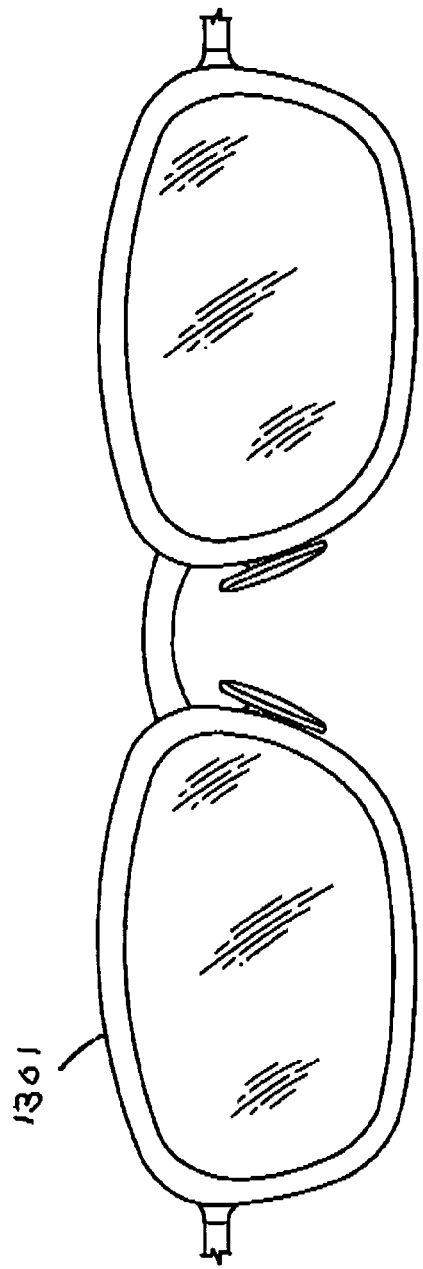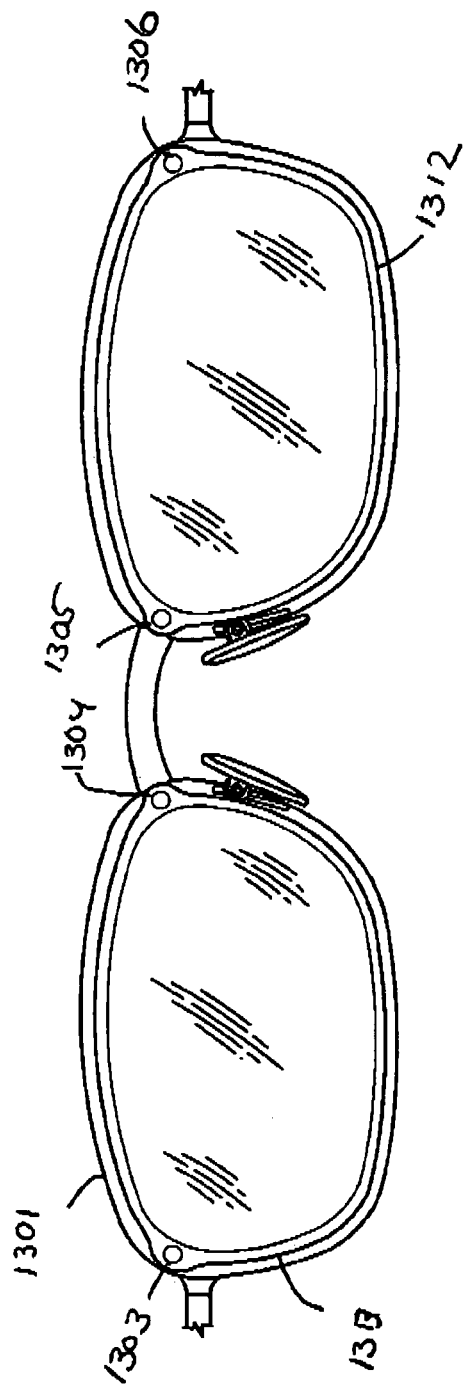

INTERCHANGEABLE EYEWEAR ASSEMBLY

RELATED APPLICATIONS

This application claims the priority benefit under 35 U.S.C. § 119(e) of U.S. Provisional Patent Application No. 60/508,674, filed on Oct. 2, 2003, and U.S. patent application Ser. No. 10/957,213 filed Oct. 1, 2004 which are hereby incorporated by reference in their entirety.

BACKGROUND OF THE INVENTION

1. Field of the Invention

The present invention generally relates to eyewear frames and lenses. More particularly, the present invention relates to an eyewear assembly in which a single lens or single set of lenses can be inserted and removed from behind a single frame or a plurality of frames, which single frame or plurality of frames may or may not already contain a lens or lenses. In addition, the present invention relates to an eyewear assembly in which a lens, a set of lenses or multiple sets of lenses can be inserted and removed from behind a single frame or a plurality of frames, which single frame or plurality of frames may or may not already contain a lens or set of lenses.

2. Description of the Related Art

The cost of quality prescription lenses has risen dramatically in the past ten years. Many people who wear eyeglasses today desire so-called progressive lenses in which the power of the lens varies along the surface of the lens. Unfortunately, progressive lenses are more expensive than ordinary prescription lenses or bifocal lenses. Additionally, a type of thin lens that is designed to replace a relatively thicker lens also is available but has an elevated cost. Further, coatings and the like can be added to a lens to, for example, reduce glare or allow the lens to change tint. These coatings also increase the cost of the lens.

At the same time, people who wear eyeglasses often purchase more than one pair of eyeglasses for different functional and aesthetic reasons. For instance, different eyeglasses may be purchased to increase strength or comfort, to alter the fit or the weight, to vary the flexibility or the rigidity or to provide a different aesthetic look by changing the shape of the frame or the coloring of the frame. This, of course, requires the purchase of a complete set of eyewear, including the frame and the expensive prescription lenses.

On the other hand, some people purchase more than one pair of eyewear having a single style of frame but use one of the frames for tinted lenses and the other for non-tinted lenses. Of course, these people must then carry both pair of eyewear and must absorb the additional costs associated with the second frame. In recent years, one attempt to solve this problem has been the creation of prescription eyewear assemblies that include a secondary set of non-prescription lenses that attach to the front side of the primary eyeglass frame. Although this does alleviate the necessity of carrying two complete pairs of eyeglasses, there are many undesirable features associated with this solution. Firstly, the wearer is forced to wear two pairs of lenses simultaneously, instead of having the ability to substitute one type of lens for another. Secondly, in the case where it may be desirable to combine two different types of lenses and wear them simultaneously, the frontal attachment of the second set of lenses is very obvious and unsightly. Accordingly, it would be desirable to hide the second set of lenses from view when wearing two sets of lenses is desired. Another undesirable defect of attaching the second set of lenses to the front side of the eyeglass frame is that wind and other physical forces or objects often come into contact with these secondary lenses and cause them to accidentally detach from the frame, often resulting in damage to these lenses, and hence, their costly replacement. Another issue that has arisen with respect to eyewear is that the frames, as they have become more stylish, have become very expensive. As a result, it would be desirable to have less expensive alternatives available.

SUMMARY OF THE INVENTION

It would be desirable to create a system of eyewear that enables a person to use a single lens or single pair of lenses with multiple frame structures or a single frame structure with multiple lenses or multiple pairs of lenses. The multiple lenses or multiple pairs of lenses can include individual lenses that can be combined to form a pair in the frame structure.

In the first arrangement, the frame structures can vary among one another by virtue of functionality, features or aesthetic appearance. As such, variations among the frames can be provided by design, materials used, coloring, shape, decorations, construction or the like. Such a system would allow a person who wears eyewear to have several sets of frames without the need for more than one set of lenses.

In the second arrangement, the lenses can vary among one another by virtue of tinting or magnification features, for instance. Different eyeglass lenses may also be purchased for various vision correcting purposes, for purposes such as glare reduction, magnification, protection from UV rays, lighter weights, as for aesthetic reasons such as thinness of the lenses, tints and coloring of the lenses. Thus, a person can maintain a single frame in which the lenses are removed and replaced quickly and easily to accommodate changes in the lenses. For instance, sun lenses can be installed in place of clear lenses or a magnifying lens can be used in place of a wearer's usual lens. In some instances, two sets of lenses can be combined in one eyeglass assembly so that the frame has a first lens or set of lenses that remain in place while a second lens or set of lenses may be inserted and removed from the eyeglass assembly at will, such as attaching a second set of prescription lenses behind a first pair of sunglass lenses, or visa versa. Further, in this arrangement, the second set of lenses are not visible to observers, unlike other secondary lenses that attach on the front side of the frame, thus giving a more aesthetically pleasing appearance and concealing the fact that two pairs of lenses are being used. In addition, the method of attachment used in the present invention prevents accidental detachment of the secondary lenses by wind and other physical forces or objects that may come in contact with the front of the eyeglass assembly.

Accordingly, one aspect of certain embodiments of the present invention involves providing a user with one pair of lenses that can be easily attached and detached to a plurality of complementary frame designs.

Another aspect of certain embodiments of the present invention involves enabling a user to remove the lenses from one frame and insert the lenses in another frame without the use of mechanical tools or equipment or enabling a user to remove at least one lens from a frame and replace that lens with another lens without the use of mechanical tools or equipment.

A further aspect of certain embodiments of the present invention involves enabling an eyeglass wearer to easily attach to and detach from a single pair of lenses multiple frames without contacting with one's fingers a region of the lenses through which one looks.

An aspect of the present invention also involves an eyeglass assembly comprising a frame assembly and a subframe assembly. The frame assembly comprises a pair of temples, a front side and a back side. The frame assembly may or may not contain a pair of lenses. The back side of the frame assembly is closer to a wearer's face than the front side. The subframe assembly comprises at least one lens. The subframe assembly also comprises a front side and a back side. The back side of the subframe assembly is closer to the wearer's face than the front side of the subframe assembly. The subframe assembly is secured to the frame assembly at least in part by at least one pair of magnetic members such that the front side of the subframe assembly faces the back side of the frame assembly and the subframe assembly is at least partially positioned between the frame assembly and the wear's face. A first magnetic member of the at least one pair of magnetic members is a magnet that is secured to one of the frame assembly and the subframe assembly and a second magnetic member of the at least one pair of magnetic members is a magnet or a material that is attracted to a magnet and the second magnetic member being secured to the other of the frame assembly and the subframe assembly such that the first magnetic member and the second magnetic member are generally aligned when the subframe assembly is secured to the frame assembly. It will be appreciated by those skilled in the art that although specific locations are shown herein for the placement of the magnetic members, the specific location of the magnetic members and their shapes can vary as desired In addition, although many of the magnetic members are shown herein as having a specific shape, the shape of the magnetic member can vary. Thus, the magnetic member can be round, square oval, oblong, rectangular, ovoid and any other suitable shape.

Another aspect of the present invention involves an eyeglass assembly comprising a frame assembly and a subframe assembly. The frame assembly comprises a front side and a back side with the back side being closer to a face of a wearer than the front side, and may or may not contain a pair of lenses. The frame assembly further comprises a first brow bar, a second brow bar and a bridge connecting the first brow bar to the second brow bar. A first projection extends from the first brow bar and a second projection extends from the second brow bar. A first temple is connected to the first projection and a second temple connected to the second projection. The subframe assembly comprises a front side and a back side. The back side is closer to the face of a wearer than the front side. The subframe assembly further comprises a brow bar with a lens being secured to the brow bar. The subframe assembly is secured to the frame assembly such that the front side of the subframe assembly faces the back side of the frame assembly and such that the front side of the subframe assembly generally is positioned rearward of the front side of the frame assembly.

An additional aspect of the present invention also involves an eyeglass assembly comprising a frame assembly and a lens assembly. The frame assembly comprises a pair of temples, a front side and a back side. The temples may secure the frame assembly to the wearer in any suitable fashion including but not limited to about the ears, over the ears or the temples may be a strap or may be integral with the frame assembly as a unitary member.

The frame assembly may or may not contain a pair of lenses. The back side of the frame assembly is closer to a wearer's face than the front side. The lens assembly can have a frame around all or part of a lens or a lens may be frameless. The lens assembly comprises at least one lens. The lens assembly also comprises a front side and a back side. The back side of the lens assembly is closer to the wearer's face than the front side of the lens assembly. The lens assembly is secured to the frame assembly at least in part by at least one pair of magnetic members such that the front side of the lens assembly faces the back side of the frame assembly and the lens assembly is at least partially positioned between the frame assembly and the wear's face. A first magnetic member of the at least one pair of magnetic members is a magnet that is secured to one of the frame assembly and the lens assembly and a second magnetic member of the at least one pair of magnetic members is a magnet or a material that is attracted to a magnet and the second magnetic member being secured to the other of the frame assembly and the lens assembly such that the first magnetic member and the second magnetic member are generally aligned when the lens assembly is secured to the frame assembly.

A further aspect of the present invention involves a method of exchanging lenses in an eyewear system. The eyewear system comprises a first subframe assembly that comprises a first lens, a second subframe assembly that comprises a second lens, the second lens not being matched to the first lens, and a frame assembly that will accommodate individually both the first subframe assembly and the second subframe assembly. The method comprises releasing and removing the first subframe assembly from behind the frame assembly, placing the second subframe assembly behind the frame assembly and securing the second subframe assembly to the frame assembly.

A further aspect of the present invention involves a method of exchanging lenses in an eyewear system. The eyewear system comprises a first subframe assembly that comprises a first lens and a second lens, and at least a second subframe assembly that comprises a different first lens and a different second lens, and a frame assembly that may or may not contain lenses that will accommodate individually each subframe assembly, which is not limited in number. In other words, three, four or more subframes can be used. The method comprises releasing and removing the first subframe assembly from behind the frame assembly, placing the second subframe assembly behind the frame assembly and securing the second subframe assembly to the frame assembly.

An additional aspect of the present invention involves a method of exchanging frames in an eyewear system. The eyewear system comprises a first frame assembly that may or may not comprise a lens, a second frame assembly that may or may not comprise a lens, and a subframe assembly that comprises a lens where the subframe assembly is sized and configured to be accommodated within the first frame assembly and the second frame assembly. The method comprises releasing and removing the subframe assembly from behind the first frame assembly, placing the subframe assembly behind the second frame assembly and securing the subframe assembly to the second frame assembly.

BRIEF DESCRIPTION OF THE DRAWINGS

These and other features, aspects and advantages of the present invention will now be described with reference to the drawings of several preferred embodiments. The illustrated embodiments are intended to illustrate and not to limit the invention. The drawings comprise the figures briefly described below.

FIGS. 53 and 54 illustrate in schematic fashion that a single pair of lenses can be used interchangeably with a plurality of frames to create some flexibility in eyewear fashion and function.

FIG. 56 is a front elevation view of an eyewear assembly comprising a first frame and a first pair of lenses.

FIG. 57 is a front elevation view of a subframe containing a pair of lenses.

FIG. 58 is a side elevation of the first eyewear assembly as presented in FIG. 56.

FIG. 59 is a top plan view of the eyewear assembly as presented in FIG. 56 with the subframe assembly of 57 secured in place.

FIG. 73 is a front view of a frame with a subframe attached to it by means of four pairs of magnetic members: two pairs near the nasal area and two pairs near the outside edges of the lenses.

FIG. 74 is a rear view of a frame with a subframe attached shown in FIG. 75.

FIG. 75 is a top view of a frame with a subframe attached.

FIG. 76 is a sectional view taken along 4-4 of FIG. 74.

FIG. 77 is a sectional view taken along 5-5 of FIG. 74 to it.

FIG. 78 is a sectional view taken along 6-6 of FIG. 74.

FIG. 80 is a rear view of a frame and subframe of FIG. 74 showing magnetic members at the nasal area.

FIG. 81 is a rear view of a frame and subframe of FIG. 74 showing magnetic members near the outside edges of the lenses.

FIG. 82 is a rear view of a frame and two subframes showing magnetic members near the nasal area and outside edges of the lenses.

FIG. 87 is a front view of a frame that has a two individual lenses magnetically attached to the rear side of the frame.

FIG. 88 is a rear view of FIG. 87 showing a frame with two individual lenses attached magnetically using two pairs of magnetic members to attach each lens

DETAILED DESCRIPTION OF THE PREFERRED EMBODIMENT

Figure 1:
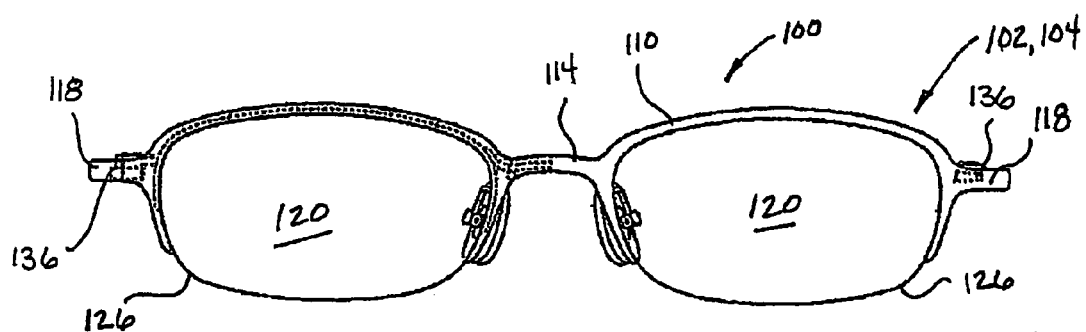
FIG. 1 is a front elevation view of a first eyewear assembly comprising a first frame and a first pair of lenses.

Prior to describing each of the illustrated embodiments, some general comments are set forth. As shown in the drawings, various mechanisms can be provided by which a set of lenses can be removably connected to a frame assembly that may or may not already have a lens or lenses contained therein. In most embodiments of the present invention, the lens assembly will be mounted rearward of a front surface, and more preferably a rear surface, of the frame assembly. Desirably, the frame assembly will obscure at least a portion of the lens assembly. As such, certain features, aspects and advantages of the present invention can be used with eyeglasses, sunglasses, goggles, protective eyewear and the like.

Figure 54:
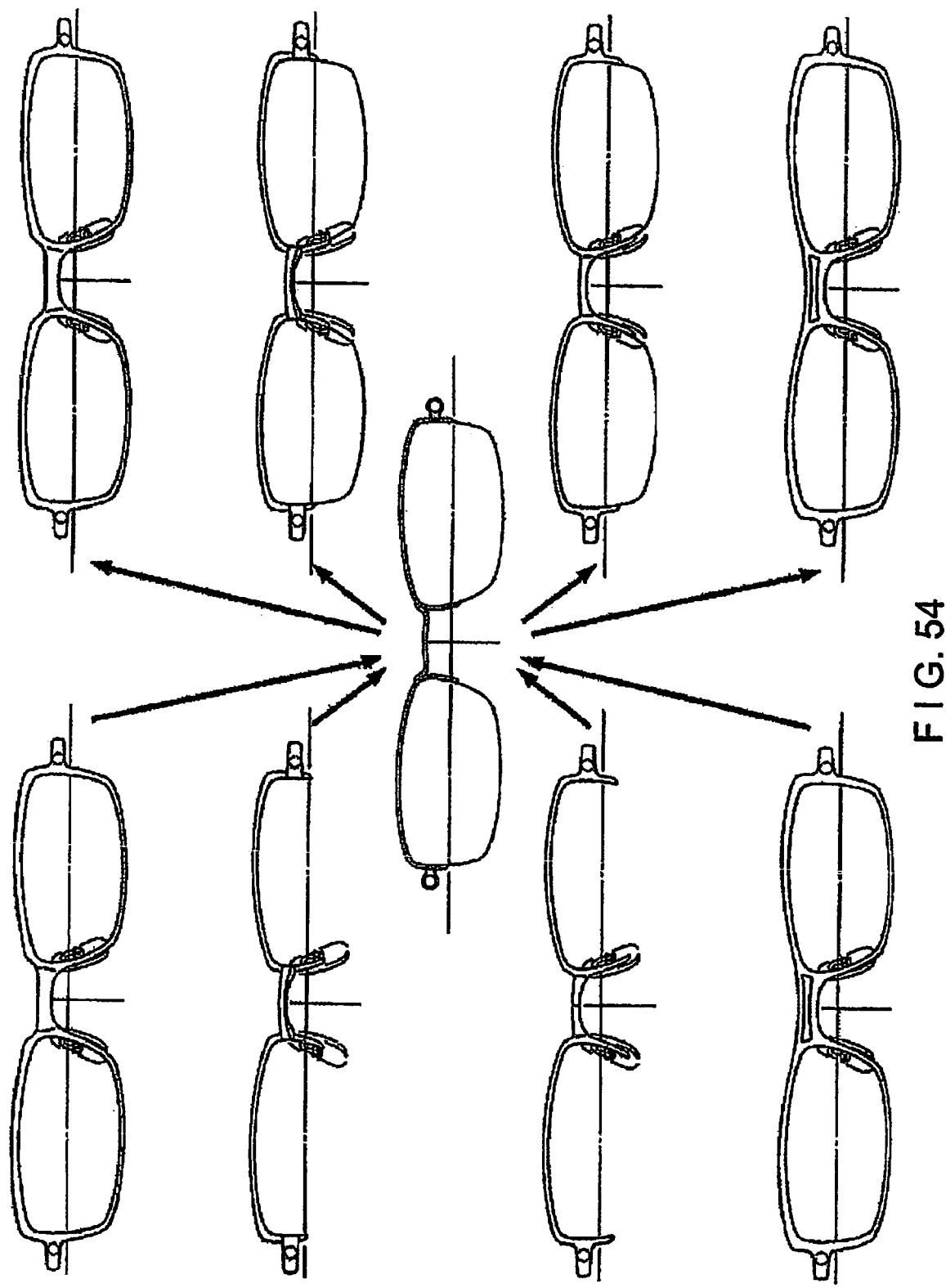
Figure 55:
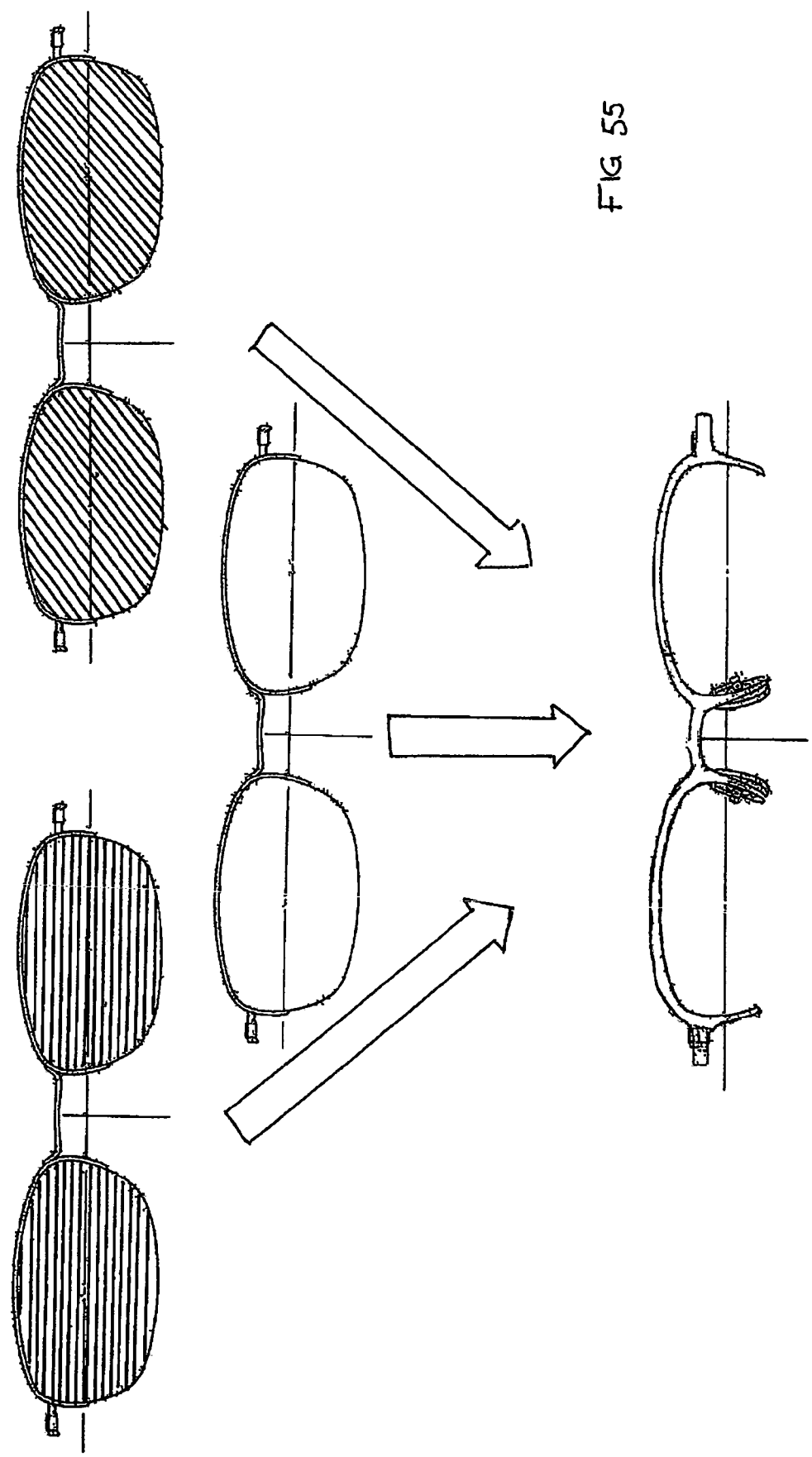
FIG. 55 illustrates in schematic fashion that a single frame assembly can be used with a variety of different lens combinations.
Figure 60:
FIG. 60 is a front elevation view of an eyewear assembly comprising a first frame and a first pair of lenses.
Figure 61:
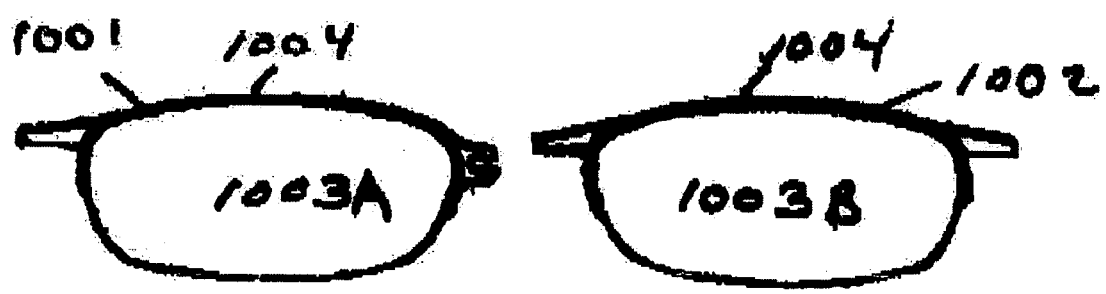
FIG. 61 is a front elevation view of two subframe assemblies, each containing one lens.
Figure 62:
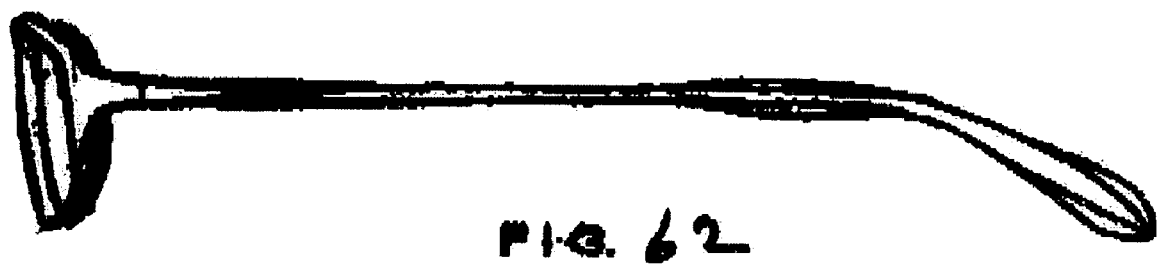
FIG. 62 is a side elevation of the eyewear assembly as presented in FIG. 60.
Figure 63:
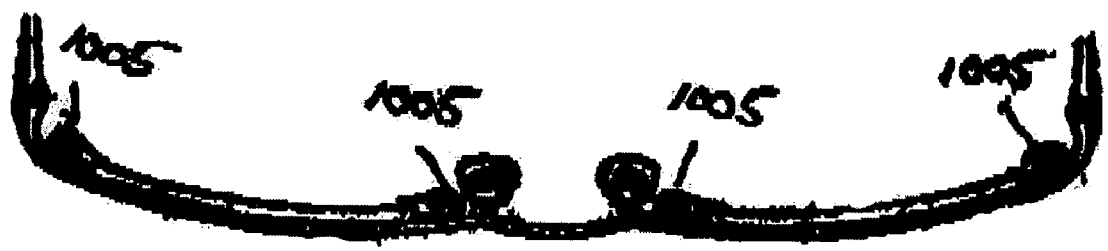
FIG. 63 is a top plan view of the eyewear assembly as presented in FIG. 60 with the two subframe assemblies of 61 secured in place.

Thus, either the lenses can be replaced by other lenses relative to a single frame assembly or the frame assembly can be replaced by another frame assembly relative to the lenses or both. In one embodiment, auxiliary lenses can be placed behind the primary lenses such that magnifiers, sun lenses, corrective lenses or the like can be positioned behind a primary lens. As shown in FIGS. 53 and 54, a single set of lenses contained in a subframe assembly can be installed in any number of frame assemblies to provide completed eyewear. FIG. 53 shows an arrangement with a mechanical interconnection between the subframe assembly and the frame assembly while FIG. 54 shows an arrangement with a magnetic interconnection between the subframe assembly and the frame assembly. FIG. 55 illustrates the use of a single frame assembly with subframe assemblies comprising blue lenses, brown lenses and clear lenses. Other lens variations also can be used. Configurations such as those shown in FIGS. 53-55 will address the desires to use either a single set of lenses with multiple frames, a single frame with multiple sets of lenses or multiples sets of lenses with multiple frames.

As used herein and as discussed in further detail below, the frame assembly preferably comprises a brow bar, a pair of temples and a bridge but other suitable frame assemblies also can be used. The frame can be made of any suitable material and in any suitable manner. Notably, the frame assembly advantageously is not provided with any lenses that are secured within optical openings of the frame assembly in any typical fashion.

Instead, the lenses preferably are mounted in the subframe or in a pair of sub-frames that are independently mountable to the frame assembly. The sub-frame or subframes in the illustrated arrangements preferably do not feature temples or nose support pads. Instead, once mounted in the frame assembly, the frame assembly provides these components. In some embodiments, however, the frame assembly may be made without the temples and/or the nose support pads and these components can be mounted to the sub-frame or sub-frames. Such a construction, however, reduces the illusion of an integrated frame and lens assembly. The sub-frame preferably is of the semi-rimless variety to increase the number of frame assembly variations with which the sub-frame can be used. In some embodiments, the sub-frame can comprise a very narrow frame, however, the integrity of the frame assembly can become a concern in such embodiments.

The illustrated embodiments depict two general types of interconnection techniques with which the subframe assembly can be secured to the frame assembly: magnetic interlock and mechanical interlock. A combination of a magnetic interlock and a mechanical interlock also can be used. While a few mechanical interlocking constructions are illustrated, a variety of other suitable types of interlocking constructions also can be used. In some arrangements, these mechanical interlocks can be snap-fit. With respect to the magnetic interlock, magnetic members are provided on at least one of the frame assembly or the lens assembly. The magnetic members can be a magnet or a material that is attracted to a magnet (e.g., a ferrous metal). Therefore, each pair of attracting magnetic members includes at least one magnetic member that is a magnet while the other magnetic member may be a magnet or a material that is attracted to a magnet. The magnetic members can have any suitable shape and size. The magnetic members can be embedded, recessed, positioned flush with or raised from the surface to which or in which the magnetic member is secured. Preferably, a pair of magnetic members is provided such that one of the pair is in or on the frame assembly and the other is in or on a corresponding region of the subframe assembly. The magnetic members can be attached in any suitable manner, including without limitation, embedding, adhering, or through the use of a sleeve or housing. In some embodiments, the frame assembly or the subframe assembly can include a component made of a magnetic member, such as a brow bar or the like. The magnetic members can be used to join the frame assembly to the subframe assembly regardless of whether there is direct contact between the paired magnetic members. Accordingly, "magnetically secured" means that the magnetic force between the respective magnetic members is sufficient to hold the subframe assembly in a usable position relative to the frame assembly.

The specific illustrated embodiments now will be described, beginning with the embodiment illustrated in FIGS. 1-6. In the arrangement of FIGS. 1-6, the eyewear 100 generally comprises a frame assembly 102 and a lens subframe assembly 104 (see, for example, FIG. 2). As introduced above, the lens subframe assembly 104 preferably is mountable to the frame assembly 102 rearward of the frame assembly 102 such that at least a portion of the lens subframe assembly 104 will be positioned between the frame assembly 102 and the eye of a wearer. As used herein, the term rearward means on the side adjacent the eyes and forward means in the opposite direction.

The frame assembly 102 preferably comprises a brow bar 110, a pair of temples 112 and a bridge 114. The brow bar 110 and the temples 112 can be connected in any suitable manner. In the arrangement illustrated in FIGS. 1 and 3, corresponding hinges 116 connect the temples 112 to the brow bar 110. More particularly, projections 118 extend from the brow bar 110 and the hinges 116 connect the brow bar 110 to the projections 118. Other suitable configurations can be used.

The bridge 114 extends in a region generally corresponding to the region between the eyes of a user. In the illustrated arrangement, the brow bar 110 actually is formed in two portions that are connected by the bridge 114. Other suitable configurations can be used including, but not limited to, a brow bar that forms at least a portion of, or, in some embodiments, the entirety of, the bridge 114. Any of the above described components of the frame assembly 102 may be omitted or integrated with other components in some embodiments. For instance, the temples 112 can be omitted where other technology or other structure is used to secure the eyewear in position in the proximity of the user's eyes. The frame assembly 102 also can comprise other structures, such as nose pads and the structures that connect the nose pads to the rest of the frame assembly 102.

Figure 2:
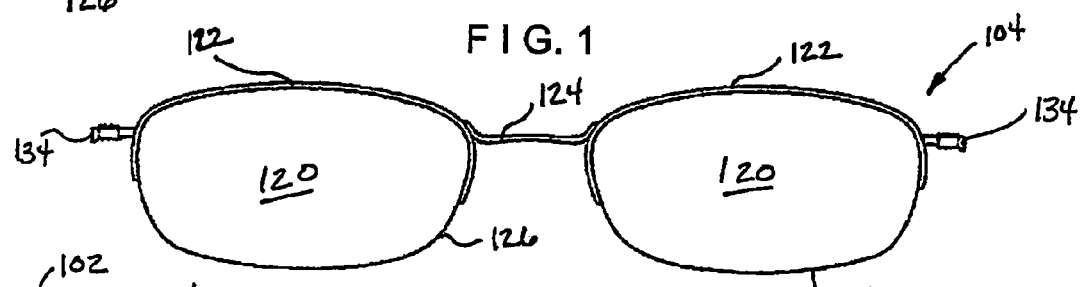
FIG. 2 is a front elevation view of the first pair of lenses.
Figure 3:
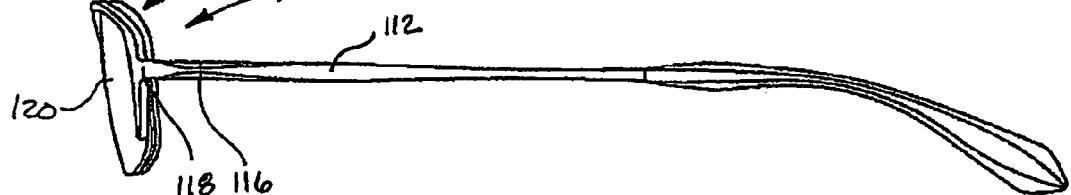
FIG. 3 is a side elevation of the first eyewear assembly as presented in FIG. 1.

With reference now to FIG. 2, the lens subframe assembly 104 in the arrangement of FIGS. 1-6 comprises a pair of lenses 120. A brow bar 122 and a bridge 124 combine in the illustrated arrangement to define a rigid frame structure of the lens subframe assembly 104. Preferably, the brow bar 122 and the bridge 124 have a smaller profile in front view such that the brow bar 122 and the bridge 124 of the subframe assembly 104 can be concealed by the brow bar 110 and the bridge 114 of the frame assembly 102, as shown by the hidden lines in FIG. 1.

The subframe assembly 104 preferably is of the rimless or semirimless variety. Such an arrangement increases the number of alternative frame constructions that can be used as the frame assembly while allowing the presence of the subframe assembly 104 to be masked. In the arrangement of FIGS. 1-6, the subframe assembly 104 comprises a lower nylon cord 126 that secures the lenses 120 to the brow bar 122. Other manners of securing the lenses 120 within or to the subframe assembly 104 can be used. For instance, in some arrangements, the lenses 120 can be secured with clamps, mechanical fasteners, threaded fasteners, encircling frames, eyewires or the like.

As described above, the subframe assembly 104 advantageously mounts to the frame assembly 102 in a manner that provides an appearance of integrated eyewear rather than removably connected lenses and frames. As such, in the illustrated arrangement, the subframe assembly 104 mounts behind the frame assembly 102 and the mounting structures are positioned behind the frame assembly 102 such that the mounting structures are generally obscured from the sight of one viewing the frame assembly 102 from the front.

Figure 4:
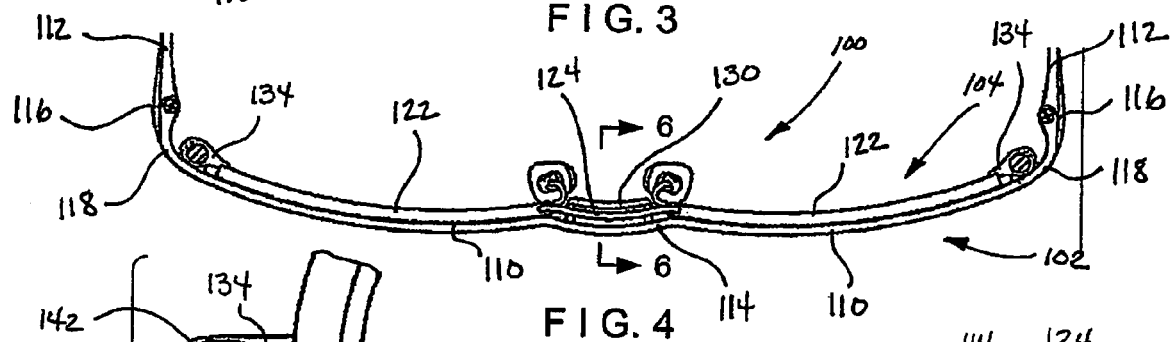
FIG. 4 is a top plan view of the first eyewear assembly as presented in FIG. 1.
Figure 6:
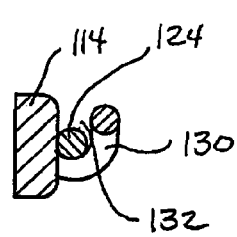
FIG. 6 is a section view taken along the line 6-6 in FIG. 4.
Figure 7:
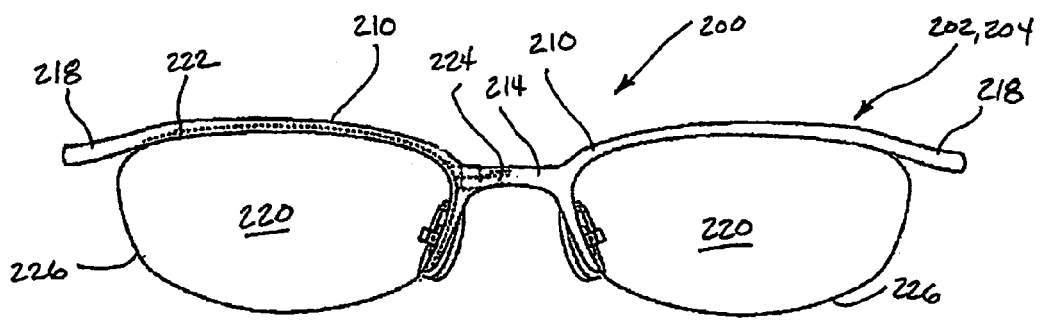
FIG. 7 is a front elevation view of a second eyewear assembly comprising a first frame and a first pair of lenses.

With reference to FIGS. 4 and 6, the bridge 124 of the subframe assembly 104 is positioned behind the bridge 114 of the frame assembly 102. A flange 130 extends rearward from the bridge 114 of the illustrated frame assembly 102. The flange can have any suitable configuration. Desirably, the flange 130 is configured to have a vertical dimension that is the same as or less than a vertical dimension of the bridge 114 of the frame assembly 102. The flange 130 in the illustrated arrangement comprises a wire-type of member that extends rearward and curves upward to define a hook. The flange 130 has an offset that is slightly larger than the thickness of the bridge 124 of the subframe assembly 124. The bridge 124 of the subframe assembly 104 can be placed in a valley 132 defined between the flange 130 and the bridge 114 of the frame assembly 102. In a presently preferred configuration, the bridge 124 is supported by the flange 130. In other configurations, the flange 130 can be omitted or the bridge is not supported by the flange 130.

Using the flange 130 to support the bridge 124 increases the structural integrity and facilitates the fitting of the subframe assembly 104 to the frame assembly 102.

Figure 5:
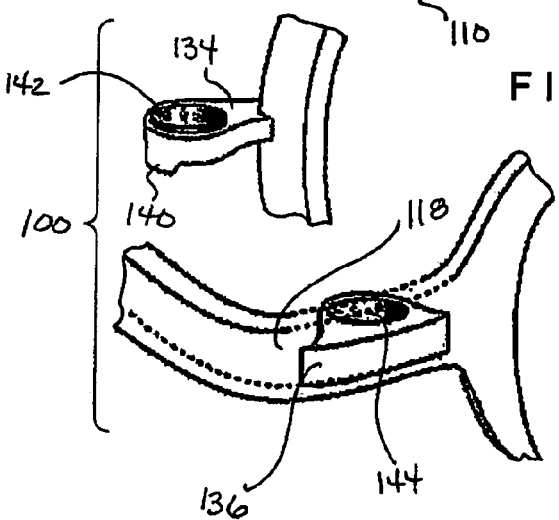
FIG. 5 is a perspective view of a portion of the first eyewear assembly as presented in FIG. 1 with the first pair of lenses shown removed from the first frame.

With reference to FIGS. 4 and 5, an outer portion of the illustrated subframe assembly 104 comprises lugs 134 that extend laterally outward from the brow bars 122. The lugs 134 are sized and configured to abut upon bosses 136 defined on the frame assembly 102. The bosses 136 can be integrally formed with the frame assembly 102 or, as in the illustrated arrangement, can be separate components that are secured to the frame assembly. In the illustrated arrangement, the bosses 136 advantageously are positioned behind the projections 118 such that the bosses 136 are generally concealed as are the lugs 134 when the lugs 134 abut the bosses 136. Moreover, in the illustrated arrangement, the bosses 136 support the lugs 134 such that the frame assembly 102 supports the outer portions of the subframe assembly 104. In some arrangements, the bosses 136 can be positioned above or to one side of the lugs 134 and interlocking configurations can be used to connect the two components.

With continued reference to FIG. 5, the illustrated lugs 134 comprise a lower lip 140. The lower lip 140 preferably is sized and configured to abut a surface of the respective boss 136. That is, the lower lip 140 helps secure the lug 134 to the boss 136. To further secure the lug 134 and the boss 136 together, the eyewear 100 comprises interconnecting components. More particularly, in the illustrated arrangement, the eyewear 100 comprises a magnetic interlock comprising at least one magnetic member. Even more particularly, the magnetic interlock is formed by each lug and boss combination and comprises a first magnetic member 142 and a second magnetic member 144. In some configurations, one of the magnetic members 142, 144 may be slightly recessed and the other of the magnetic members 142, 144 may extend into the recess to define a mechanical interlock in addition to defining a magnetic interlock. Other suitable configurations also can be used. Also, the magnetic members 142, 144 can have any desired orientation relative to each other. In other words, while the illustrated arrangement features the first magnetic member 142 being positioned above the second magnetic member 144, other arrangements can place the first magnetic member 142 to any side of the second magnetic member 144 or can place the first magnetic member 142 below the second magnetic member 144.

In use, the illustrated frame assembly 102 generally defines the components associated with most eyewear: the brow bar 110, the bridge 114 and the temples 112. In some arrangements, such as the illustrated arrangement, the frame assembly 102 also comprises nose pads. To provide the lenses, a user slips the subframe assembly 104 behind the frame assembly 102 with the bridge 124 of the subframe assembly 104 slipping into the valley 132 while the lugs 134 are brought into abutment with the bosses 136. In such a position, the lugs 134 and the bridge 124 of the subframe assembly are generally concealed from the front of the eyewear and the lenses 120 that are positioned in the subframe assembly 104 appear to be part of the frame assembly 102. Nonetheless, when the user desires, the lenses 120 and the subframe assembly 104 can be lifted from behind the frame assembly 102 and an alternative set of lenses and subframe assembly can be placed in the frame assembly 102 or the lenses 120 and the subframe assembly 104 can be placed in an alternative frame assembly.

Figure 8:
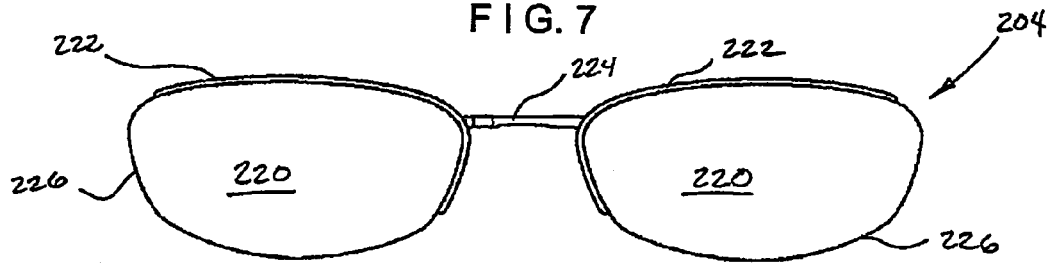
FIG. 8 is a front elevation view of the first pair of lenses of the second eyewear assembly.
Figure 9:
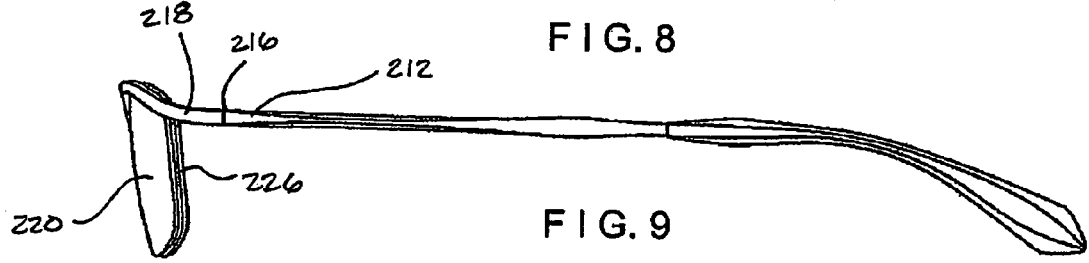
FIG. 9 is a side elevation of the second eyewear assembly as presented in FIG. 7.

With reference now to FIGS. 7-13, another arrangement of eyewear 200 generally comprises a frame assembly 202 and a lens subframe assembly 204 (see, for example, FIG. 8). The lens subframe assembly 204 preferably is mountable to the frame assembly 202 rearward of the frame assembly 202 such that at least a portion, and preferably the majority, of the lens subframe assembly 204 will be positioned between the frame assembly 202 and the head of a wearer.

The frame assembly 202 preferably comprises a brow bar 210, a pair of temples 212 (see FIG. 9) and a bridge 214. The brow bar 210 and the temples 212 can be connected in any suitable manner. In the arrangement illustrated in FIGS. 1 and 3, corresponding hinges 216 connect the temples 212 to the brow bar 210. More particularly, projections 218 extend from the brow bar 210 and the hinges 216 connect the brow bar 210 to the projections 218. Other suitable configurations can be used.

The bridge 214 extends in a region generally corresponding to the region between the eyes of a user. In the illustrated arrangement, the brow bar 210 is formed in two portions that are connected by the bridge 214. Other suitable configurations can be used, including but not limited to, a brow bar that forms at least a portion of, or, in some embodiments, the entirety of, the bridge 214. The above described components of the frame assembly 202 may be omitted or integrated with other components in some embodiments. For instance, the temples 212 can be omitted where other technology or other structure is used to secure the eyewear in position in the proximity of the user's eyes and the hinges 216 can be omitted in some configurations.

With reference now to FIG. 8, the lens subframe assembly 204 in the arrangement of FIGS. 7-13 comprises a pair of lenses 220. A brow bar 222 and a bridge 224 combine in the illustrated arrangement to define a rigid frame structure of the lens subframe assembly 204. Preferably, the brow bar 222 and the bridge 224 have a smaller profile in front view such that the brow bar 222 and the bridge 224 of the subframe assembly 204 can be substantially concealed by the brow bar 210 and the bridge 214 of the frame assembly 202, as shown by the hidden lines in FIG. 7.

The subframe assembly 204 preferably is of the rimless or semirimless variety. Such an arrangement increases the number of alternative frame constructions that can be used as the frame assembly while allowing the presence of the subframe assembly 204 to be masked. In the arrangement of FIGS. 7-13, the subframe assembly 204 comprises a lower nylon cord 226 that secures the lenses 220 to the brow bar 222. Other manners of securing the lenses 220 within or to the subframe assembly 204 can be used. For instance, in some arrangements, the lenses 220 can be secured with clamps, mechanical fasteners, threaded fasteners, encircling frames, eyewires or the like.

As described above, the subframe assembly 204 advantageously mounts to the frame assembly 202 in a manner that provides an appearance of integrated eyewear rather than an appearance of removably connected lenses and frames. As such, in the illustrated arrangement, the subframe assembly 204 mounts behind the frame assembly 202 and the mounting structures are positioned behind the frame assembly 202 such that the mounting structures are generally obscured from the sight of one viewing the frame assembly 202 from the front.

Figure 10:
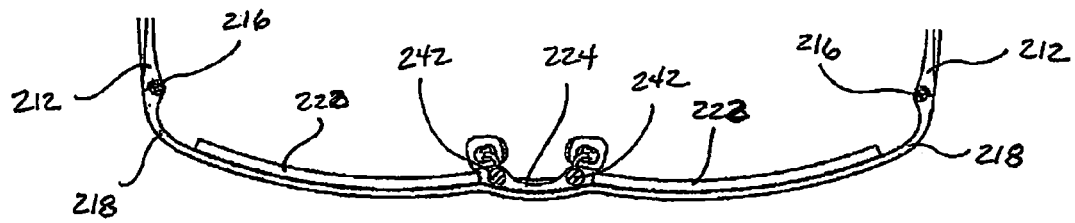
FIG. 10 is a top plan view of the second eyewear assembly as presented in FIG. 7.

With reference to FIG. 10, the bridge 224 of the subframe assembly 204 is positioned behind the bridge 214 of the frame assembly 202. A protrusion 230 extends rearward from the bridge 214 of the frame assembly 202. In some arrangements, more than one protrusion 230 can extend rearward from the bridge 214. The protrusion 230 can have any suitable configuration. Desirably, the protrusion 230 is configured to have a vertical dimension that is the same as or less than a vertical dimension of the bridge 214 of the frame assembly 202.

The protrusion 230 in the illustrated arrangement comprises a shelf-like structure with a lip 231 that extends slightly upward at a rear portion of the protrusion 230. Accordingly, the protrusion 230 can be said to define a hook. The lip 231 of the protrusion 230 is offset from the rear of the bridge 214 a distance that is slightly larger than the thickness of the bridge 224 of the subframe assembly 224. The bridge 224 of the subframe assembly 204 can be placed in a valley 232 defined between the lip 231 and the bridge 214 of the frame assembly 202. In a presently preferred configuration, the bridge 224 is supported by the protrusion 230.

Figure 11:
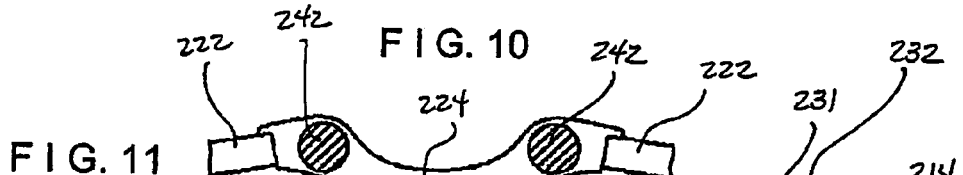
FIG. 11 is a top plan view of the first pair of lenses as presented in FIG. 7.
Figure 12:
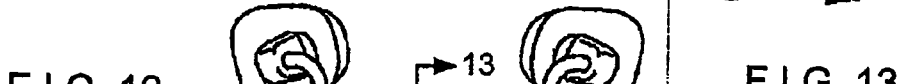
FIG. 12 is a top plan view of the first frame as presented in FIG. 7.
Figure 13:
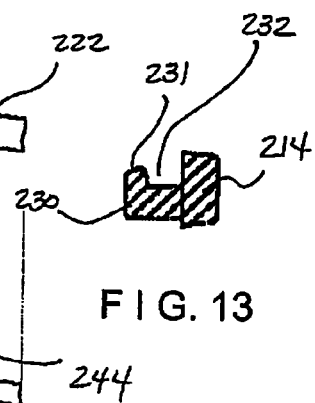
FIG. 13 is a section view taken along the line 13-13 in FIG. 12.
Figure 14:
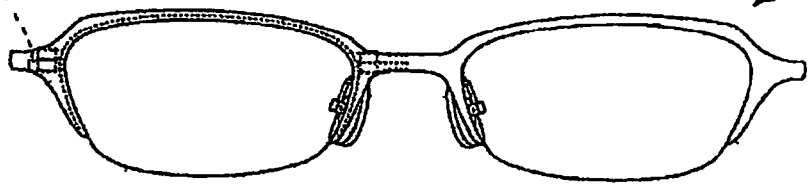
FIG. 14 is a front elevation view of a third eyewear assembly comprising a first frame and a first pair of lenses.
Figure 15:
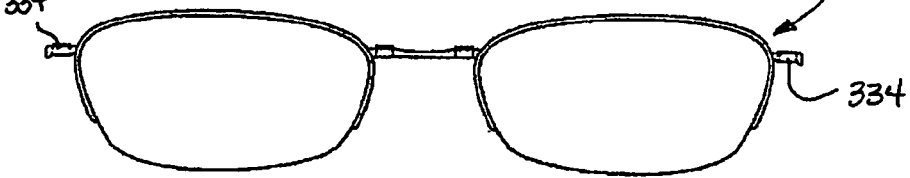
FIG. 15 is a front elevation view of the first pair of lenses of the third eyewear assembly.
Figure 16:
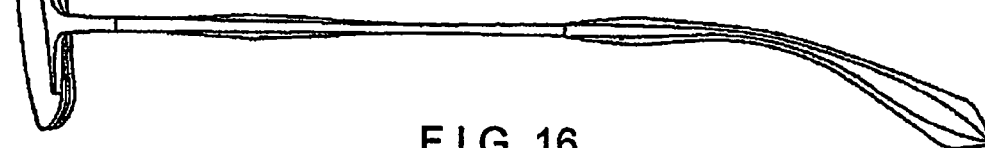
FIG. 16 is a side elevation of the third eyewear assembly as presented in FIG. 14.
Figure 17:
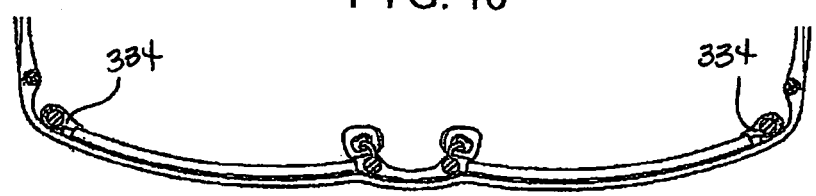
FIG. 17 is a top plan view of the third eyewear assembly as presented in FIG. 14.
Figure 18:
FIG. 18 is a perspective view of a portion of the first pair of lenses as presented in FIG. 14.
Figure 20:
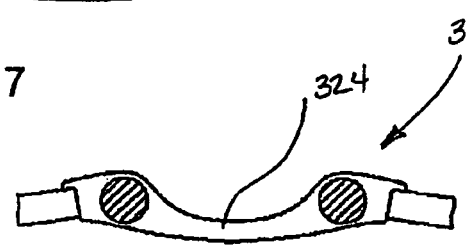
FIG. 20 is a top plan view of a portion of the first pair of lenses as presented in FIG. 14.
Figure 19:
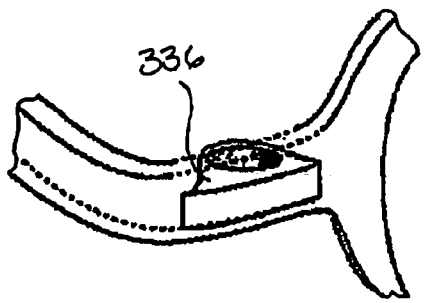
FIG. 19 is a perspective view of a portion of the first frame as presented in FIG. 14.
Figure 21:
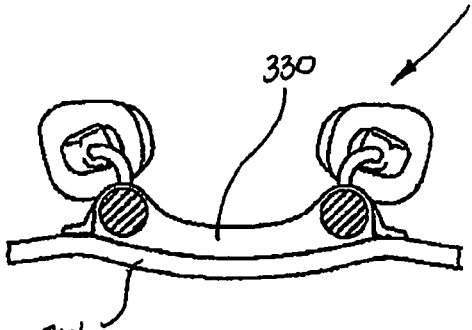
FIG. 21 is a top plan view of a portion of the first frame as presented in FIG. 14.

With continued reference to FIGS. 11 and 12, the bridge 224 of the illustrated subframe assembly 204 comprises interlocking components. While the lip 231 defines one type of interlocking component, the illustrated arrangement also features a magnetic interlock comprising at least one magnetic member. Even more particularly, the magnetic interlock is formed by placing a magnetic member in at least one of the bridge 214 and the protrusion 230. In some configurations, such as the illustrated configuration, at least one first magnetic member 242 is placed in the bridge 214 and at least one second magnetic member 244 is placed in the protrusion 230. In some configurations, one of the magnetic members 242, 244 may be slightly recessed and the other of the magnetic members 242, 244 may extend into the recess to define a mechanical interlock in addition to defining a magnetic interlock. Other suitable configurations also can be used. For instance, the bridge 224 can be connected to a bottom surface or side surface of the protrusion 230 or the bridge 214 in some configurations and the magnetic interlock can be suitably disposed for such a connection.

In use, the illustrated frame assembly 202 generally defines the components associated with most eyewear: the brow bar 210, the bridge 214 and the temples 212. To provide the lenses, a user slips the subframe assembly 204 behind the frame assembly 202 with the bridge 224 of the subframe assembly 204 slipping into the valley 232. In such a position, the bridge 224 of the subframe assembly is generally concealed from the front of the eyewear and the lenses 220 that are positioned in the subframe assembly 204 appear to be part of the frame assembly 202. Nonetheless, when the user desires, the lenses 220 and the subframe assembly 204 can be lifted from behind the frame assembly 202 and an alternative set of lenses and subframe assembly can be placed in the frame assembly 202 or the lenses 220 and the subframe assembly 204 can be placed in an alternative frame assembly.

With reference now to FIGS. 14-21, another configuration of eyewear 300 arranged and configured in accordance with certain features, aspects and advantages of the present invention is illustrated. As illustrated, this arrangement comprises a frame assembly 302 and a subframe assembly 304 connectable together in a manner that combines portions of the arrangements shown in and described with reference to FIGS. 1-6 and FIGS. 7-13.

As illustrated, a bridge 324 of the subframe assembly 304 is constructed to be mounted to a protrusion 330 that extends from a bridge 314 of the frame assembly 302. Thus, this interconnection between the frame assembly 302 and the subframe assembly 304 can be substantially as that described with respect to the eyewear 200 of FIGS. 7-13.

Moreover, as illustrated, the subframe assembly comprises lugs 334 and the frame assembly comprises bosses 336. These components can be substantially as that described with respect to the eyewear 100 of FIGS. 1-6.

Because these components have been described above, further is deemed unnecessary and duplicative. Where desired or appropriate, any of the variations described above also can be used with the embodiment of FIGS. 14-21.

Figure 22:
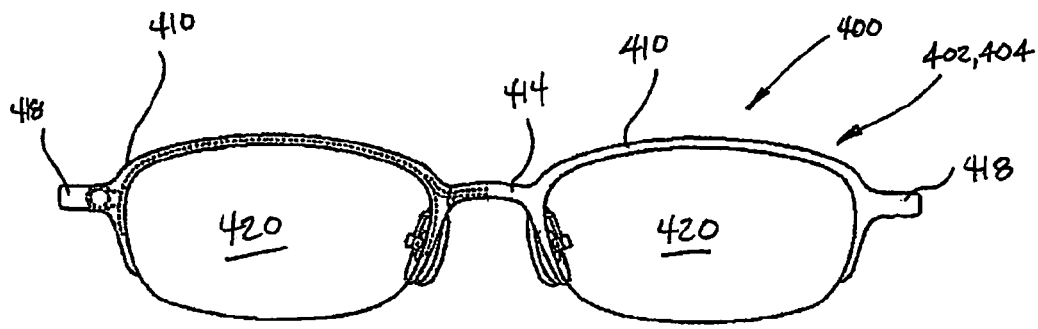
FIG. 22 is a front elevation view of a fourth eyewear assembly comprising a first frame and a first pair of lenses.
Figure 23:
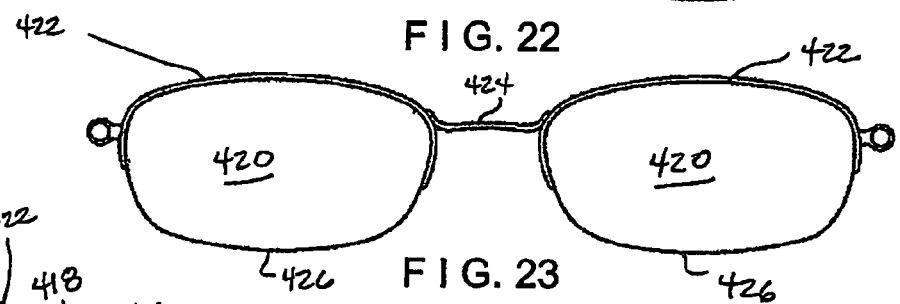
FIG. 23 is a front elevation view of the first pair of lenses of the fourth eyewear assembly.
Figure 24:
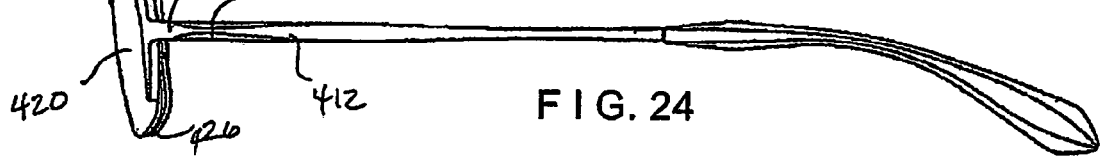
FIG. 24 is a side elevation of the fourth eyewear assembly as presented in FIG. 22.

With reference now to FIGS. 22-26, another arrangement of eyewear 400 generally comprises a frame assembly 402 and a lens subframe assembly 404 (see, for example, FIG. 23). The lens subframe assembly 404 preferably is mountable to the frame assembly 402 rearward of the frame assembly 402 such that at least a portion, and preferably the majority, of the lens subframe assembly 404 will be positioned between the frame assembly 402 and the head of a wearer.

The frame assembly 402 preferably comprises a brow bar 410, a pair of temples 412 (see FIG. 24) and a bridge 414. The brow bar 410 and the temples 412 can be connected in any suitable manner. In the arrangement illustrated in FIGS. 22 and 24, corresponding hinges 416 connect the temples 412 to the brow bar 410. More particularly, projections 418 extend from the brow bar 410 and the hinges 416 connect the brow bar 410 to the projections 418. Other suitable configurations can be used.

The bridge 414 extends in a region generally corresponding to the region between the eyes of a user. In the illustrated arrangement, the brow bar 410 is formed in two portions that are connected by the bridge 414. Other suitable configurations can be used, including but not limited to, a brow bar that forms at least a portion of, or, in some embodiments, the entirety of, the bridge 414. The above described components of the frame assembly 402 may be omitted or integrated with other components in some embodiments. For instance, the temples 412 can be omitted where other technology or other structure is used to secure the eyewear in position in the proximity of the user's eyes and the hinges 416 can be omitted in some configurations.

With reference now to FIG. 2, the lens subframe assembly 404 in the arrangement of FIGS. 22-26 comprises a pair of lenses 420. A brow bar 422 and a bridge 424 combine in the illustrated arrangement to define a rigid frame structure of the lens subframe assembly 404. Preferably, the brow bar 422 and the bridge 424 have a smaller profile in front view than the brow bar 410 and bridge 414 of the frame assembly 402 such that the brow bar 422 and the bridge 424 of the subframe assembly 404 can be substantially concealed by the brow bar 410 and the bridge 414 of the frame assembly 402, as shown by the hidden lines in FIG. 22.

The subframe assembly 404 preferably is of the rimless or semirimless variety. Such an arrangement increases the number of alternative frame constructions that can be used as the frame assembly 402 while allowing the presence of the subframe assembly 404 to be masked. In the arrangement of FIGS. 22-26, the subframe assembly 404 comprises a lower nylon cord 426 that secures the lenses 420 to the brow bar 422. Other manners of securing the lenses 420 within or to the subframe assembly 404 can be used. For instance, in some arrangements, the lenses 420 can be secured with clamps, mechanical fasteners, threaded fasteners, encircling frames, eyewires or the like.

As described above, the subframe assembly 404 advantageously mounts to the frame assembly 402 in a manner that provides an appearance of integrated eyewear rather than removably connected lenses and frames. As such, in the illustrated arrangement, the subframe assembly 404 mounts behind the frame assembly 402 and the mounting structures are positioned behind the frame assembly 402 such that the mounting structures are generally obscured from the sight of one viewing the frame assembly 402 from the front.

Figure 25:
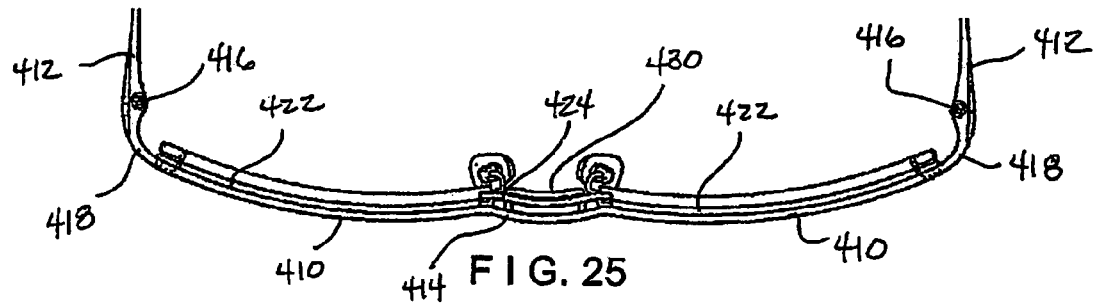
FIG. 25 is a top plan view of the fourth eyewear assembly as presented in FIG. 22.

With reference to FIG. 25, the bridge 424 of the subframe assembly 404 is positioned behind the bridge 414 of the frame assembly 402. A flange 430 extends rearward from the bridge 414 of the frame assembly 402. The flange 430 can have any suitable configuration and can be configured to cooperate with the bridge 424 as described above with respect to the eyewear 100 of FIGS. 1-6 and the eyewear 200 of FIGS. 7-13.

Figure 26:
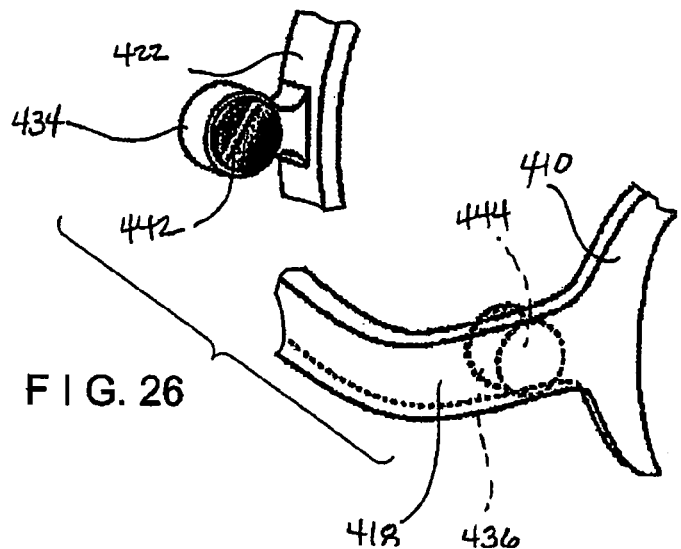
FIG. 26 is a perspective view of a portion of the fourth eyewear assembly as presented in FIG. 22 with the first pair of lenses shown removed from the first frame.
Figure 27:
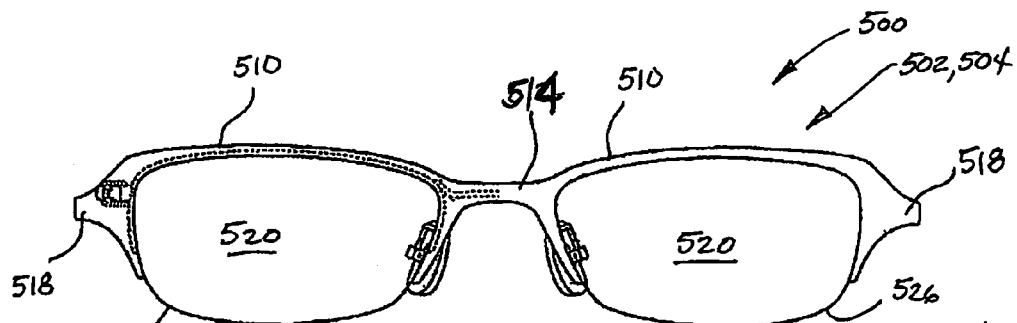
FIG. 27 is a front elevation view of a fifth eyewear assembly comprising a first frame and a first pair of lenses.

With reference to FIGS. 22 and 26, an outer portion of the subframe assembly 404 comprises lugs 434 that extend laterally outward from the brow bars 422. The lugs 434 are sized and configured to abut upon bosses 436 defined on the frame assembly 102. The bosses 436 can be integrally formed with the frame assembly 402 or, as in the illustrated arrangement, can be separate components that are secured to the frame assembly and project rearwardly therefrom. In the illustrated arrangement, the bosses 436 advantageously are positioned behind the projections 418 such that the bosses 436 are generally concealed as are the lugs 434 when the lugs 434 abut the bosses 436. The lugs 434 can be positioned in any desired orientation relative to the bosses 436 and interlocking configurations can be used to connect the two components.

In the illustrated arrangement, the bosses 436 generally comprise magnetic members that are positioned in the projections 418 and the bosses comprise interconnecting components together with the lugs 434. More particularly, in the illustrated arrangement, the eyewear 100 comprises a magnetic interlock comprising at least one magnetic member. Even more particularly, the magnetic interlock is formed at each lug and boss combination and comprises a first magnetic member 442 and a second magnetic member 444. In some configurations, one of the magnetic members 442, 444 may be slightly recessed and the other of the magnetic members 442, 444 may extend into the recess to define a mechanical interlock in addition to defining a magnetic interlock. Other suitable configurations also can be used.

In use, the illustrated frame assembly 402 generally defines the components associated with most eyewear: the brow bar 410, the bridge 414 and the temples 412. To provide the lenses 420, a user slips the subframe assembly 404 behind the frame assembly 402 with the bridge 424 of the subframe assembly 404 slipping into the valley defined by the flange 430 while the lugs 434 are brought into abutment with the bosses 436. In such a position, the lugs 434 and the bridge 424 of the subframe assembly 404 are generally concealed from the front of the eyewear and the lenses 420 that are positioned in the subframe assembly 404 appear to be part of the frame assembly 402. Nonetheless, when the user desires, the lenses 420 and the subframe assembly 404 can be lifted from behind the frame assembly 402 and an alternative set of lenses and subframe assembly can be placed in the frame assembly 402 or the lenses 420 and the subframe assembly 404 can be placed in an alternative frame assembly.

Figure 28:
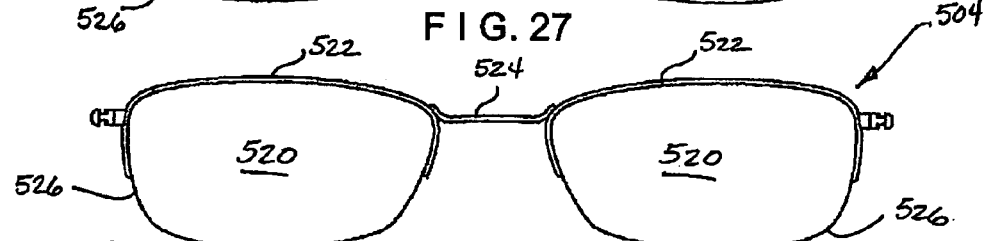
FIG. 28 is a front elevation view of the first pair of lenses of the fifth eyewear assembly.
Figure 29:
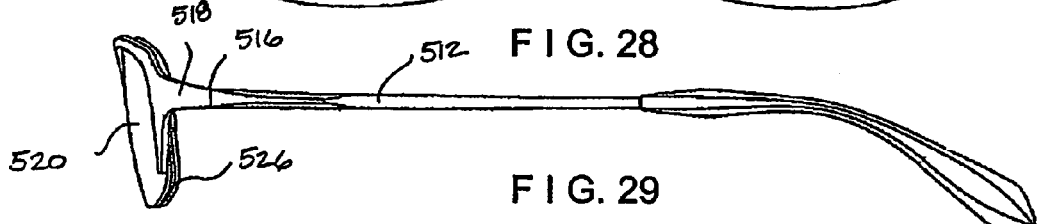
FIG. 29 is a side elevation of the fifth eyewear assembly as presented in FIG. 27.
Figure 30:
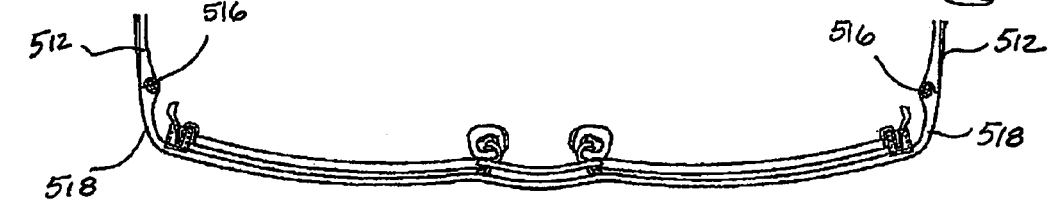
FIG. 30 is a top plan view of the fifth eyewear assembly as presented in FIG. 27.

With reference now to FIGS. 27-32B, another arrangement of eyewear 500 generally comprises a frame assembly 502 and a lens subframe assembly 504 (see, for example, FIG. 28). The lens subframe assembly 504 preferably is mountable to the frame assembly 502 rearward of the frame assembly 502 such that at least a portion, and preferably the majority, of the lens subframe assembly 504 will be positioned between the frame assembly 502 and the face of a wearer.

The frame assembly 502 preferably comprises a brow bar 510, a pair of temples 512 (see FIG. 29) and a bridge 514. The brow bar 510 and the temples 512 can be connected in any suitable manner. In the arrangement illustrated in FIGS. 29 and 30, corresponding hinges 516 connect the temples 512 to the brow bar 510. More particularly, projections 518 extend from the brow bar 510 and the hinges 516 connect the brow bar 510 to the projections 518. Other suitable configurations can be used.

The bridge 514 extends in a region generally corresponding to the region between the eyes of a user. In the illustrated arrangement, the brow bar 510 is formed in two portions that are connected by the bridge 514. Other suitable configurations can be used, including but not limited to, a brow bar that forms at least a portion of, or, in some embodiments, the entirety of, the bridge 514. The above described components of the frame assembly 502 may be omitted or integrated with other components in some embodiments. For instance, the temples 512 can be omitted where other technology or other structure is used to secure the eyewear in position in the proximity of the user's eyes and the hinges 516 can be omitted in some configurations.

With reference now to FIG. 28, the lens subframe assembly 504 in the arrangement of FIGS. 27-32B comprises a pair of lenses 520. A brow bar 522 and a bridge 524 combine in the illustrated arrangement to define a rigid frame structure of the lens subframe assembly 504. Preferably, the brow bar 522 and the bridge 524 have a smaller profile in front view than the brow bar 510 and the bridge 514 of the frame assembly 502 such that the brow bar 522 and the bridge 524 of the subframe assembly 504 can be substantially concealed by the brow bar 510 and the bridge 514 of the frame assembly 502, as shown by the hidden lines in FIG. 27.

The subframe assembly 504 preferably is of the rimless or semirimless variety. Such an arrangement increases the number of alternative frame constructions that can be used as the frame assembly while allowing the presence of the subframe assembly 504 to be masked. In the arrangement of FIGS. 27-32B, the subframe assembly 504 comprises a lower nylon cord 526 that secures the lenses 520 to the brow bar 522. Other manners of securing the lenses 520 within or to the subframe assembly 504 can be used. For instance, in some arrangements, the lenses 520 can be secured with clamps, mechanical fasteners, threaded fasteners, encircling frames, eyewires or the like.

As described above, the subframe assembly 504 advantageously mounts to the frame assembly 502 in a manner that provides an appearance of integrated eyewear rather than an appearance of removably connected lenses and frames. As such, in the illustrated arrangement, the subframe assembly 504 mounts behind the frame assembly 502 and the mounting structures are positioned behind the frame assembly 502 such that the mounting structures are generally obscured from the sight of one viewing the frame assembly 502 from the front.

With reference to FIG. 10, the bridge 524 of the subframe assembly 504 is positioned behind the bridge 514 of the frame assembly 502. In the illustrated arrangement, the bridge 524 of the subframe assembly 504 is not directly supported by any structure associated with the frame assembly 502. In other arrangements, the bridge 524 may be supported.

Figure 31:
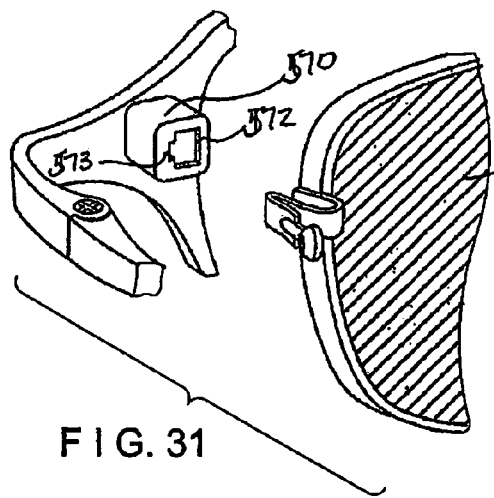
FIG. 31 is a perspective view of a portion of the fifth eyewear assembly as presented in FIG. 27 with the first pair of lenses shown removed from the first frame.
Figure 32A:
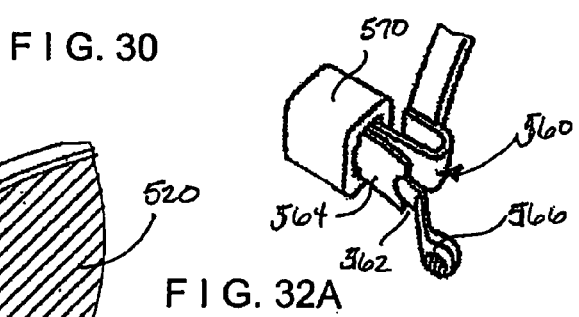
FIGS. 32A and 32B are a perspective view of a portion of the fifth eyewear assembly as presented in FIG. 27 with the first pair of lenses shown installed on the first frame.
Figure 32B:
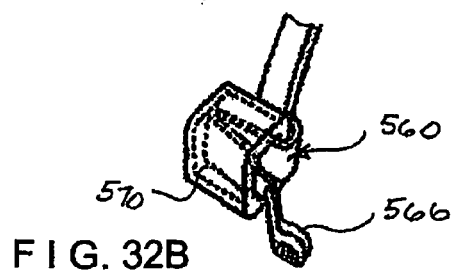
Figure 33:
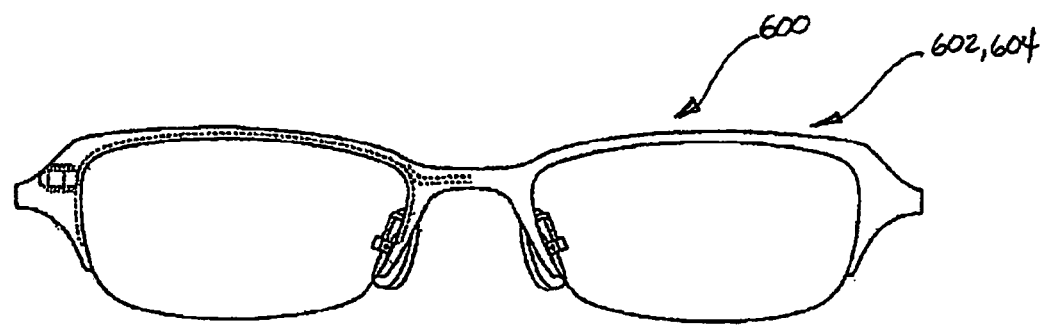
FIG. 33 is a front elevation view of a sixth eyewear assembly comprising a first frame and a first pair of lenses.
Figure 34:
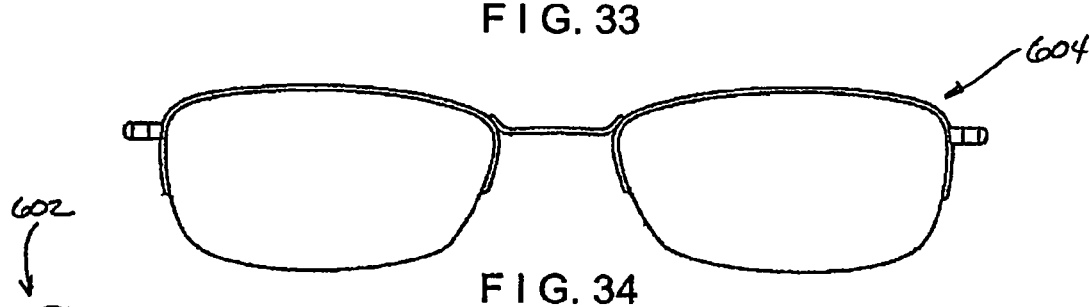
FIG. 34 is a front elevation view of the first pair of lenses of the sixth eyewear assembly.
Figure 35:
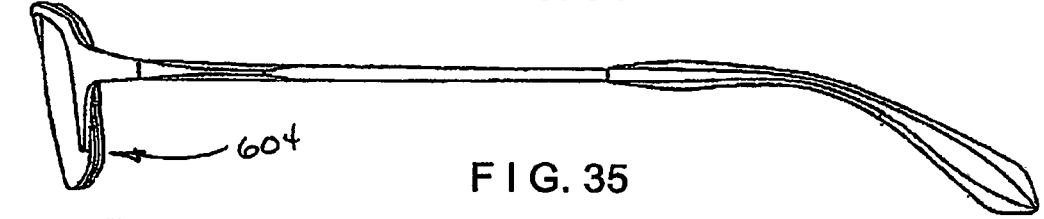
FIG. 35 is a side elevation of the sixth eyewear assembly as presented in FIG. 33.
Figure 36:
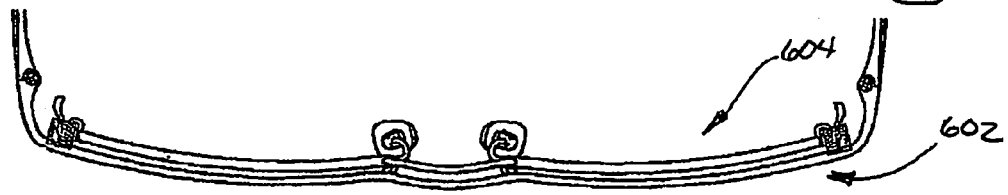
FIG. 36 is a top plan view of the sixth eyewear assembly as presented in FIG. 33.
Figure 37:
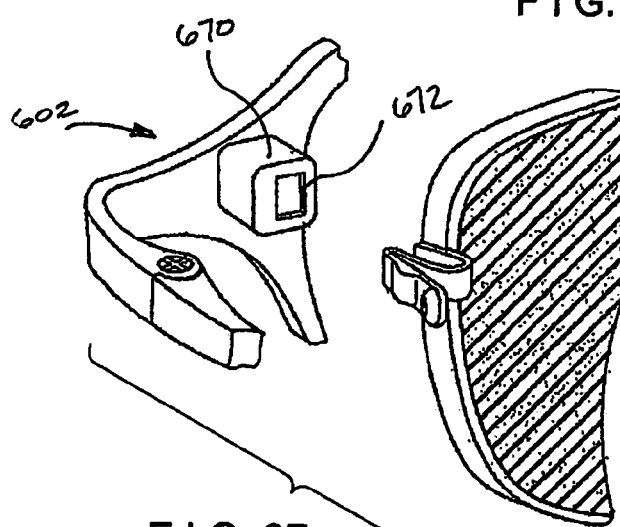
FIG. 37 is a perspective view of a portion of the sixth eyewear assembly as presented in FIG. 33 with the first pair of lenses shown removed from the first frame.
Figure 38:
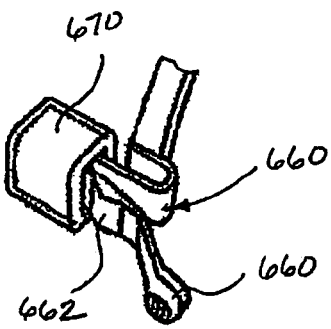
FIG. 38 is a perspective view of a portion of the sixth eyewear assembly as presented in FIG. 33 with the first pair of lenses shown installed on the first frame.

With reference to FIGS. 31, 32A and 32B, the subframe assembly 504 generally comprises a locking tab 560 that extends forward from the subframe assembly 504. The illustrated tab 560 comprises an N-shaped configuration but can comprise any suitable configuration in other arrangements, including a V-shape or a W-shape configuration. The tab 560 also comprises a clip portion 562 that is defined between a main body 564 and a finger hold 566 of the tab.

The frame assembly 502 preferably comprises a receptacle 570. The receptacle 570 defines an aperture 572 sized and configured to accept at least a portion of the tab 560. The illustrated aperture 572 is generally square or rectangular with a slot 573 defined along one side. As illustrated in FIG. 32B, the slot 573 receives the clip portion 562 of the tab 560 when the tab 560 is fully positioned within the receptacle 570. In other words, a shoulder that is defined at approximately the clip portion 562 is captured within the receptacle while the clip portion 562 is positioned in the slot 573 of the aperture 572 with the finger hold 566 protruding from the receptacle 570.

Thus, in the illustrated arrangement, the tab 560 and the receptacle 570 define a mechanical interlock. The tab 560 can be positioned on either one of the frame assembly 502 and the subframe assembly 504 while the receptacle 570 is positioned on the other. Positioning the tab 560 on the subframe assembly 504, however, allows easier removal of the subframe assembly 504 from the frame assembly 502.

In use, the illustrated frame assembly 502 generally defines the components associated with most eyewear: the brow bar 510, the bridge 514 and the temples 512. To provide the lenses, a user slips the subframe assembly 504 behind the frame assembly 502 with the tab 560 being inserted into the receptacle 570 of the frame assembly 502. In such a position, the bridge 524 of the subframe assembly 504 is generally concealed from the front of the eyewear and the lenses 520 that are positioned in the subframe assembly 504 appear to be part of the frame assembly 502. Nonetheless, when the user desires, the lenses 520 and the subframe assembly 504 can be removed from behind the frame assembly 502 and an alternative set of lenses and subframe assembly can be placed in the frame assembly 502 or the lenses 520 and the subframe assembly 504 can be placed in an alternative frame assembly.

With reference now to FIGS. 33-38, another configuration of eyewear 600 arranged and configured in accordance with certain features, aspects and advantages of the present invention is illustrated. As illustrated, this arrangement comprises a frame assembly 602 and a subframe assembly 604 connectable together in a manner similar to that shown in FIGS. 27-32B. The portions that are the same as the arrangements described above will not be described in this embodiment.

As illustrated, a tab 660 and a receptacle 670 provide a mechanical interlock. The tab 660 differs from the tab 560 described above in that the tab 660 comprises a bulge 662 that is received within the receptacle 670 to lock the tab 660 into the receptacle. As such, the receptacle can have a generally square or rectangular aperture 672 without the need for a slot such as that shown in FIG. 31. The bulge 662 can be pushed into the receptacle 670 through the aperture 672. To remove the tab 660 from the receptacle, a finger hold 666 can be depressed which results in movement of the bulge into a position that allows the tab 660 to be withdrawn from the receptacle 670.

Figure 44:
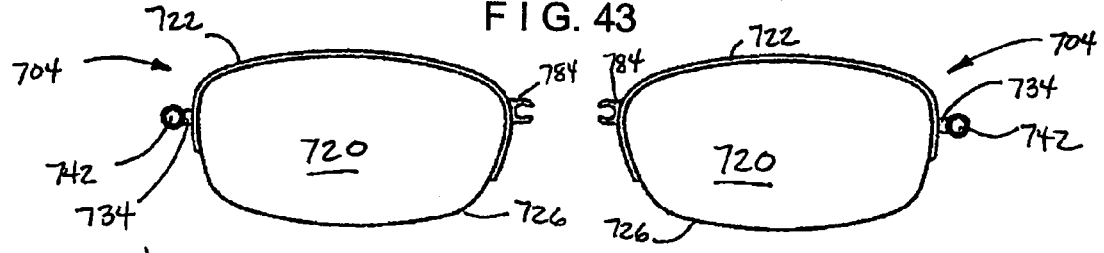
FIG. 44 is a front elevation view of the pair of first lenses of the seventh eyewear assembly.
Figure 45:
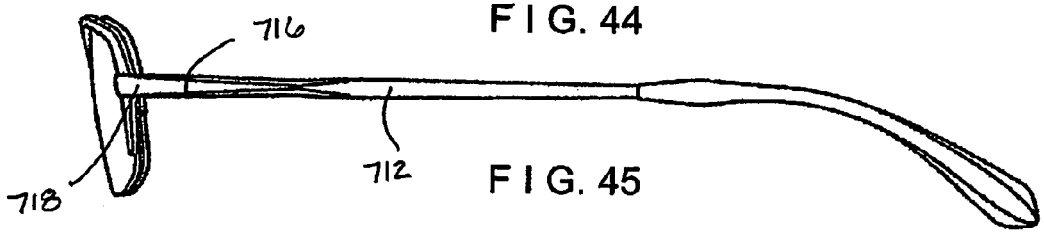
FIG. 45 is a side elevation view of the seventh eyewear assembly.
Figure 46:
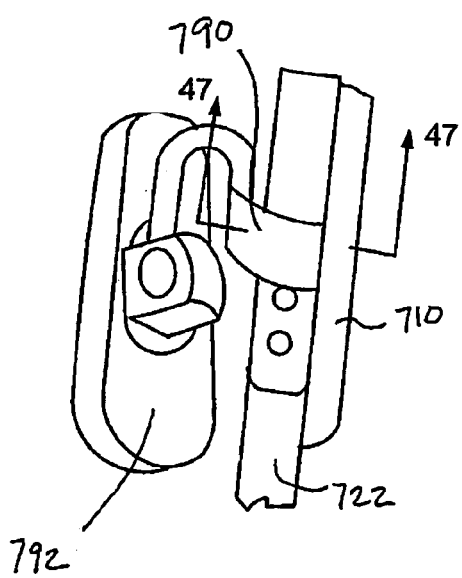
FIG. 46 is a perspective view of a portion of the seventh eyewear.

With reference now to FIGS. 39-48, another arrangement of eyewear 700 generally comprises a frame assembly 702 and a pair of lens subframe assemblies 704 (see FIG. 44). Each of the lens subframe assemblies 704 preferably is mountable to the frame assembly 702 rearward of the frame assembly 702 such that at least a portion, and preferably the majority, of the lens subframe assembly 704 will be positioned between the frame assembly 702 and the eye of a wearer.

The frame assembly 702 preferably comprises a brow bar 710, a pair of temples 712 (see FIG. 40) and a bridge 714. The brow bar 710 and the temples 712 can be connected in any suitable manner. In the arrangement illustrated in FIG. 40, corresponding hinges 716 connect the temples 712 to the brow bar 710. More particularly, projections 718 extend from the brow bar 710 and the hinges 716 connect the brow bar 710 to the projections 718. Other suitable configurations can be used.

The bridge 714 extends in a region generally corresponding to the region between the eyes of a user. In the illustrated arrangement, the brow bar 710 is formed in two portions that are connected by the bridge 714. Other suitable configurations can be used including but not limited to a brow bar that forms at least a portion, or, in some embodiments, the entirety of, the bridge 714. The above described components of the frame assembly 702 may be omitted or integrated with other components in some embodiments. For instance, the temples 712 can be omitted where other technology or other structure is used to secure the eyewear in position in the proximity of the user's eyes and the hinges 716 can be omitted in some configurations.

With reference now to FIGS. 41A-42B, each of the lenses 720 is secured to the frame assembly 702 with a separate lens subframe assembly 704. Thus, the lens subframes do not comprise a bridge in this arrangement. The lens subframe assembly 704 comprises a version of a brow bar 722 to which the lens 720 is secured. The brow bar 722 desirably has a smaller profile in front view than the brow bar 710 of the frame assembly 702 such that the brow bar 722 of the subframe assembly 704 can be substantially concealed by the brow bar 710 of the frame assembly 702, as shown by the hidden lines in FIG. 39.

The subframe assemblies 704 preferably are of the rimless or semirimless variety. Such an arrangement increases the number of alternative frame constructions that can be used as the frame assembly while allowing the presence of the subframe assemblies 704 to be masked. In the one configuration, the subframe assembly 704 comprises a lower nylon cord 726 that secures the lenses 720 to the brow bar 722 of the subframe assembly 704. Other manners of securing the lenses 720 within or to the subframe assembly 704 can be used. For instance, in some arrangements, the lenses 720 can be secured with clamps, mechanical fasteners, threaded fasteners, encircling frames, eyewires or the like.

As described above, the subframe assembly 704 advantageously mounts to the frame assembly 702 in a manner that provides an appearance of integrated eyewear rather than an appearance of removably connected lenses and frames. As such, in the illustrated arrangement, the subframe assembly 704 mounts behind the frame assembly 702 and the mounting structures are positioned behind the frame assembly 702 such that the mounting structures are generally obscured from the sight of one viewing the frame assembly 702 from the front.

Figure 39:
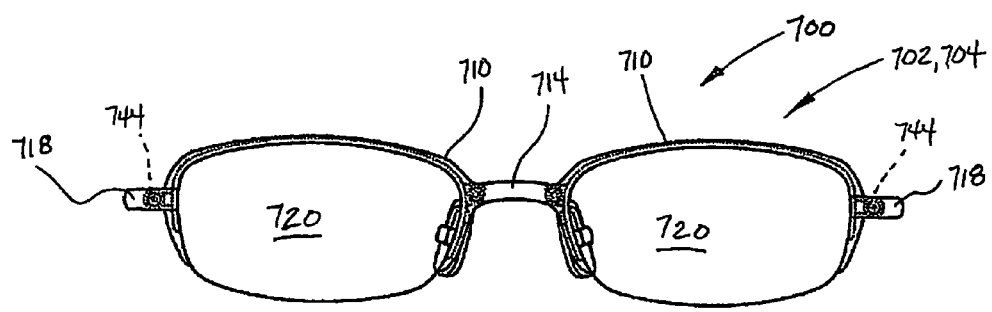
FIG. 39 is a front elevation view of a seventh eyewear assembly comprising a first frame and a pair of first lenses.

With reference to FIG. 39, the illustrated subframe assemblies 704 are secured to the frame assembly 702 at in two locations. In one arrangement, such as the illustrated arrangement, the subframe assemblies 704 are secured at both lateral ends of the subframe assemblies 704. In a presently preferred configuration, one end of the subframe assembly 704 is secured by a mechanical interlock while the other end is secured by a magnetic interlock.

With reference now to FIGS. 41A-42B, one form of the mechanical interlock between the subframe assembly 704 and the frame assembly 702 will be described. As illustrated, the frame assembly comprises an oblong post 780. The oblong post 780 extends rearward from the frame assembly 702 and preferably has a major diameter that extends generally vertically and a minor diameter that extends generally laterally. Other shapes and configurations of the post can be used and the post can be placed on the subframe assembly 704 in some configurations. Moreover, in one preferred arrangement, an enlarged head 781 (shown in dashed lines in FIGS. 41A and 41B) is provided on the post 780 such that a major portion of the post 780 has a smaller cross-section than the head. In some particularly advantageous embodiments, the post comprises a magnetic member.

Figure 41A:
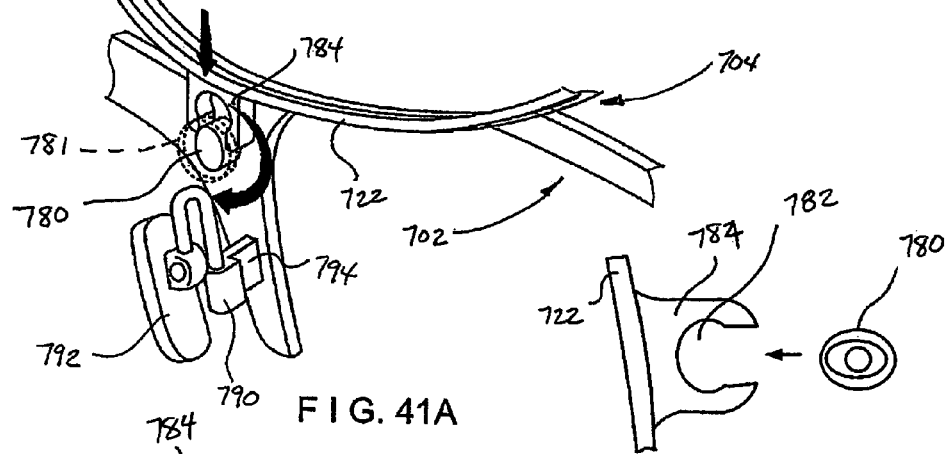
FIG. 41A is a perspective view of one of the first lenses being connected to the first frame of the seventh eyewear assembly as presented in FIG. 39.
Figure 42A:
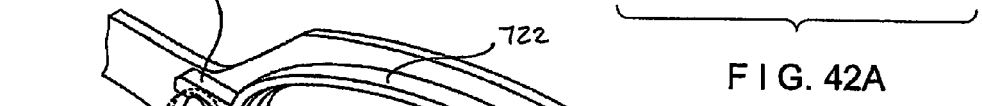
FIGS. 42A and 42B illustrate in front view the fitting of the lens to the frame shown in FIGS. 41A and 41B.
Figure 41B:
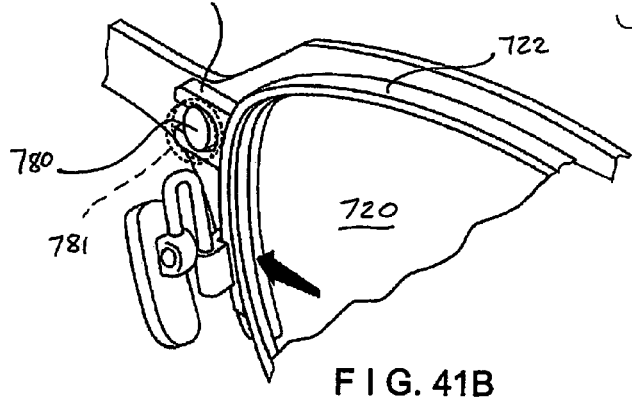
FIG. 41B is a perspective view of the first lens showing in FIG. 41A after being rotated into position on the first frame of the seventh eyewear assembly as presented in FIG. 39.
Figure 42B:
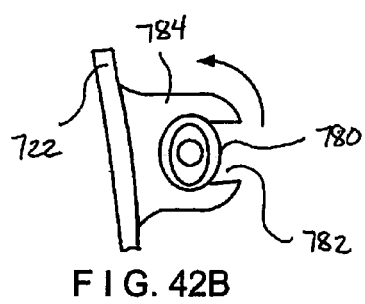
Figure 43:
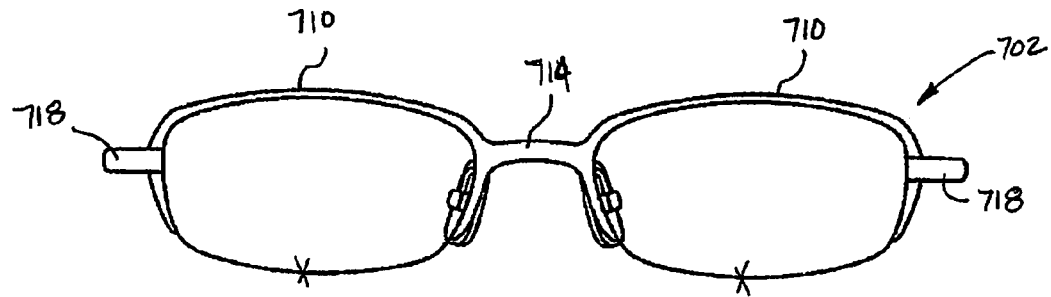
FIG. 43 is a front elevation view of the first frame of the seventh eyewear assembly as presented in FIG. 39.

The subframe assembly 704 preferably comprises a slot 782 that is defined within an ear 784. In some particularly advantageous embodiments, the ear 784 comprises a magnetic member that can be magnetically secure to the post 780. A portion of the slot 782 preferably is oblong such that the post 780 can be inserted and the lens rotated into a locked position. As with the post, other configurations can be used and the slot can be disposed on the frame assembly 702 in some configurations. As shown in FIG. 41A, the slot 782 can be slid onto the post 780 and the subframe assembly 704 can be rotated to lock the subframe assembly 704 to the frame assembly 702, as shown in FIG. 41B.

Figure 40:
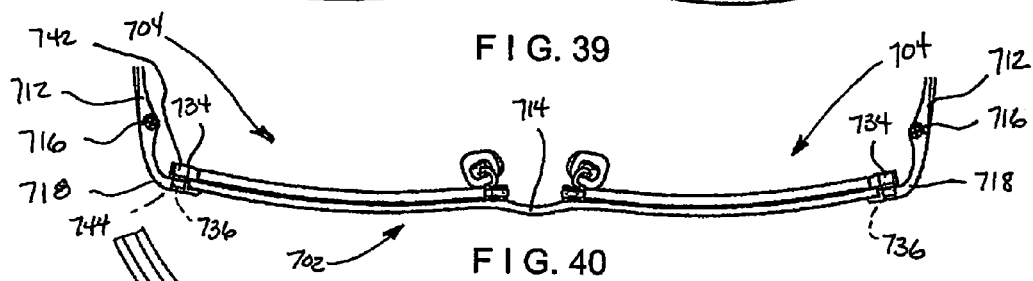
FIG. 40 is a front elevation view of the pair of first lenses of the seventh eyewear assembly.
Figure 48:
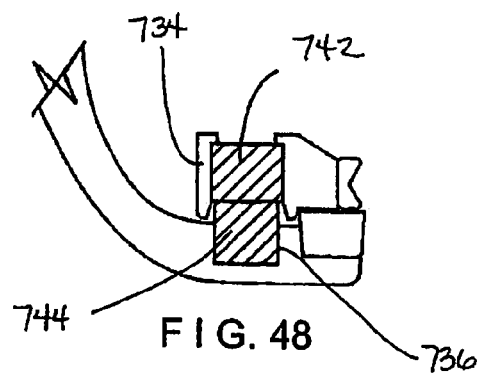
FIG. 48 is a partially sectioned view of a portion of the seventh eyewear assembly showing a connection between one of the first lenses and the first frame.

With reference to FIGS. 39, 40 and 48, lugs 734 can be an outer portion of the illustrated subframe assembly 704 comprises lugs 734 that extend laterally outward from the brow bars 722. The lugs 734 are sized and configured to abut upon bosses 736 defined on the frame assembly 702. The bosses 736 can be integrally formed with the frame assembly 702 or can be separate components that are secured to the frame assembly 702. In the illustrated arrangement, the bosses 736 advantageously are positioned behind the projections 718 such that the bosses 736 are generally concealed as are the lugs 734 when the lugs 734 abut the bosses 736.

In the illustrated arrangement, the bosses 736 generally comprise magnetic members that are positioned in the projections 718 and the bosses 736 comprise interconnecting components together with the lugs 734. More particularly, in the illustrated arrangement, the eyewear 700 comprises a magnetic interlock comprising at least one magnetic member. Even more particularly, the magnetic interlock is formed at each lug and boss combination and comprises a first magnetic member 742 and a second magnetic member 744. In some configurations, one of the magnetic members 742, 744 may be slightly recessed and the other of the magnetic members 742, 744 may extend into the recess to define a mechanical interlock in addition to defining a magnetic interlock. Other suitable configurations also can be used. Moreover, the post 780 and the ear 784 can be interchanged in location with the boss 736 and the lug 734 in some applications.

Figure 47:
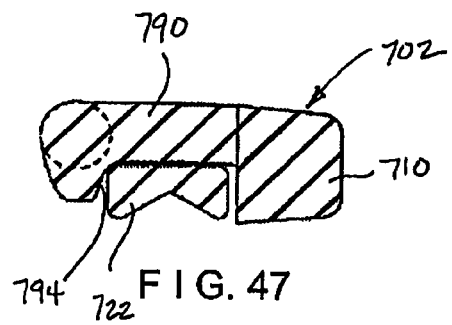
FIG. 47 is a sectioned view taken along the line 47-47 in FIG. 46.

With reference to FIGS. 41A and 47, a post 790 of the nose piece 792 can comprise a reduced portion 794. The reduced portion 794 can accommodate a portion of either the lens 720 or the subframe assembly 704 such that the reduced portion 794 can serve to locate the lens 720 relative to the frame assembly 702 and provide another member that helps lock the subframe assembly 704 in position.

In use, the illustrated frame assembly 702 generally defines the components associated with most eyewear: the brow bar 710, the bridge 714 and the temples 712. To provide the lenses, a user slips the subframe assembly 704 behind the frame assembly 702 and slips the post 780 into the slot 782 of the ear 784. The subframe assembly 704 is then rotated about 90 degrees and the lug 734 is brought into engagement with the boss 736 such that the subframe assembly 704 is supported in a generally locked position relative to the frame assembly 702. The other lens 720 can be installed to the frame assembly 702 in the same manner. In such a position, the subframe assembly 704 is generally concealed from the front of the eyewear and the lenses 720 that are positioned in the subframe assembly 704 appear to be part of the frame assembly 702. Nonetheless, when the user desires, the lenses 720 and the subframe assemblies 704 can be removed from behind the frame assembly 702 and an alternative set of lenses and subframe assemblies can be placed in the frame assembly 702 or the lenses 720 and the subframe assemblies 704 can be placed in an alternative frame assembly.

With reference now to FIGS. 49-52, an eyewear assembly 800 is shown. The eyewear assembly 800 features a frame assembly 802 to which a subframe assembly 804 can be mounted. Because of the similarity to the arrangements described above, many of the base components of the frame assembly 802 and the subframe assembly 804 will not be described in further detail. Rather, reference may be had to the descriptions set forth above for such components. For instance, the frame assembly 802 is very similar to the frame assembly 702 described with reference to FIGS. 39-48.

Figure 49:
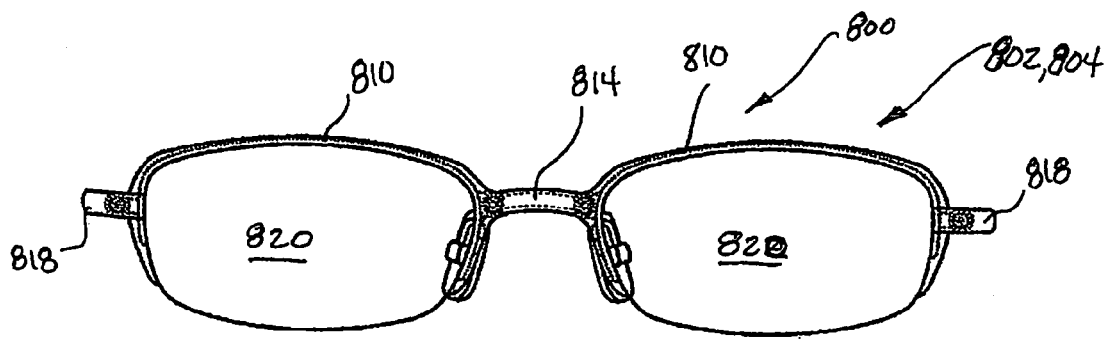
FIG. 49 is a front elevation view of an eighth eyewear assembly comprising a first frame and a first pair of lenses.
Figure 50:
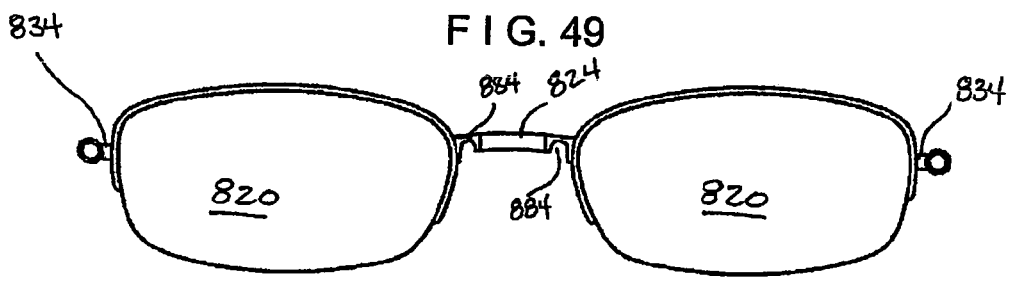
FIG. 50 is a front elevation view of the first pair of lenses of the eighth eyewear assembly.
Figure 51:
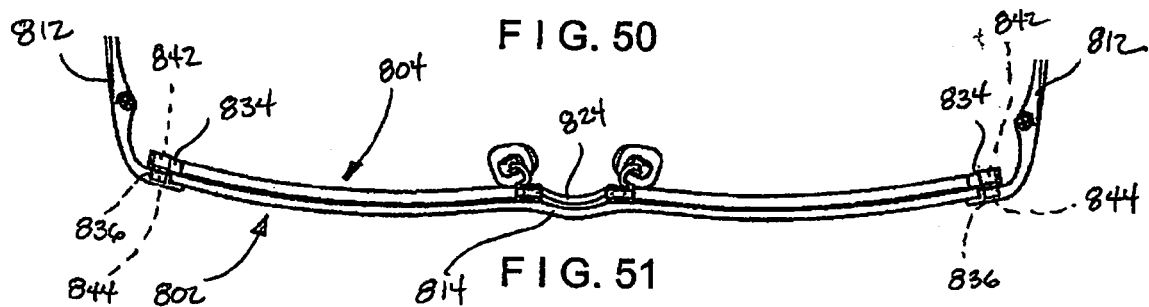
FIG. 51 is a top plan view of the eighth eyewear assembly.
Figure 52:
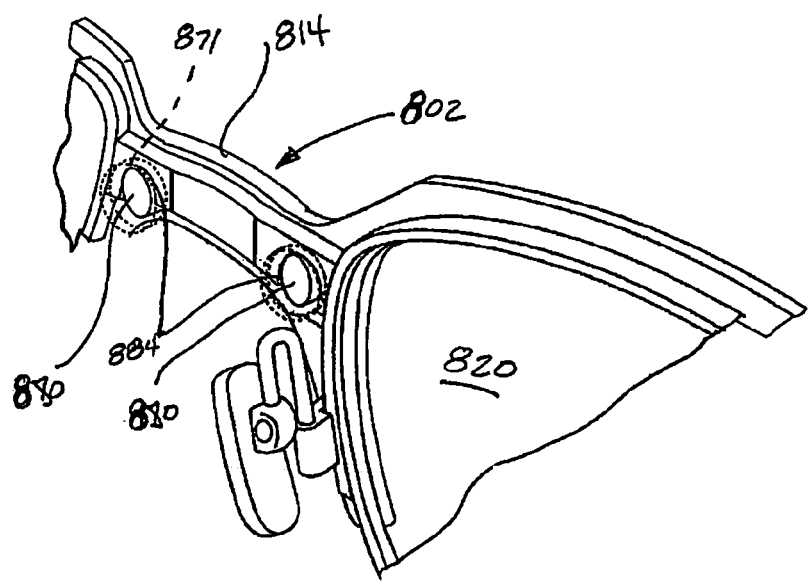
FIG. 52 is a perspective view of a portion of the eighth eyewear assembly.

A primary difference between the prior embodiment and the embodiment of FIGS. 49-50 is the use of a single subframe assembly 804. The subframe assembly 804 comprises a bridge 824 that connects a pair of brow bars 822. The bridge 824 in the illustrated arrangement comprises a pair of slots 882 that can receive a corresponding pair of posts 870. The posts can be configured in any suitable manner, including the manners set forth in the embodiment above. The slots 882 and the posts 870 define a mechanical interlock between the frame assembly 802 and the subframe assembly 804.

As with the arrangement described directly above, a magnetic interlock also is provided. Any suitable construction can be used and, in the illustrated arrangement, the magnetic interlock is the same as the arrangement in the embodiment described directly above. Accordingly, a pair of lugs 834 is positioned on an outer portion of the illustrated subframe assembly 804. The lugs 834 are sized and configured to abut upon bosses 836 defined on the frame assembly 802. The bosses 836 can be integrally formed with the frame assembly 802 or can be separate components that are secured to the frame assembly 802. In the illustrated arrangement, the bosses 836 advantageously are positioned behind projections 818 such that the bosses 836 are generally concealed as are the lugs 834 when the lugs 834 abut the bosses 836.

In the illustrated arrangement, the bosses 836 generally comprise magnetic members that are positioned in the projections 818 and the bosses 836 comprise interconnecting components together with the lugs 834. More particularly, in the illustrated arrangement, the eyewear 800 comprises a magnetic interlock comprising at least one magnetic member. Even more particularly, the magnetic interlock is formed at each lug and boss combination and comprises a first magnetic member 842 and a second magnetic member 844. In some configurations, one of the magnetic members 842, 844 may be slightly recessed and the other of the magnetic members 842, 844 may extend into the recess to define a mechanical interlock in addition to defining a magnetic interlock. Other suitable configurations also can be used.

Moreover, the posts 880 and slots 884 can be interchanged in location with the boss 836 and the lug 834 in some applications.

In use, the illustrated frame assembly 802 generally defines the components associated with most eyewear: the brow bar 810, the bridge 814 and the temples 812. To provide the lenses 820, a user slips the subframe assembly 804 behind the frame assembly 802 with the slots 884 being slid onto the posts 880 of the frame assembly 502. In such a position, the bridge 824 of the subframe assembly 804 is generally concealed from the front of the eyewear and the lenses 820 that are positioned in the subframe assembly 804 appear to be part of the frame assembly 802. Nonetheless, when the user desires, the lenses 820 and the subframe assembly 804 can be removed from behind the frame assembly 802 and an alternative set of lenses and subframe assembly can be placed in the frame assembly 802 or the lenses 820 and the subframe assembly 804 can be placed in an alternative frame assembly.

In an alternate embodiment shown in FIG. 56-59, the invention may have eyewear 900 generally comprised of a frame assembly 902 and a subframe assembly containing a lens 904. The lens subframe assembly 904 is preferably mountable to the frame assembly 902 rearward of the frame assembly 902 such that at least a portion of the lens subframe assembly 904 will be positioned between the frame assembly 902 and the eye of a wearer. In this embodiment, both the frame assembly and the subframe assembly have lenses 903 and 905 respectively. Any suitable lens or lenses may be used in either the frame or subframe assembly as may be desired by the wearer, including, but not limited to, vision correcting lenses, tinted lenses for sun protection or aesthetic reasons, magnifying lenses for reading or other uses and specialized lenses for computer use In this embodiment, the subframe assembly 904 may be mounted to the frame assembly 902 by any of the means disclosed herein.

Similarly, in another alternative embodiment shown in FIGS. 60-63, there is a frame assembly 1000 that has mountable thereon a first subframe assembly containing a lens 1001 and a second subframe assembly containing a lens 1002. Each of the lens subframe assemblies have a lens 1003 that may be secured to a brow bar 1004. Each of the subframe assemblies 1001 and 1002 are adapted to be mounted onto the frame assembly so that one or both of the subframe assemblies may be replaced with other subframe assemblies. For example, the frame assembly 1000, may have a subframe with clear lenses and the user may desire to replace the subframes with other subframe assemblies that are better adapted for reading. As noted above, any suitable lens or lenses may be used in either the frame or subframe assemblies. The subframe assemblies may be secured to the frame assembly by any of the means disclosed herein In one embodiment, an outer portion of each subframe assembly may have lugs that extend laterally outward from the brow bar. The lugs are sized and configured to abut upon bosses 1005 defined on the frame assembly. The bosses can be integrally formed with the frame assembly or, as illustrated herein, can be separate components that are secured to the frame assembly. The bosses preferably support the lugs such that the frame assembly 1000 supports the outer portions of each subframe assembly 1001 and 1002. The subframe assemblies may be secure to the frame assembly by any of the arrangements shown herein.

FIGS. 64 through 70 show various means whereby the position of at least one of a pair of magnetic members may be adjusted or changed to accommodate various thicknesses of lenses contained within the frame and subframe assemblies so that the distance between the frame and subframe may be increased as desired to keep the lenses from scratching while maintaining a proper distance between said pair of magnetic members so that the magnetic attraction between said pair of magnetic members is sufficient to help secure the subframe to the frame. This is especially useful when certain types of vision correcting lenses are contained in the frame or subframe assembly that extend behind the frame assembly or in front of the subframe assembly or both.

Figure 64:
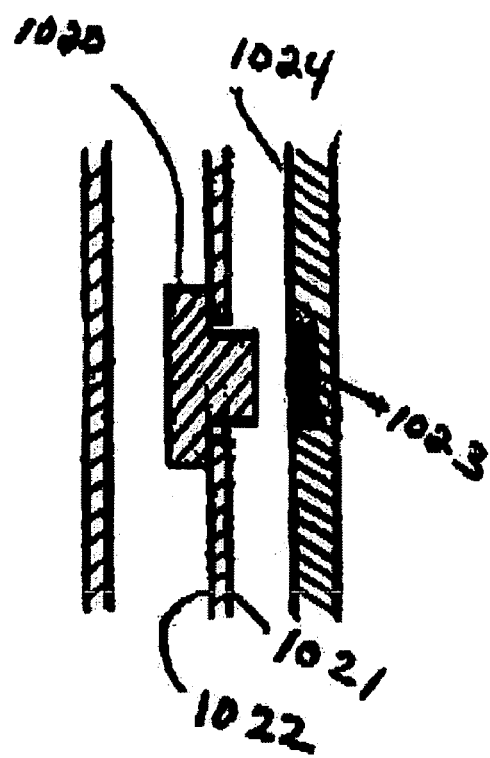
FIG. 64 shows a means for connecting an eyewear assembly to a subframe assembly.

FIG. 64 shows an alternative means of securing a frame to a subframe. In this embodiment, there is a magnetic member 1020 on the outside surface 1021 of at least one side of a subframe assembly 1022 and a magnetic member 1023 on the corresponding inside surface 1024 of the frame assembly. At least one of the magnetic members is a magnet. The remaining magnetic member is a magnet or a material that is attracted to a magnet. The magnet may be on either the frame or the subframe assembly. At least one magnetic member preferably extends outwardly a short distance from at least one of the surfaces of the frame or the subframe assembly. This can provide a better magnetic connection between magnetic members when used with certain thicknesses of lenses contained in the frame or subframe.

Figure 65:
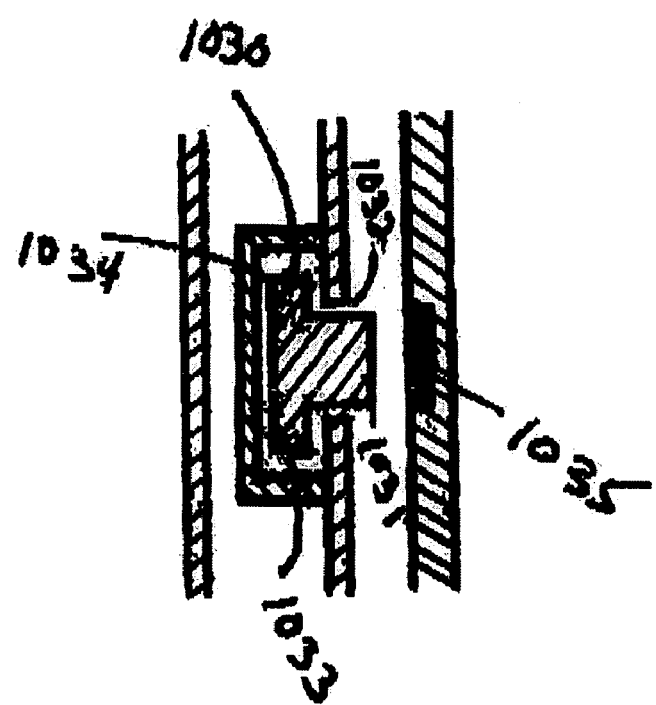
FIG. 65 shows an alternative means for connecting an eyewear assembly to a subframe assembly.

In another embodiment shown in FIG. 65 there is an adjustable or moving magnetic member. In this embodiment, a magnetic member 1030 may have a first portion 1031 there about flush with, or extending from, an opening 1032 in the surface of either the frame or the subframe. The magnetic member may be positioned in the opening so that a portion 1031 of the magnetic member extends outwardly. The remainder of this magnetic member may be in a recessed position 1033 of the opening when not near a second magnetic member. When the magnetic member is in proximity to a second magnetic member 1035, the first magnetic member has the ability to extend outwardly from the frame or the subframe as the case may be. The first magnetic member is retained in a recess in the frame or the subframe by a flange 1034 about the base of the magnetic member that is larger than the opening in the frame or subframe, as seen in FIG. 65. The magnetic member may be positioned in a recess in either one or both of a frame or subframe. The frame assembly or the subframe assembly as the case may be may have a recess that has at least one sidewall and a base wall and where there is a flange extending from the side wall as seen in FIG. 65. The flange forms an opening in the assembly for a portion of the magnetic member to extend from the opening when the magnetic member is in a contact position, i.e., when the movable magnetic member is being drawn to another magnetic member. The base portion preferably has a size that prevents the magnetic member from passing through the opening formed by said flange. The magnetic member has a recessed position and an extended position. When the magnetic member is a magnet, it has the ability to move to an extended position whenever it is in proximity to another magnet or a material that is attracted to a magnet. When the magnetic member in the recess is a material that is attracted to a magnet, it has the ability to move to an extended position when it is in proximity to a magnet.

Figure 66:
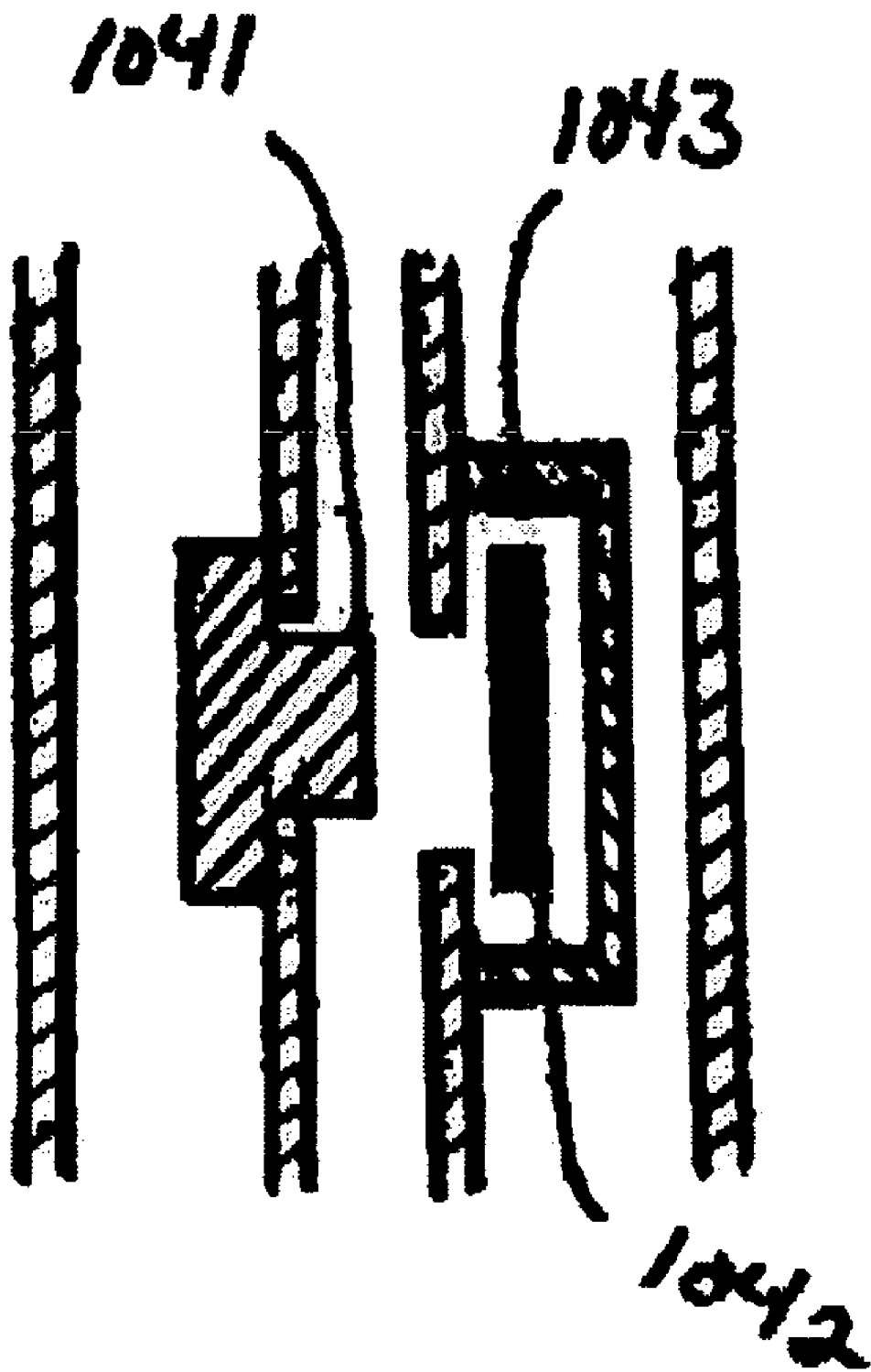
FIG. 66 shows another alternative means for connecting an eyewear assembly to a subframe assembly.

In another embodiment as shown in FIG. 66, there can be a magnetic member 1041 in a recess in a frame or a subframe. This magnetic member may be fixed within the recess. On the opposite frame member there can be a movable magnetic member 1042 that is drawn to the magnetic member 1041 in the recess in a fixed position extending from the outer surface of the frame or subframe assembly. This magnetic member extends outwardly of the surface so that it can enter the recess 1043 where the fixed magnetic member is secured thereby magnetically securing the frame to the subassembly. Either the frame assembly or the subframe assembly may have a magnetic member secured to the assembly. The assembly has a recess for receiving a magnetic member and the magnetic member has a base portion and a contact portion. The contact portion extends above the surface of the assembly. The other one of the frame assembly or the subframe assembly has a recess for receiving a magnetic member. The magnetic member being movably retained in the recess.

The recess may be formed by at least one sidewall and a base wall. There is a flange extending from said at least one side wall. This flange forms an opening in the assembly for a second magnetic member 1043. The second magnetic member has a size that prevents it from passing through the opening formed by the flange. The second magnetic member is movable between a first position and a second magnetic member contact position in the recess.

Alternatively, instead of being fixed in the recess, the magnetic member 1041 can be movable and move toward the opening in the recess. However, the said magnetic member is prevented from being released from the frame or the subassembly frame as the case may be because the opening for the recess is smaller than the overall size of the magnetic member within the recess.

Figure 67:
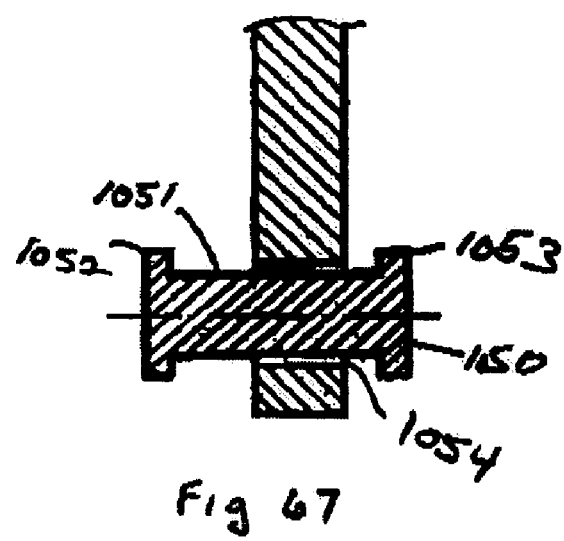
FIG. 67 shows a magnetic member that is moveable in an orifice in a frame or subframe assembly.

As seen in FIG. 67, the adjustable magnetic member 1050 alternatively can have a body portion in the form of a rod 1051 having a first flanged member or lip 1052 at one end portion of the rod and a second flanged member or lip 1053 at the opposite or second end portion of the rod. The rod portion of the magnet may be in an orifice 1054 that extends through the frame or the subframe assembly. The first and second end portions have a cross sectional area greater than the cross sectional area of the orifice. The rod can move within the orifice from a recessed position to an extended position. The flanged members or lips retain the rod in the orifice. Alternatively, the rod portion can have threads that screw into corresponding threads on the inner wall of the orifice. In addition, a threaded locking ring can be used on one end portion of the rod to secure the rod in a predetermined position. The locking ring can be used in conjunction with a flange or lip on the end portion or in place of a flange or lip on the end portion. In any case, the adjustable magnetic member can be a magnet or a material that is attracted to a magnet.

Figure 68:
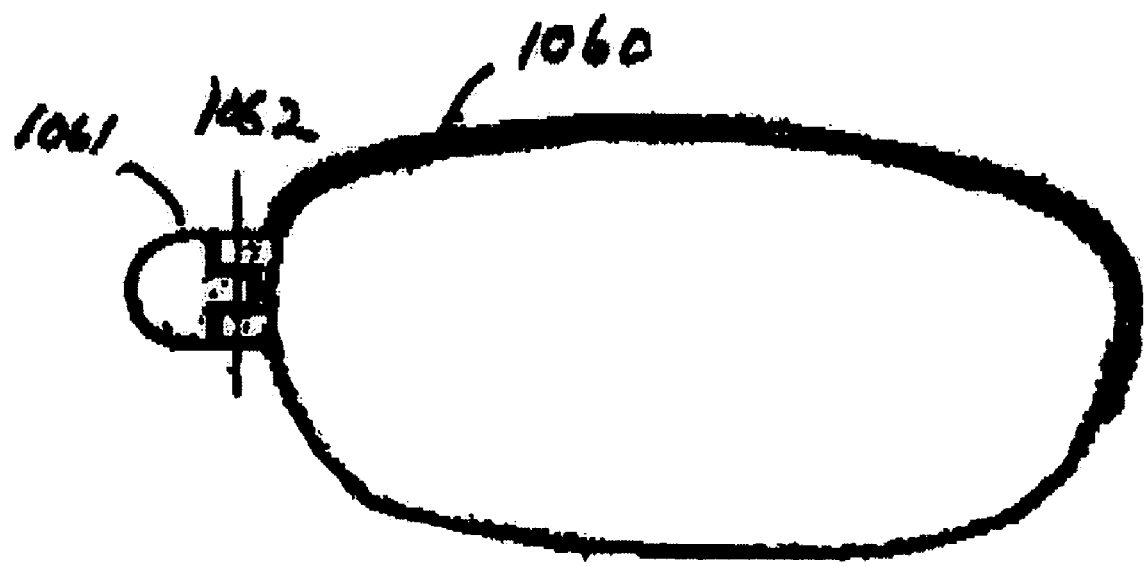
FIG. 68 shows a portion of a subframe assembly where there is a hinged magnetic member.
Figure 69:
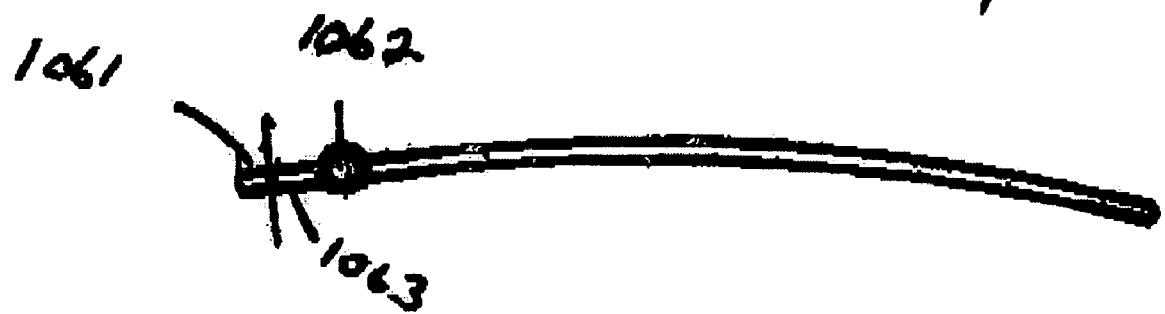
FIG. 69 shows the hinged magnetic member in an exemplary position.
Figure 70:
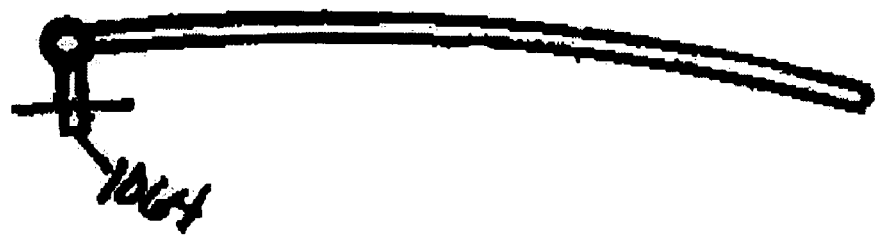
FIG. 70 shows the hinged magnetic member in a position where the edge of the magnetic member is closer to the frame assembly.

In a still further embodiment as shown in FIGS. 68-70 the subframe assembly 1060 may have a magnetic member 1061 on at least one of the sides of the subframe assembly that is secured to the subframe assembly by means of a hinge 1062. The hinged magnetic member may be in the form a generally flat member hingedly connected to the frame on one side and made from a magnet or a magnetic material. Alternatively, there can be a magnet secured onto the hinged member 1061. The shape of the hinge can also be spherical or other shapes. The hinged magnetic member may be a generally straight or if desired it may be curved.

It should be understood that any part of any of the embodiments described in FIGS. 64-70 may be combined in any suitable manner. For example, the movable magnetic member 1030 in FIG. 65 may be used in conjunction with the movable magnetic member 1042 of FIG. 66. As another example, two movable magnetic members as in 1030 in FIG. 65 may be used in conjunction with one another, one being in the frame assembly and the other being in the subframe assembly. In addition, the hinged magnetic member 1061 of FIG. 68 may be used in conjunction with another hinged magnetic member, or with the movable magnetic member 1050 of FIG. 67, and so on, and so on.

Figure 71:
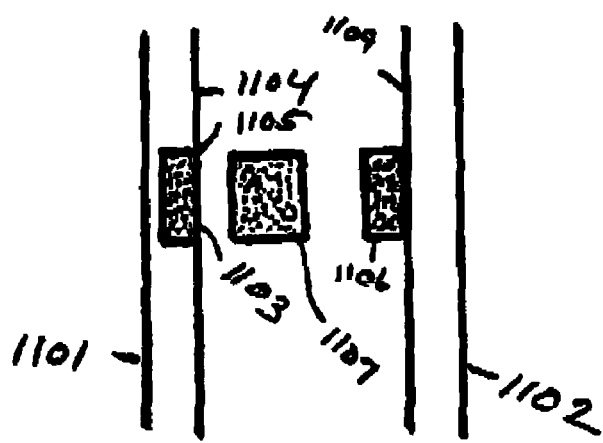
FIG. 71 shows an alternate embodiment of a means for securing an eyewear assembly and a subframe assembly using at least one magnetic member between a magnetic member on the eyewear assembly and a magnetic member on the subframe assembly.
Figure 72:
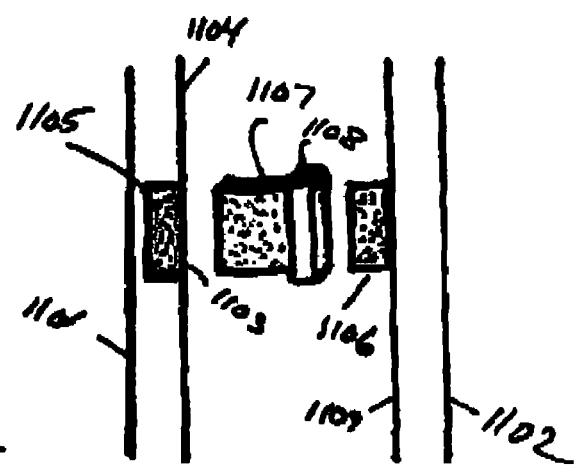
FIG. 72 shows another embodiment of a means for securing an eyewear assembly and a subframe assembly of FIG. 71.

FIGS. 71 and 72 show alternative embodiments of a means for securing the a frame assembly 1101 to a subframe assembly 1102. In the embodiments shown in FIGS. 71 and 72, the distance between the frame assembly and subframe assembly may be increased by the addition of a third magnetic member that is used in conjunction with a pair of magnetic members as a "spacer". In these embodiments, the third magnetic member can be magnetically attached between the first and second magnetic members of a pair to increase the distance between the said first and second magnetic members of said pair to increase the distance between the frame and subframe. Various sizes, shapes, and thicknesses of third magnetic members can be used to increase the distance between the frame and subframe as desired. In addition, a third magnetic member may have a sleeve portion that is desirably shaped to overlap at least a part of the magnetic members of the frame to create a more secure attachment by keeping the magnetic members from moving relative to one another. A third magnetic member may be used in conjunction with any of the embodiments disclosed herein, including magnetic members that are embedded, surface mounted, recessed or movable from a first position to a second position. In addition, a third magnetic member may be adhered with epoxy or by other means to one of a pair of magnetic members.

FIG. 71 is a side view of a frame assembly 1101 with a magnetic member 1103 embedded in it, a subframe assembly 1102 with a magnetic member 1106 adhered to its surface, and a third magnetic member 1107. Alternatively, the subframe 1102 may have a magnetic member embedded in it and the frame may have a magnetic member adhered to its surface. There is a first magnetic member 1103 which may be secured to an outer surface 1104 of the eyewear assembly 1101. The magnetic member 1103 may be positioned in a recess 1105 in the surface or on the outer surface 1104 of the eyewear assembly 1101. A second magnetic member 1106 is positioned on an outer surface 1107 on the subframe assembly 1102. The second magnetic member may be on the outer surface 1109 of the subframe assembly or it may be positioned in a recess in the outer surface 1109. In addition to the first magnetic member 1103 and the second magnetic member 1106 there is a third magnetic member 1107 that provides an extension to the other two magnetic members so that the eyewear assembly 1101 and the subframe assembly 1102 are adequately secured together and that there is a sufficient gap between the two so that neither the eyewear assembly nor the subframe assembly will scratch the other. At least one of the magnetic members is a magnet and the other magnetic members are a magnet or a material attracted to a magnet.

FIG. 72 shows an alternate embodiment of the article of FIG. 71. FIG. 72 is a side view of a frame 1101 with a magnetic member 1103 embedded in it, a subframe 1102 with a magnetic member 1106 adhered to its surface, and a third magnetic member 1107 which has a sleeve portion 1108 which allows it to fit over a portion of the magnetic member 1106 adhered to the surface of the subframe. Alternatively, the subframe may have a magnetic member embedded in it and the frame may have a magnetic member adhered to its surface. Also, both the frame assembly 1101 and the subframe assembly 1102 may have a magnetic member extending above the surface. In that instance the third magnetic member may be a smaller member. It will also be appreciated that both the first and second magnetic members may be recessed and a larger third magnetic member can be used.

FIGS. 73-77 show an alternate embodiment of the present invention. FIG. 73 is a front view of a frame assembly 1201 with a subframe assembly 1202 attached to it. The two assemblies are connected by means of four pairs of magnetic members: two pairs near the nasal area and two pairs near the outside edges of the lenses. FIG. 76 is a sectional view taken along 4-4 of FIG. 74. It shows the nose-pad arm 1203 and nose pad 1204 of the frame, and a projection 1205 from the subframe that has a magnetic member in a receptacle or hood 1206 attached to it. The magnetic member of the subframe contacts a magnetic member in a corresponding receptacle or hood 1207 on the rear of the nose pad 1204. The actual magnetic member cannot be seen from this view. However, it will be appreciated that the receptacles or hoods 1206 and 1207 could be the magnetic member if desired.

FIG. 77 is a sectional view taken along 5-5 of FIG. 74. It shows the nose-pad arm 1203 and nose pad 1204 of the frame, and a magnetic member 1207 attached to said nose-pad arm. Also shown is a projection 1205 from the subframe that has a magnetic member 1206 attached to it.

Figure 79:
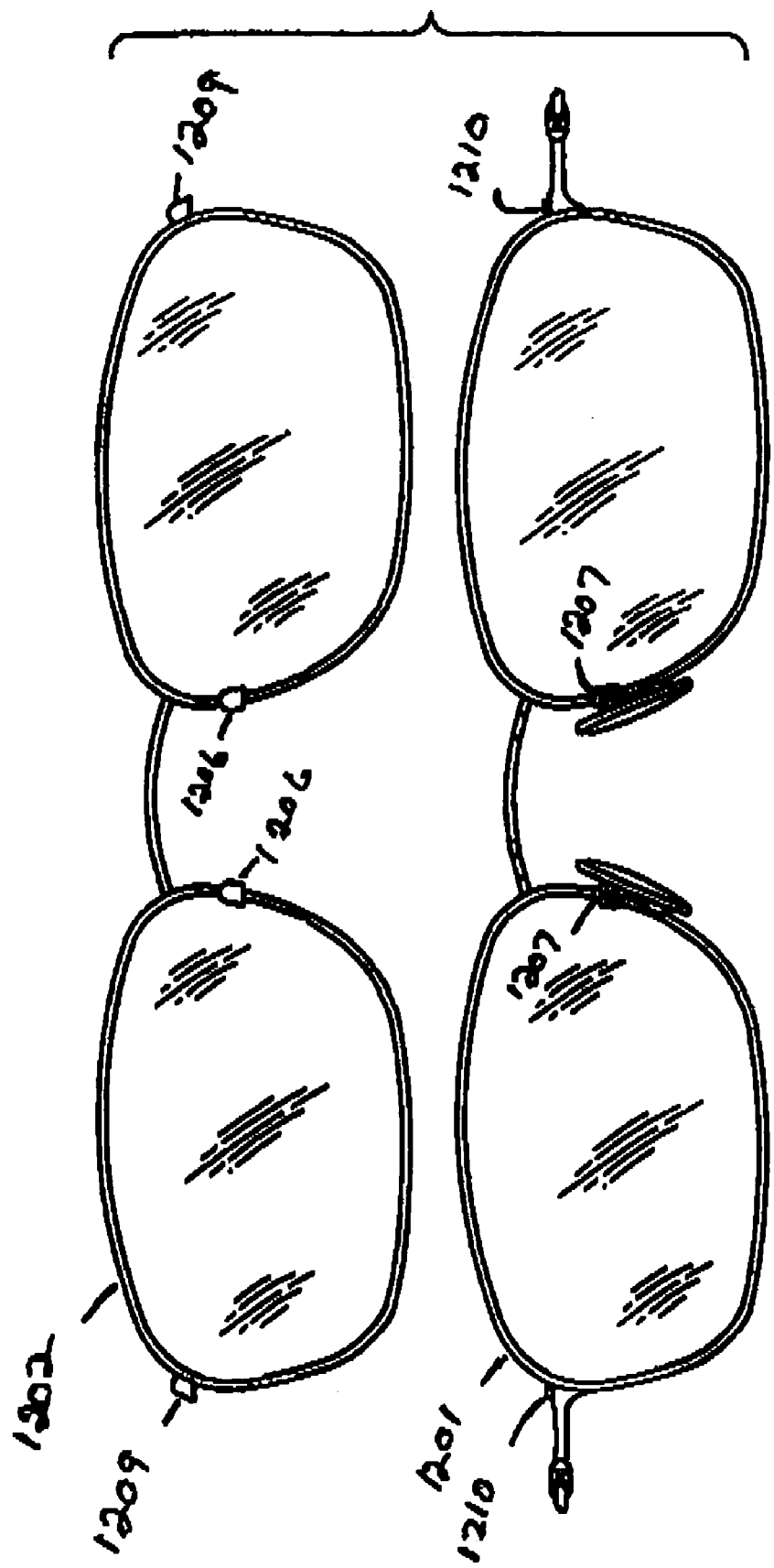
FIG. 79 is a rear view of a frame and subframe of FIG. 74 showing magnetic members at the nasal area and near the outside edges of the lenses.
Figure 61:
Figure 62:
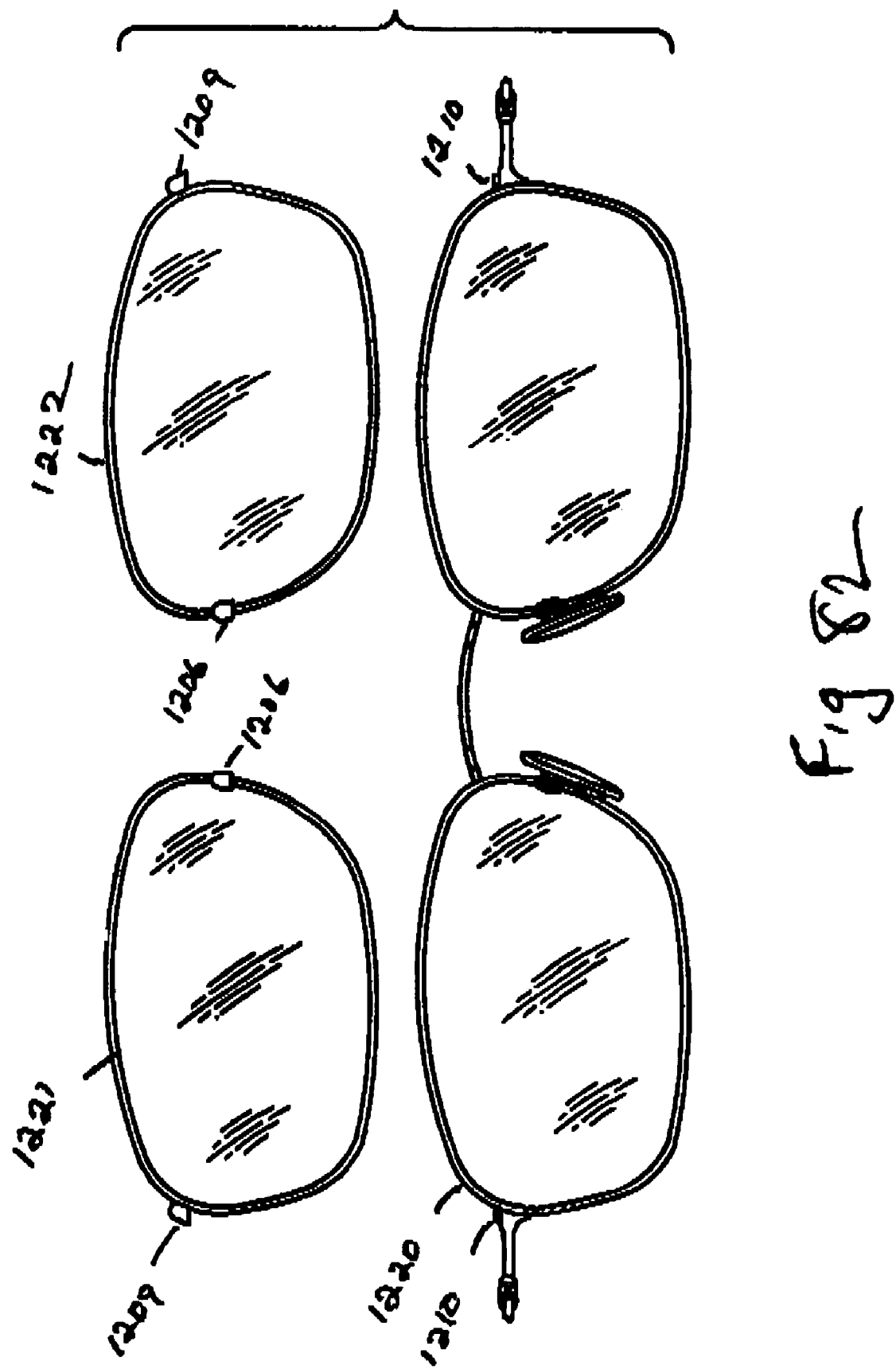

FIG. 78 is a sectional view taken along 6-6 of FIG. 74 and show the connection between the frame assembly and the subframe assembly near the outside edges of the lenses. A magnetic member 1209 may be positioned on the outside edge of one of the assemblies and a second magnetic member 1210 may be positioned on the other assembly FIG. 79 is a rear view of both a frame 1201 and subframe 1202 showing magnetic members at the nasal area and near the outside edges of the lenses. The magnetic members on the subframe may have a sleeve portion that is recessed or otherwise desirably shaped to overlap at least a part of the magnetic members of the frame to create a more secure attachment by keeping the magnetic members from moving relative to one another. Similarly, the magnetic members on the frame may have a sleeve portion that is recessed or otherwise desirably shaped to overlap at least a part of the magnetic members of the subframe to prevent the magnetic members from moving relative to each other.

FIG. 80 is a rear view of a frame and subframe showing magnetic members only at the nasal area. The magnetic members on either the frame or the subframe have a sleeve portion that is desirably shaped to overlap at least a part of the magnetic members of the other assembly to create a more secure attachment by keeping the magnetic members from moving relative to one another.

FIG. 81 is a rear view of a frame and subframe showing magnetic members only near the outside edges of the lenses. The magnetic members on the frame or the subframe have a sleeve portion that is desirably shaped to overlap at least a part of the magnetic members of the opposite assembly to create a more secure attachment by keeping the magnetic members from moving relative to one another.

FIG. 82 is a rear view of a frame 1220 and two subframes 1221 and 1222 showing magnetic members near the nasal area and outside edges of the lenses. The magnetic members on the frame or the subframe have a sleeve portion that is desirably shaped to overlap at least a part of the magnetic members of the other assembly to create a more secure attachment by keeping the magnetic members from moving relative to one another.

Figure 83:
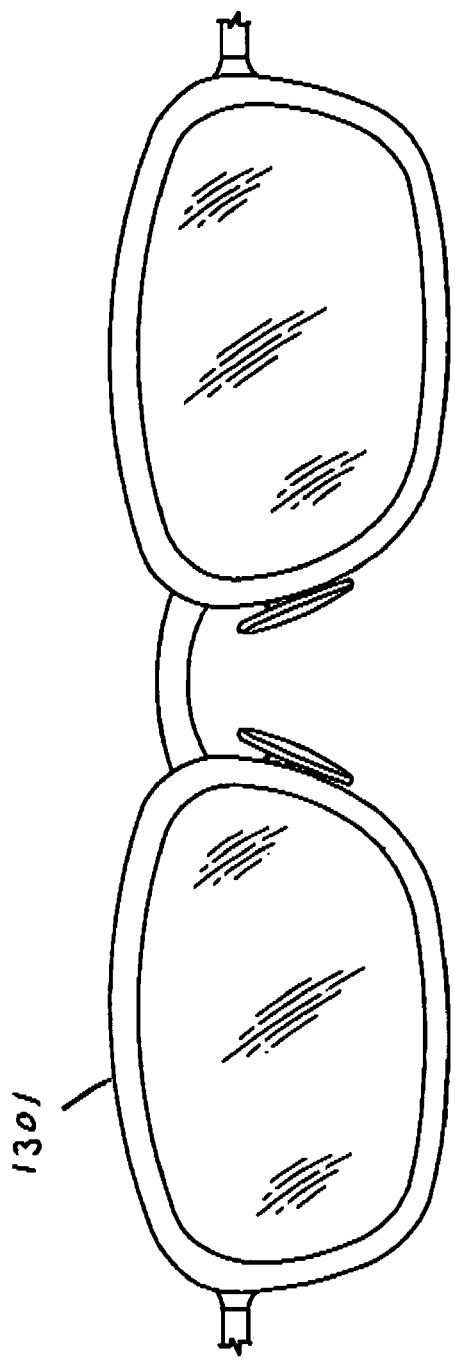
FIG. 83 is a front view of a frame that has a one-piece lens magnetically attached to the rear side of the frame.

FIG. 83 is a front view of a frame assembly 1301 that has a one-piece lens assembly magnetically attached to the rear side of the frame. The frame assembly may have one or more lenses present but it is not necessary. Magnetic members may be present on the rear of the frame at any number of suitable locations on the frame as discussed herein.

Figure 84:
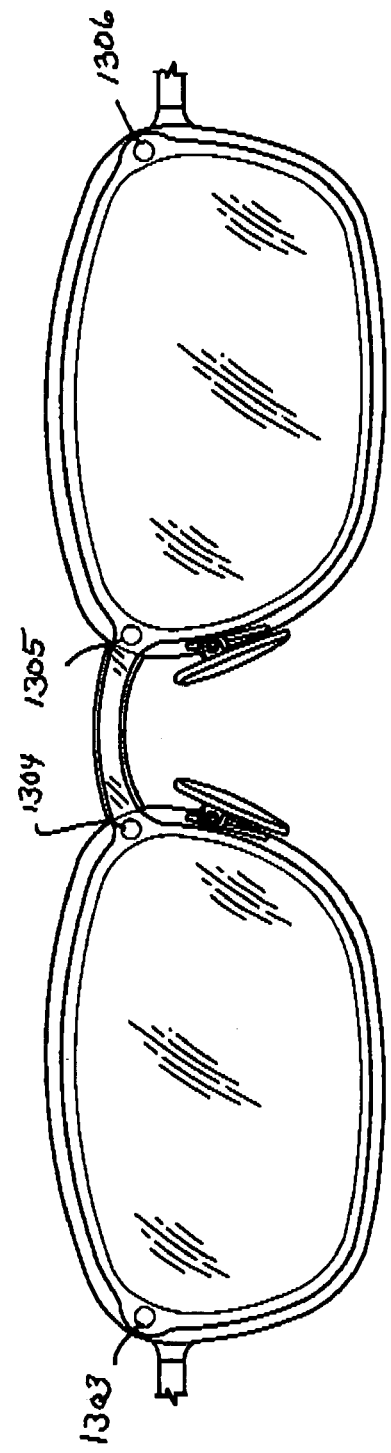
FIG. 84 is a rear view of FIG. 83 showing a frame with a one piece lens attached magnetically with four pairs of magnetic members.

FIG. 84 is a rear view of FIG. 83 showing a frame assembly 1301 with a one piece lens assembly 1302 attached magnetically with four pairs of magnetic members. Two pairs of magnetic members are present on the frame assembly and two pairs of magnetic members, are on the lens assembly. The one-piece lens assembly may be frameless and has four magnetic members embedded into it, two near the nasal area 1304 and 1305 and two near the outer edges of the lens 1303 and 1306. Although the magnetic members are shown in the Figures as extending from the front surface of the lens assembly through to the rear surface of the lens assembly, it will be appreciated that the magnetic members may be just secured to the surface of the assembly or positioned in a recess that does not go all the way through the assembly. The magnetic members on the front side of the lens assembly are each one of a pair, and are in positions that correspond to the positions of magnetic members on the rear side of the frame that are the other one of a pair so that the lens attaches magnetically when placed behind the frame. If desired, the bridge 1311 can be removable.

Figure 85:
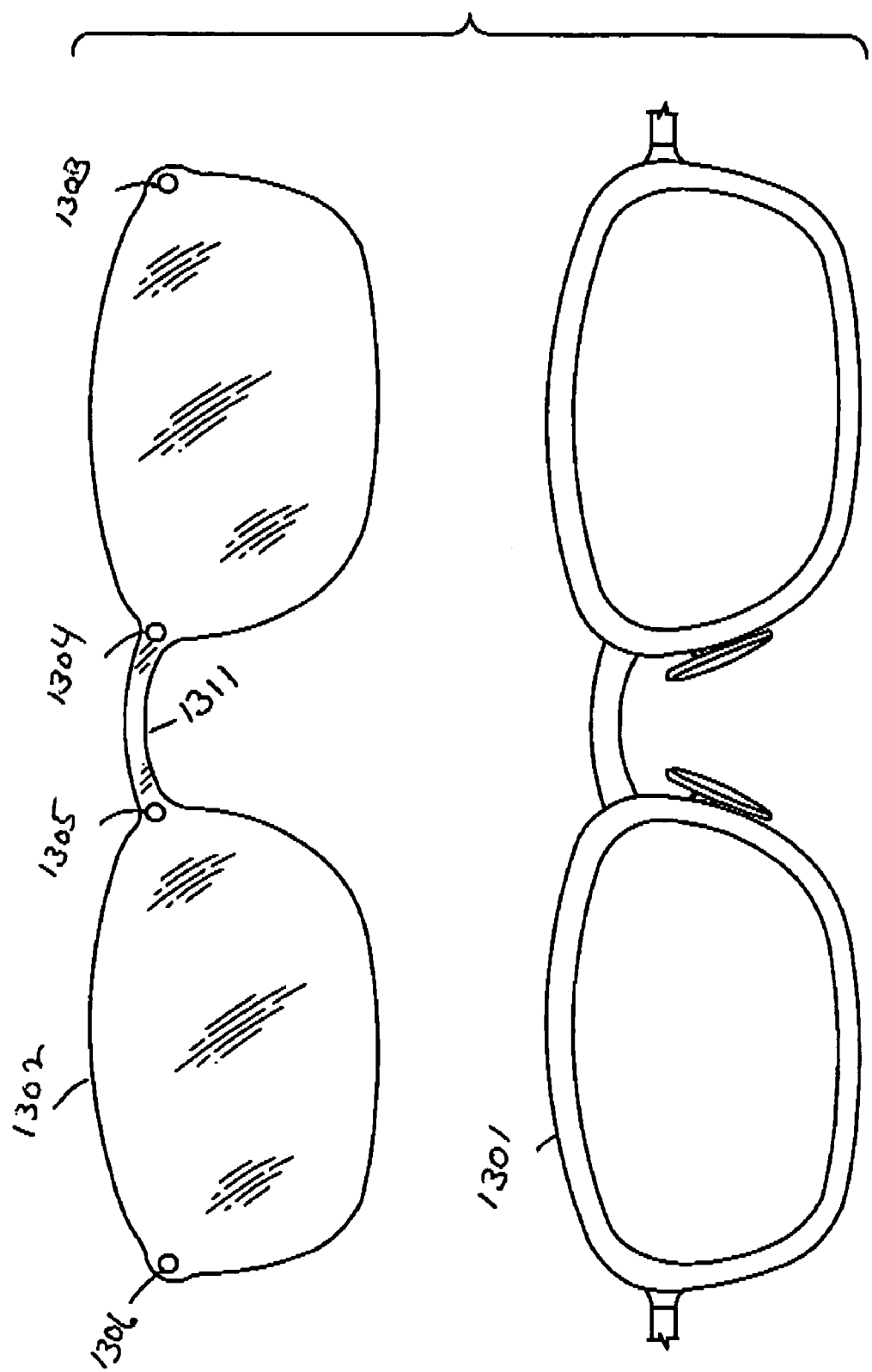
FIG. 85 is a front view of the frame and one-piece lens of FIGS. 83 & 84 shown when detached from one another.

FIG. 85 is a front view of the frame assembly 1301 and one-piece lens assembly 1302 of FIGS. 83 & 84 shown when detached from one another.

Figure 86:
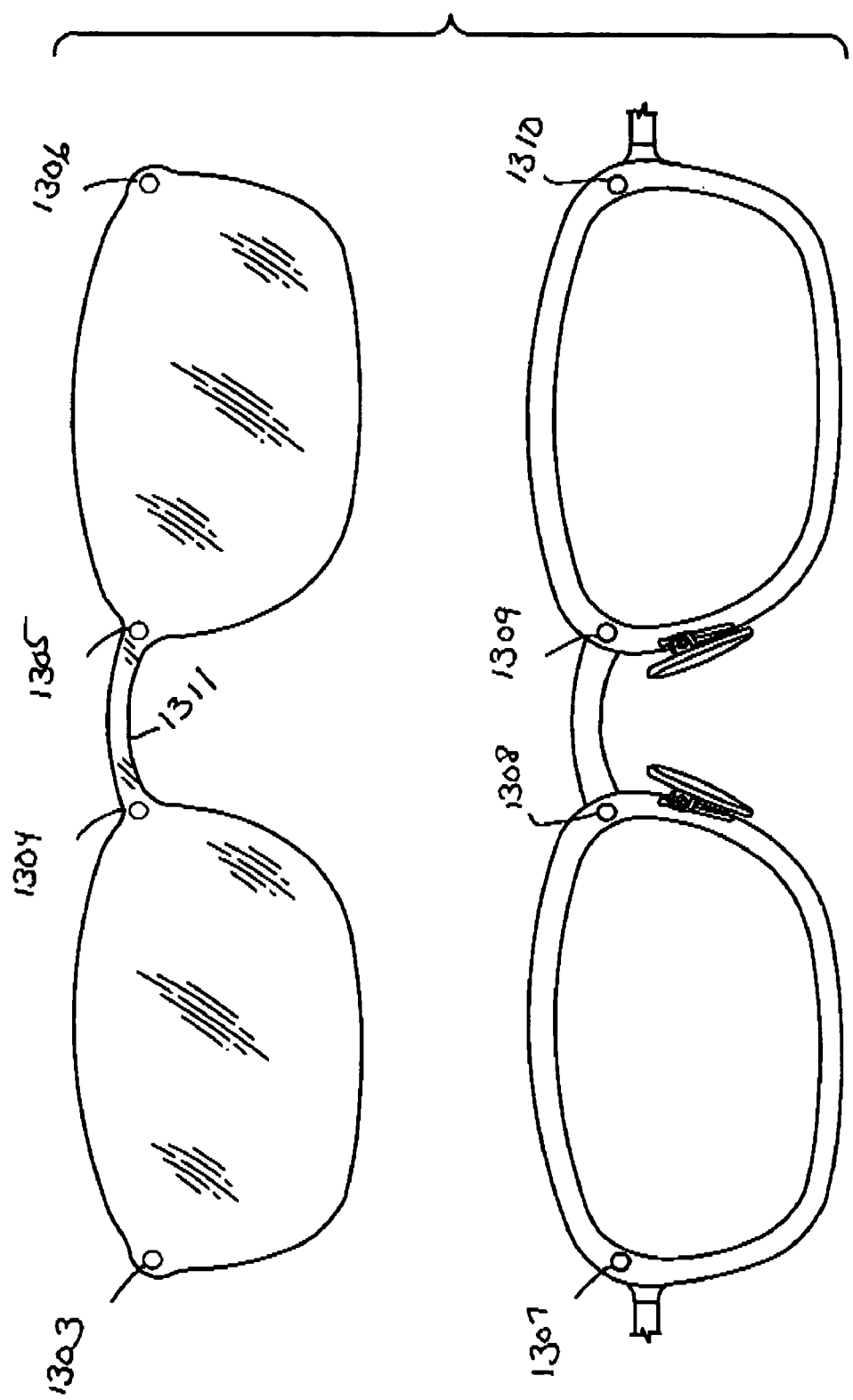
FIG. 86 is a rear view of the frame and one-piece lens of FIGS. 83 & 84 shown when detached from one another.

FIG. 86 is a rear view of the frame and one-piece lens of FIGS. 83 & 84 shown when detached from one another. This Figure shows the placement of the magnetic members 1307, 1308, 1309 and 1310 on the frame assembly FIG. 87 is a front view of a frame assembly 1301 that has a two individual lenses 1312 and 1313 magnetically attached to the rear side of the frame.

FIG. 88 is a rear view of FIG. 87 showing a frame with two individual lens assemblies. The lenses 1312 and 1313 attach magnetically using two pairs of magnetic members to attach each lens. Each lens is frameless and has two magnetic members embedded into it, one near the nasal area and one near the outer edge of the lens. The magnetic members on the front side of the lens are each one of a pair, and are in positions that correspond to the positions of magnetic members on the rear side of the frame that are the other one of a pair so that the lens attaches magnetically when placed behind the frame.

Figure 89:
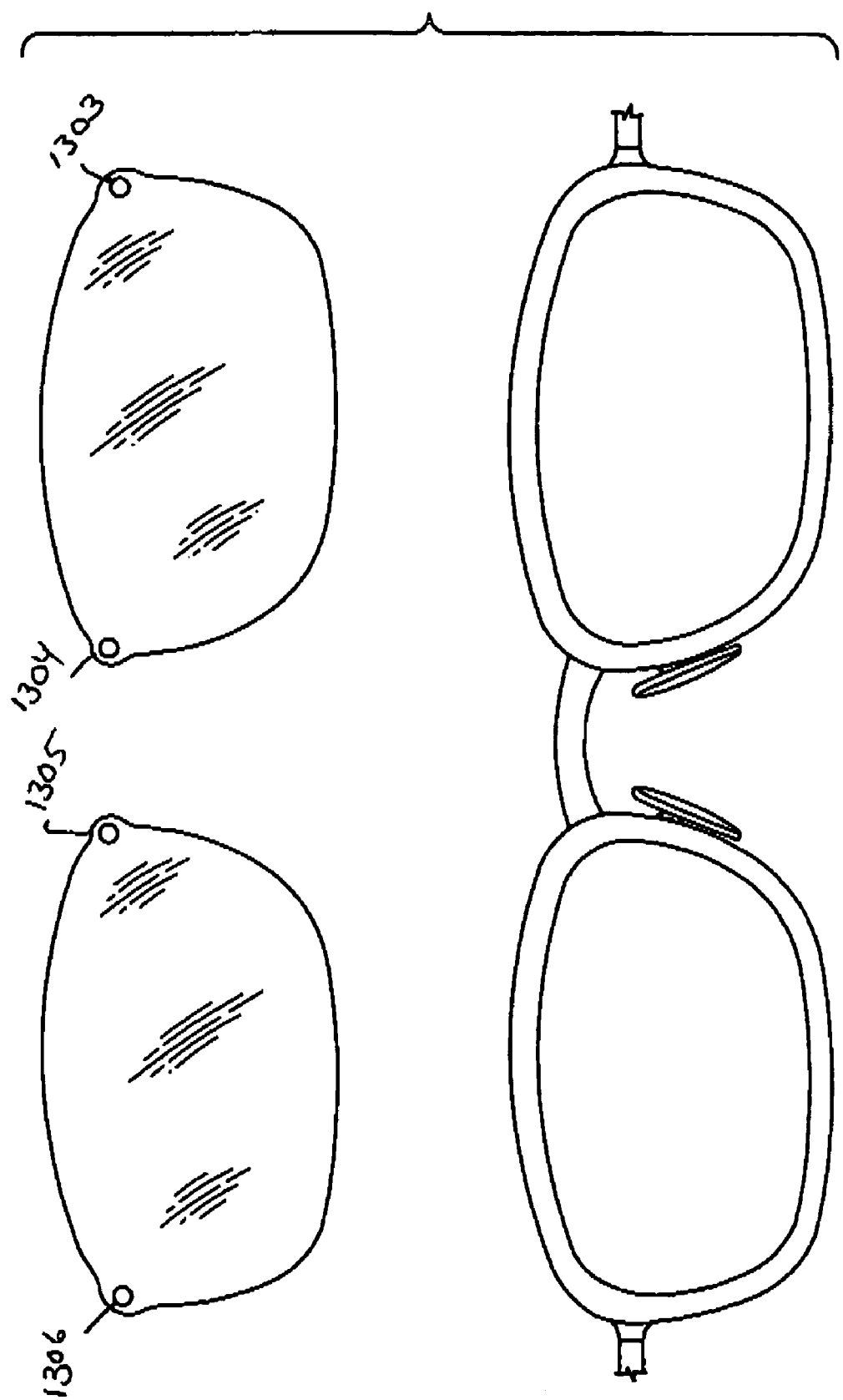
FIG. 89 is a front view of the frame and two individual lenses of FIGS. 87 & 88 shown when detached from one another.

FIG. 89 is a front view of the frame and two individual lenses of FIGS. 87 & 88 shown when detached from one another.

Figure 90:
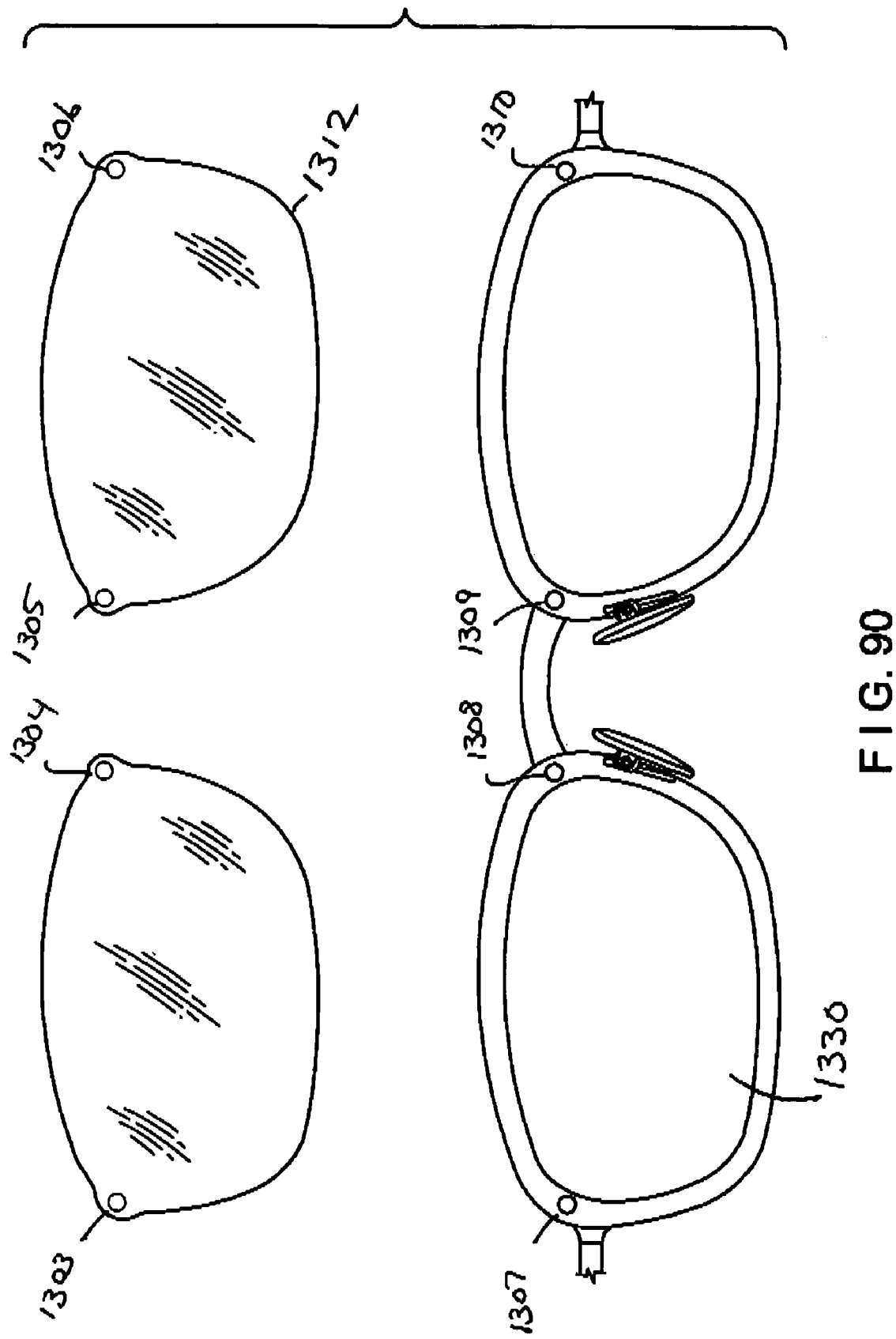
FIG. 90 is a rear view of the frame and two individual lenses of FIGS. 87 & 88 shown when detached from one another.

FIG. 90 is a rear view of the frame and two individual lenses of FIGS. 87 & 88 shown when detached from one another. In another embodiment the frame assembly may be provided with a first lens 1330 and there is no second lens in the frame assembly. The second lens is provided by an individual lens 1313.

Figure 91:
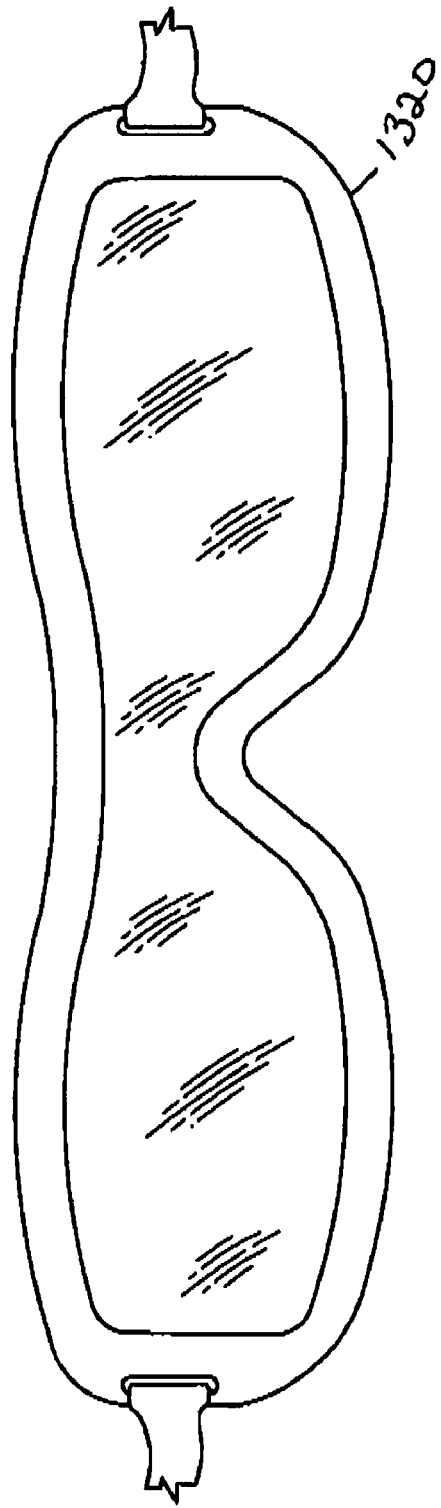
FIG. 91 is a front view of a goggle that has a one lens magnetically attached to the rear side of the goggle.

FIG. 91 is a front view of a goggle that has a one lens magnetically attached to the rear side of the goggle.

Figure 92:
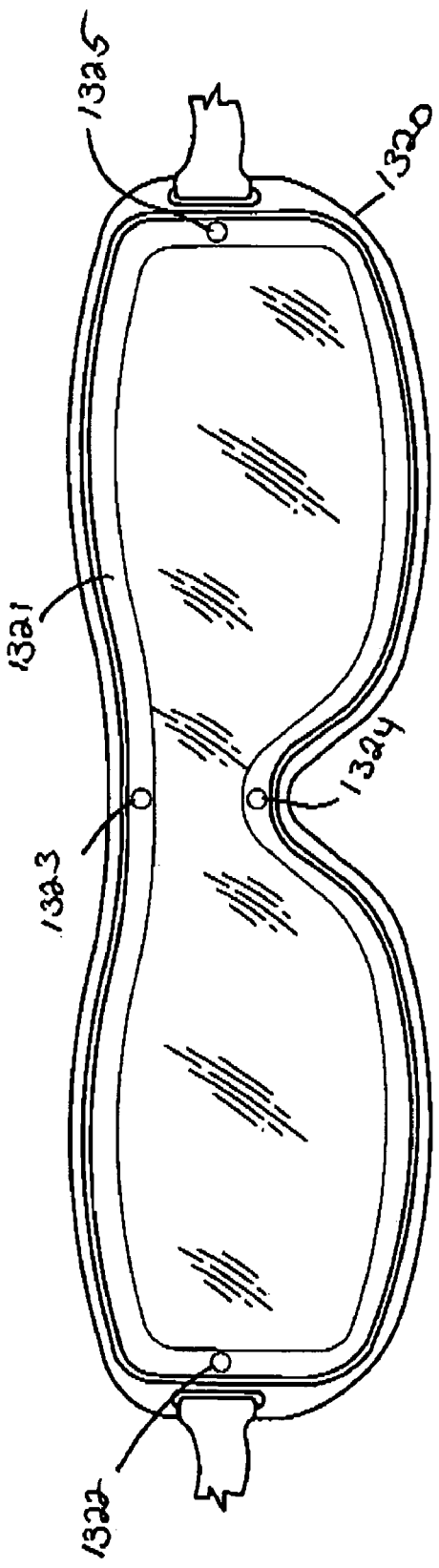
FIG. 92 is a back view of FIG. 91 showing a goggle with a lens attached magnetically using four pairs of magnetic members.

FIG. 92 is a back view of FIG. 91 showing a goggle 1320 with a lens assembly 1321 attached magnetically using four pairs of magnetic members. The lens assembly is frameless and has four magnetic members 1322, 1323, 1324, and 1325 embedded into it, two near the nasal area and two near the outer edge of the lens. It is not required that the magnetic members be in the positions shown in the drawings. The placement and the number of the magnetic members can vary depending on the type of goggles and the material they are made of. The magnetic members on the front side of the lens are each one of a pair, and are in positions that correspond to the positions of magnetic members on the rear side of the goggle that are the other one of a pair so that the lens attaches magnetically when placed in the correct position behind the goggle.

Figure 93:
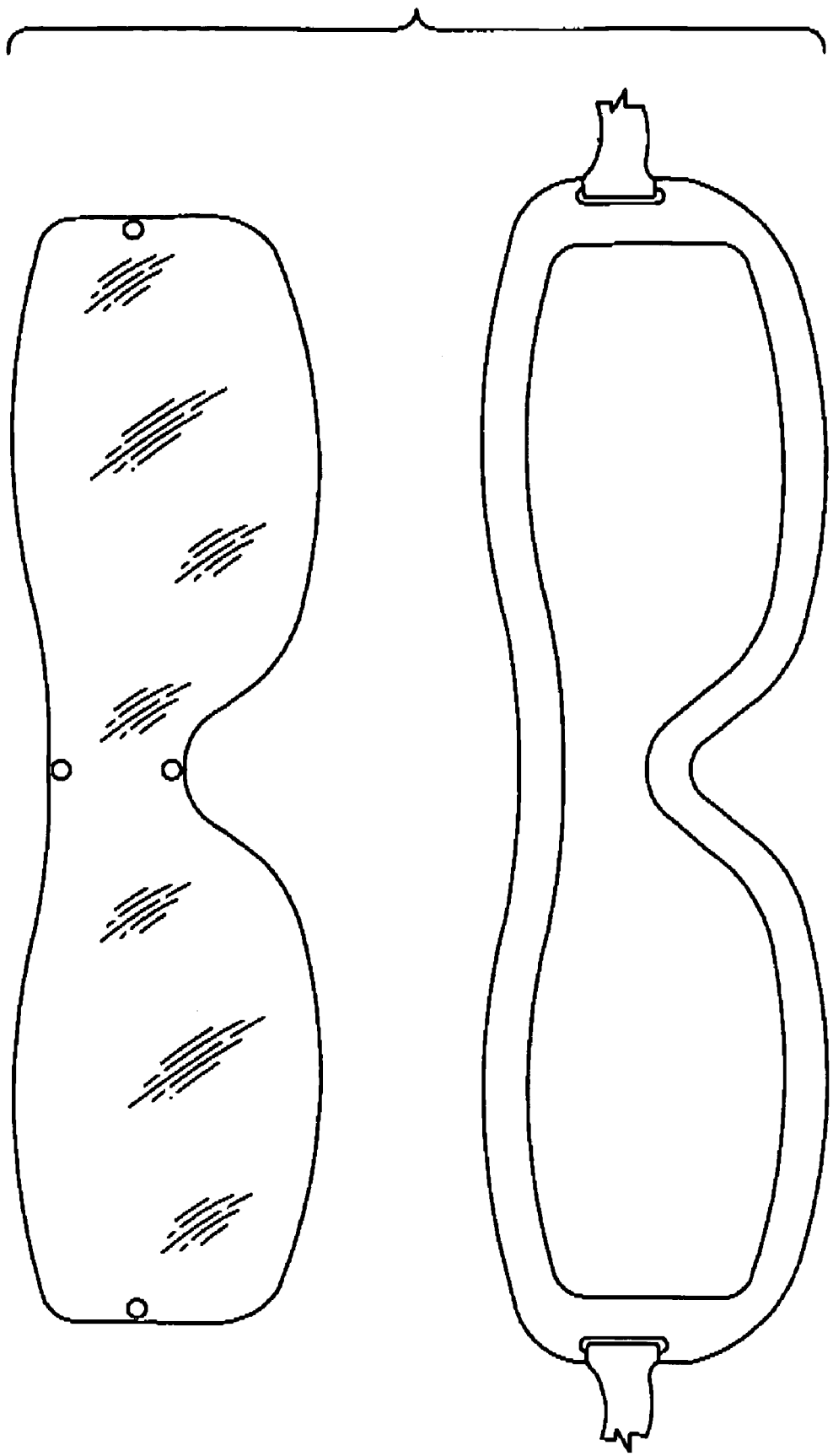
FIG. 93 is a front view of the goggle and lens of FIGS. 91 & 92 shown when detached from one another.

FIG. 93 is a front view of the goggle and lens of FIGS. 91 & 92 shown when detached from one another.

Figure 94:
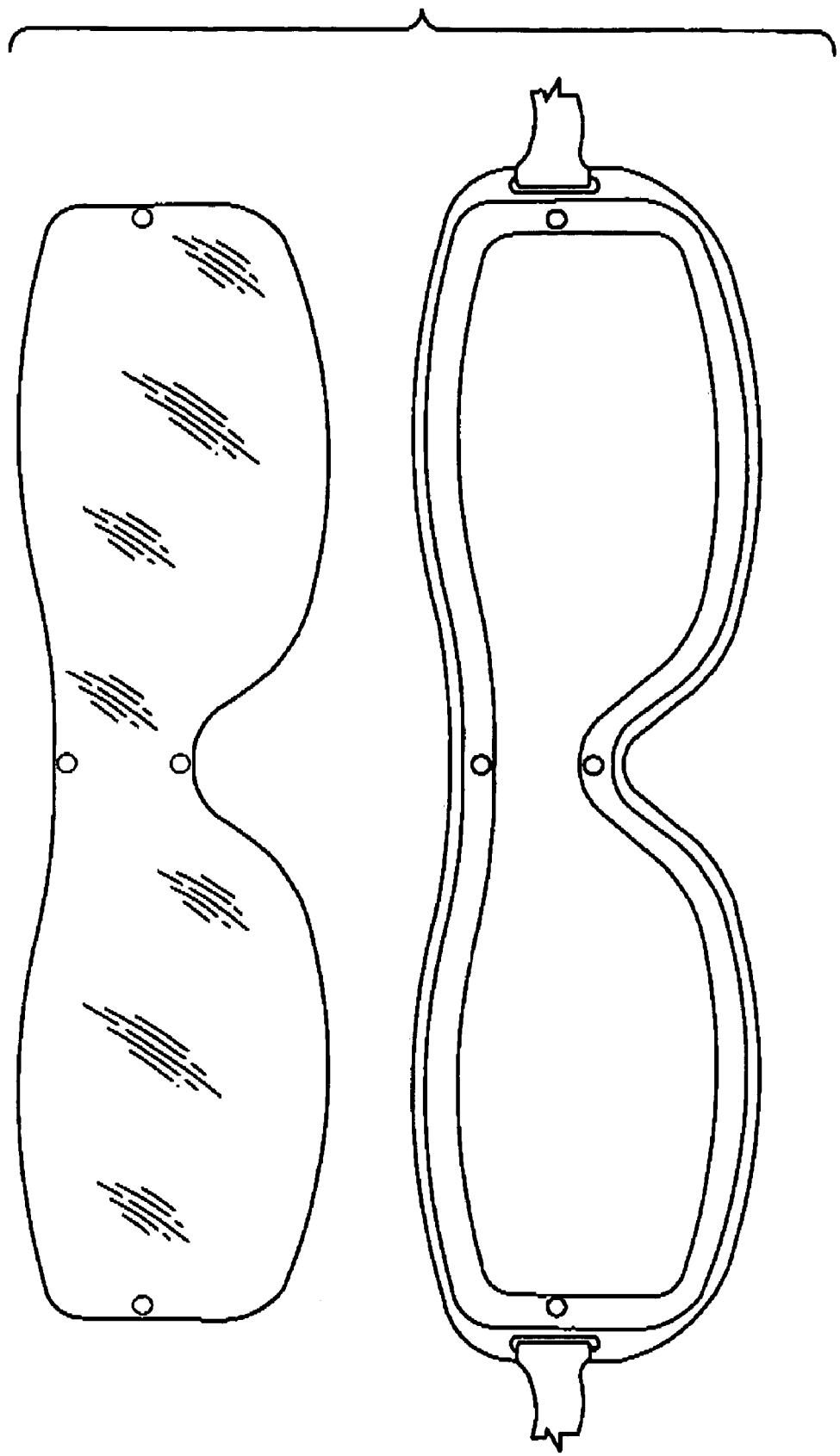
FIG. 94 is a back view of the goggle and lens of FIGS. 91 & 92 shown when detached from one another

FIG. 94 is a back view of the goggle and lens of FIGS. 91 & 92 shown when detached from one another.

Although the present invention has been disclosed in the context of certain preferred embodiments, examples and variations, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. For instance, the exterior shape and dimensions of the frame assemblies, subframe assemblies, mechanical interlocks and magnetic interlocks can be any suitable shape or configuration, including the use of curved or straight surfaces in the place of straight or curved surfaces. In addition, the connections preferably are made with the lens assembly resting on a surface of the frame assembly. In some embodiments, however, the lens assembly can be positioned such that the frame assembly rests on a portion of the lens assembly. It is also contemplated that various combinations or subcombinations of the specific features and aspects of any of the many embodiments may be made and still fall within the scope of the invention. It should be understood that various features and aspects of the disclosed embodiments can be combined with or substituted for one another in order to form varying modes of the disclosed invention. Moreover, some variations that have been described with respect to one embodiment and not another embodiment can be used with such other embodiments. For instance, the subframe assembly can be supported in one, two or more locations on the frame assembly. Many variations have been described herein and cross-application is intended where physically possible. Thus, it is intended that the scope of the present invention herein disclosed should not be limited by the particular disclosed embodiments described above, but should be determined only by a fair reading of the claims that follow.

What is claimed is:

1. An eyeglass assembly comprising a frame assembly and at least one subframe assembly, said frame assembly comprising at least one lens, a pair of temples, said frame assembly also comprising a front side and a back side, said back side of said frame assembly being closer to a wearer's face than said front side, said frame assembly having at least one nose pad having a front and a rear surfaces, the rear surface of said nose pad having a nose pad arm that secures said nose pad to said frame, said nose pad arm having a hood at an end of said nose pad arm, said hood having a magnetic member therein, said subframe assembly comprising at least one lens, said at least one subframe assembly comprising a front side and a back side, said back side of said subframe assembly being closer to said wearer's face than said front side of said subframe assembly, said subframe assembly having at least one projection from the subframe, said projection having a hood with a magnetic member therein, said subframe assembly being secured to said frame assembly at least in part by at least one of said magnetic members in each of said hoods such that said front side of said subframe assembly faces said back side of said frame assembly and said subframe assembly is at least partially positioned between said frame assembly and said wearer's face, a first magnetic member of said magnetic members being a magnet that is secured to one of said frame assembly and said subframe assembly and a second magnetic member of said magnetic members being a magnet or a material that is attracted to a magnet and said second magnetic member being secured to said other of said frame assembly and said subframe assembly such that said first magnetic member and said second magnetic member are generally aligned when said subframe assembly is secured to said frame assembly.

2. The eyeglass assembly according to claim 1 wherein said frame assembly and said subframe assembly are connected to each other by four pairs of magnetic members.

3. The eyeglass assembly according to claim 2 wherein two pairs of magnetic members are near the outside edges of the lenses of said frame assembly.

4. The eyeglass assembly according to claim 3 wherein at least one magnetic member is positioned on the outside edge of one of the assemblies.

5. The eyeglass assembly according to claim 4 wherein at least one magnetic member is positioned on the outside edge of the second of said assemblies.

6. The eyeglass assembly of claim 3, wherein said frame assembly comprises a boss that extends rearward and said subframe assembly comprises a lug that is connected to a brow bar, said lug being positioned on said boss when said subframe assembly is secured to said frame assembly.

7. The eyeglass assembly of claim 6, wherein said lug comprises a first magnetic member and said boss comprises a second magnetic member, said first and second magnetic members being magnetically secured when said subframe assembly is secured to said frame assembly.

8. The eyeglass assembly of claim 7, wherein said first magnetic member is slightly recessed within said lug and said second magnetic member extends into said lug when said subframe assembly is secured to said frame assembly such that said first and second magnetic members also define a mechanical interlock.

9. The eyeglass assembly according to claim 3 wherein at least one magnetic member of said at least one pair of magnetic members is movable from a first position to a second position.

10. The eyeglass assembly according to claim 3 wherein at least one of said frame assembly and said subframe assembly has a recess for receiving a magnetic member, said magnetic member being movably retained in said recess.

11. The eyeglass assembly according to claim 10 wherein said recess has at least one sidewall and a base wall and wherein there is a flange extending from said side wall, said flange forming an opening in said assembly to allow a portion of said magnetic member to extend from said opening when said magnetic member is in a contact position.

12. The eyeglass assembly according to claim 11 wherein said magnetic member has a base portion and a contact portion and wherein the base portion has a size that prevents the magnetic member from passing through the opening formed by said flange.

13. The eyeglass assembly according to claim 11 wherein said magnetic member has a size that prevents it from passing through the opening formed by said flange.

14. The eyeglass assembly according to claim 3 wherein the subframe assembly has a magnetic member on at least one side of the subframe assembly, said magnetic member being secured to the subframe assembly by means of a hinge.

15. The eyeglass assembly according to claim 14 wherein the magnetic member is secured onto a hinged member.

16. The eyeglass assembly according to claim 1 wherein said frame assembly has one magnetic member positioned on a first outside edge of said frame assembly and a second magnetic member on a second outside edge of said frame assembly, said frame assembly having a magnetic member on first and second nose pad arms and wherein said subframe assembly has a magnetic member on each outside edge of said subframe assembly that secures said subframe assembly to said frame assembly, said subframe assembly also comprising a pair of projections that have a magnetic member that contacts the magnetic member of each nose pad arm.

17. The eyeglass assembly according to claim 1 wherein at least one of said frame assembly and said subframe assembly has a magnetic member secured to said hood such that said magnetic member has a base portion and a contact portion, said contact portion extending above the surface of said hood in said assembly and said other assembly has a recess in said hood for receiving the contact portion of said magnetic member.

18. The eyeglass assembly according to claim 17 wherein said magnetic member having a contact portion extending above the surface of said hood is in said frame assembly.

19. The eyeglass assembly according to claim 18, wherein the magnetic member is movably retained in said recess.

20. The eyeglass assembly according to claim 17 wherein said magnetic member having a contact portion extending above the surface of said hood is in said subframe assembly.

21. The eyeglass assembly according to claim 20, wherein the magnetic member is movably retained in said recess.

22. The eyeglass assembly according to claim 1 wherein at least one of said frame assembly and said subframe assembly has a magnetic member secured to said assembly, and said assembly has a recess for receiving a magnetic member, said magnetic member having a base portion and a contact portion, said contact portion extending above the surface of said assembly.

23. The eyeglass assembly according to claim 22 wherein the other one of said frame assembly and said subframe assembly has a recess for receiving a magnetic member, said magnetic member being movably retained in said recess.

24. The eyeglass assembly according to claim 23 wherein said recess is formed by at least one sidewall and a base wall and wherein there is a flange extending from said at least one side wall, said flange forming an opening in said assembly for said magnetic member in said recess, said magnetic member in said recess has a size that prevents it from passing through the opening formed by said flange, said magnetic member in said recess being movable between a first position and a second magnetic member position in said recess.

25. An eyeglass assembly comprising a frame assembly and at least one lens assembly, said frame assembly comprising a pair of temples, said frame assembly having a front side and a back side, said back side of said frame assembly being closer to a wearer's face than said front side, said frame assembly having at least one nose pad having a front and rear, the rear of said nose pad having a nose pad arm, said nose pad arm securing said nose pad to said frame, said nose pad arm having a first magnetic member at an end thereof, said lens assembly comprising at least one lens, said lens assembly comprising a front side and a back side, said back side of said lens assembly being closer to said wearer's face than said front side of said lens assembly, said lens assembly having at least one projection extending from said lens assembly, said projection having a magnetic member on an end of said projection, said lens assembly being secured to said frame assembly at least in part by at least said magnetic members such that said front side of said lens assembly faces said back side of said frame assembly and said lens assembly is at least partially positioned between said frame assembly and said wearer's face, at least one of said first and second magnetic members being a magnet that is secured to one of said frame assembly and said lens assembly and said second magnetic member being a magnet or a material that is attracted to a magnet and said second magnetic member being secured to said other of said frame assembly and said lens assembly such that said first magnetic member and said second magnetic member are generally aligned when said lens assembly is secured to said frame assembly.

26. The eyeglass assembly according to claim 25 wherein said frame assembly has at least one lens.

27. The eyeglass assembly of claim 26, wherein said lens assembly, when secured to said frame assembly, is sized and positioned to be obscured from view when said eyeglass assembly is viewed from said front.

28. The eyeglass assembly according to claim 25 wherein said frame assembly has a first and second lens assembly.

29. The eyeglass assembly according to claim 28 wherein said frame assembly has at least one lens.

30. The eyeglass assembly according to claim 25 wherein said frame assembly has one lens in a first position on said frame assembly and a lens assembly attached to said frame assembly at a second position on said frame assembly.

31. The eyeglass assembly according to claim 25 wherein said frame assembly has one magnetic member positioned on a first outside edge of said frame assembly and a second magnetic member on a second outside edge of said frame assembly, said frame assembly having a magnetic member on first and second nose pad arms and wherein each of said lens assemblies has a magnetic member on each outside edge thereof that secures said lens assembly to said frame assembly, each of said lens assemblies also comprising a projection that has a magnetic member that contacts the magnetic member of each nose pad arm.

32. The eyeglass assembly of claim 25, wherein said frame assembly does not comprise any lenses.

33. The eyeglass assembly of claim 25 further comprising a second subframe assembly, said second subframe assembly comprising a front side and a back side, said back side being closer to the face of the wearer than said front side, said second subframe assembly further comprising a brow bar, a lens being secured to said brow bar, said second subframe assembly also being secured to said frame assembly such that said front side of said second subframe assembly faces said back side of said frame assembly and such that said front side of said second subframe assembly generally is positioned rearward of said front side of said frame assembly, said first and second subframe assemblies being positioned side-by-side when secured to said frame assembly.

34. The eyeglass assembly of claim 25, wherein said lens assembly does not comprise any temples.

35. The eyeglass assembly of claim 25 further comprising a first and second brow bar, a second lens being secured to said second brow bar and said second brow bar being connected to said first brow bar by a bridge, said bridge being generally obscured from frontal view by a bridge of said frame assembly when said lens assembly is secured to said frame assembly.

36. The eyeglass assembly of claim 35 further comprising a member being connected to said bridge of said frame assembly, said member defining a valley together with said bridge and said bridge of said lens assembly being received within said valley.

37. The eyeglass assembly according to claim 25 wherein a movable magnetic member has a body portion and a first and second end portions, said magnetic member being positioned in an orifice in said lens assembly such that said magnetic member extends from one outside surface of said projection through said orifice to said other outside surface and wherein said magnetic member is movable from a first position to a second position and wherein said magnetic member is retained in position in said orifice by said end portions.

38. The eyeglass assembly according to claim 37 wherein said first and second end portions have a cross sectional area greater than the cross sectional area of said orifice.

39. The eyeglass assembly according to claim 25 wherein there is at least a third magnetic member between at least one of said first and second magnetic members.

40. The eyeglass assembly according to claim 39 wherein there is a third magnetic member between each pair of said first and second magnets.

41. The eyeglass assembly according to claim 39 wherein at least one of said magnetic members has a sleeve for aligning said third magnetic member with either one of said first and second members.

42. An eyeglass assembly comprising a frame assembly and a first lens assembly and a second lens assembly, said frame assembly comprising a pair of temples, a front side and a back side, said back side of said frame assembly being closer to a wearer's face than said front side, each of said lens assemblies comprising at least one lens, each of said lens assemblies comprising a front side and a back side, said back side of said lens assembly being closer to said wearer's face than said front side of said lens assembly, at least one of said lens assemblies being secured to said frame assembly at least in part by at least one pair of magnetic members such that said front side of said lens assembly faces said back side of said frame assembly and said lens assembly is at least partially positioned between said frame assembly and said wearer's face, a first magnetic member of said at least one pair of magnetic members being a magnet that is secured to one of said frame assembly and said lens assembly and a second magnetic member of said at least one pair of magnetic members being a magnet or a material that is attracted to a magnet and said second magnetic member being secured to said other of said frame assembly and said lens assembly such that said first magnetic member and said second magnetic member are generally aligned when said lens assembly is secured to said frame assembly, said first magnetic member being positioned on a rear of a nose pad on said frame assembly and a second magnetic member positioned on a projection from said lens assembly.

43. The eyeglass assembly according to claim 42 wherein said frame assembly has at least one lens.

44. The eyeglass assembly according to claim 42 wherein at least one nose pad has a nose pad arm.

45. The eyeglass assembly according to claim 44 wherein said nose pad arm has a hood.

46. The eyeglass assembly according to claim 45 wherein said projection has a hood.

47. The eyeglass assembly according to claim 45 wherein said hood is a magnetic member.

48. The eyeglass assembly according to claim 44 wherein a nose pad arm is a magnetic member.

49. The eyeglass assembly according to claim 42 wherein said projection has a hood.

50. The eyeglass assembly according to claim 46 wherein said hood is a magnetic member.

51. The eyeglass assembly according to claim 42 wherein said frame assembly has one magnetic member positioned on a first outside edge of said frame assembly and a second magnetic member on a second outside edge of said frame assembly, said frame assembly having a magnetic member on first and second nose pads and wherein said first and second lens assemblies have a magnetic member on an outside edge thereof that secures said lens assemblies to said frame assembly, said first and second lens assemblies also comprising a projection that has a magnetic member that contacts the magnetic member of said nose pad.

* * * * *

UNITED STATES PATENT AND TRADEMARK OFFICE
CERTIFICATE OF CORRECTION

PATENT NO. : 7,370,961 B2 Page 1 of 1
APPLICATION NO. : 11/018423
DATED : May 13, 2008
INVENTOR(S) : Lerner et al.

It is certified that error appears in the above-identified patent and that said Letters Patent is hereby corrected as shown below:

Column 1, Line 8, the provisional application no. "60/508,674" should read --60/508,668--.

Signed and Sealed this

Twenty-fifth Day of November, 2008

JON W. DUDAS
*Director of the United States Patent and Trademark Office*